United States Patent
Sharma et al.

(10) Patent No.: US 8,898,119 B2
(45) Date of Patent: Nov. 25, 2014

(54) FINGERPRINTS DATASTORE AND STALE FINGERPRINT REMOVAL IN DE-DUPLICATION ENVIRONMENTS

(75) Inventors: Alok Sharma, Bangalore (IN); Praveen Killamsetti, Sunnyvale, CA (US); Satbir Singh, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 25 days.

(21) Appl. No.: 12/969,527

(22) Filed: Dec. 15, 2010

(65) Prior Publication Data

US 2012/0158670 A1 Jun. 21, 2012

(51) Int. Cl.
G06F 7/00 (2006.01)
G06F 17/00 (2006.01)
G06F 17/30 (2006.01)
G06F 3/06 (2006.01)

(52) U.S. Cl.
CPC .......... *G06F 17/3015* (2013.01); *G06F 3/0608* (2013.01); *G06F 3/0641* (2013.01); *G06F 3/0683* (2013.01)
USPC ........................................................ 707/692

(58) Field of Classification Search
None
See application file for complete search history.

(56) References Cited

U.S. PATENT DOCUMENTS

| | | | | |
|---|---|---|---|---|
| 6,965,919 B1 * | 11/2005 | Woods et al. | ................. | 709/206 |
| 7,286,451 B2 * | 10/2007 | Wirtz et al. | ................. | 369/47.12 |
| 7,747,584 B1 | 6/2010 | Jernigan, IV | | |
| 8,117,464 B1 * | 2/2012 | Kogelnik | ...................... | 713/193 |
| 8,204,862 B1 * | 6/2012 | Paulzagade et al. | .......... | 707/679 |
| 8,250,325 B2 * | 8/2012 | Holdman et al. | ............. | 711/162 |
| 8,375,183 B1 * | 2/2013 | Genda | ........................... | 711/162 |
| 2008/0005141 A1 | 1/2008 | Zheng et al. | | |
| 2008/0243769 A1 * | 10/2008 | Arbour et al. | ...................... | 707/2 |
| 2008/0244204 A1 * | 10/2008 | Cremelie et al. | ............. | 711/162 |
| 2009/0204650 A1 * | 8/2009 | Wong et al. | ................... | 707/204 |
| 2010/0042790 A1 * | 2/2010 | Mondal et al. | ................ | 711/161 |
| 2011/0040728 A1 * | 2/2011 | Akirav et al. | ................ | 707/634 |
| 2011/0078112 A1 * | 3/2011 | Takata et al. | ................. | 707/622 |
| 2011/0145523 A1 * | 6/2011 | Gupta et al. | .................. | 711/159 |
| 2011/0218972 A1 * | 9/2011 | Tofano | ......................... | 707/692 |

OTHER PUBLICATIONS

"U.S. Appl. No. 12/969,531 Final Office Action", Jun. 19, 2014, 21 pages.
"U.S. Appl. No. 12/969,531 Office Action", Nov. 7, 2013, 33 Pages.
Alvarez, Carlos, "NetApp Deduplication for FAS and V-Series Deployment and Implementation Guide", Jan. 2010, 33 Pages.

* cited by examiner

*Primary Examiner* — Taelor Kim
(74) *Attorney, Agent, or Firm* — DeLizio Gilliam, PLLC

(57) ABSTRACT

A storage server is coupled to a storage device that stores blocks of data, and generates a fingerprint for each data block stored on the storage device. The storage server creates a fingerprints datastore that is divided into a primary datastore and a secondary datastore. The primary datastore comprises a single entry for each unique fingerprint and the secondary datastore comprises an entry having an identical fingerprint as an entry in the primary datastore. The storage server merges entries in a changelog with the entries in the primary datastore to identify duplicate data blocks in the storage device and frees the identified duplicate data blocks in the storage device. The storage server stores the entries that correspond to the freed data blocks to a third datastore and overwrites the primary datastore with the entries from the merged data that correspond to the unique fingerprints to create an updated primary datastore.

7 Claims, 32 Drawing Sheets

FINGERPRINTS DATASTORE AND STALE FINGERPRINT REMOVAL IN DE-DUPLICATION ENVIRONMENTS

CROSS REFERENCE TO RELATED APPLICATIONS

This application is related to co-filed U.S. patent application Ser. No. 12/969,531, entitled "SEGMENTED FINGERPRINT DATASTORE AND SCALING A FINGERPRINT DATASTORE IN DEDUPLICATION ENVIRONMENTS," which is assigned to the same assignee as the present invention.

FIELD OF THE INVENTION

At least one embodiment of the present invention pertains to data storage systems, and more particularly, to a technique for identifying and eliminating duplicate data blocks, for sharing data blocks managed by a file system, and for identifying and removing stale entries.

BACKGROUND

In a data storage system it is desirable to use storage space as efficiently as possible, to avoid wasting storage space. One type of system in which this concern can be particularly important is a storage server, such as a file server. File servers and other types of storage servers often are used to maintain extremely large quantities of data. In such systems, efficiency of storage space utilization is critical.

Data containers (e.g., files) maintained by a file system generally are made up of individual blocks of data. A common block size is four kilobytes. In a large file system, it is common to find duplicate occurrences of individual blocks of data. Duplication of data blocks may occur when, for example, two or more files have some data in common or where a given set of data occurs at multiple places within a given file. Duplication of data blocks results in inefficient use of storage space.

A de-duplication process eliminates redundant data within a file system. A de-duplication process can occur in-line and offline. When a de-duplication process occurs while data is being written to a file system, the process can be referred to as 'in-line de-duplication.' When a de-duplication process occurs after data is written to a storage device (e.g., disk), the process can be referred to as 'offline de-duplication.' A de-duplication process can further be described, for example, to include two operations, such as a 'de-duplication operation' (identify and eliminating duplicate data blocks) and a 'verify operation' (identify and removing stale entries from a fingerprints datastore). The de-duplication process keeps a fingerprint value for every block within a file system in a fingerprints datastore (FPDS). This fingerprints datastore is used to find redundant blocks of data within the file system during a de-duplication operation. For example, typically, the fingerprint datastore is sorted on the basis of fingerprints to efficiently find potential duplicates. However, maintaining one entry for each block in a file system increases the size of the fingerprints datastore drastically. An increased fingerprints datastore size consumes more time during a de-duplication operation and verify operation.

De-duplication involves the fingerprints datastore having some fingerprint entries that are stale. A stale fingerprint entry is an entry that has a fingerprint that corresponds to a data block that has been deleted (freed) or overwritten, for example, during a de-duplication operation. The stale entries do not contribute to any space savings and add significant overhead in subsequent operations on the fingerprints datastore. These stale entries can be removed, for example, using a verify operation. Current implementations of a verify operation include two stages. In stage one, the fingerprints datastore is first sorted in order by <file identifier, block offset in a file, time stamp> to check whether a fingerprint entry is stale or not for each entry. The fingerprints datastore is then overwritten with only the stale-free entries. In stage two, the output from stage one is sorted back to its original order (e.g., fingerprint, inode, file block number (fbn)). Several problems with this conventional approach include sorting the fingerprints datastore twice with each verify operation and the second sort is unnecessary to remove the stale entries. Moreover, the conventional approach overwrites the entire FPDS with stale-free entries, even if the number of stale entries is a small percentage of the FPDS. In addition, a verify operation is typically a blocking operation, and thus, if a verify operation is executing on the FPDS, then no other de-duplication (sharing) operation can execute because de-duplication operations and verify operations should work from a consistent copy of the FPDS.

De-duplication includes logging fingerprints of any new data block that is written or updated in the file system into a changelog file. The changelog file is merged with fingerprints datastore to find duplicate blocks and to eliminate the duplicate data blocks. During this process, the fingerprints datastore is overwritten with the merged data with every de-duplication operation. Overwriting the entire fingerprints datastore with every de-duplication operation, however, can involve a large amount of write cost.

In addition, current de-duplication operations use logical information to identify blocks in a volume and their associated fingerprints. De-duplication maintains a fingerprint entry in the fingerprints datastore for each <inode, fbn>. That means, if a block is shared 'n' times, the fingerprints datastore will have 'n' entries for a single fingerprint value. In cases, however, where there is a significant amount of logical data, a fingerprints datastore cannot scale proportionately.

SUMMARY

One aspect of a de-duplication operation generates a fingerprint for each data block stored on a storage device in storage. The de-duplication operation divides a fingerprints datastore into a primary datastore and a secondary datastore. The primary datastore comprises a single entry for each unique fingerprint and the secondary datastore comprises an entry having an identical fingerprint as an entry in the primary datastore. The de-duplication operation merges entries in a changelog with the entries in the primary datastore to identify duplicate data blocks in the storage device and frees the identified duplicate data blocks in the storage device. The de-duplication operation stores the entries that correspond to the freed data blocks to a third datastore and overwrites the primary datastore with the entries from the merged data that correspond to the unique fingerprints to create an updated primary datastore.

During a verify operation, stale fingerprint entries are identified in the fingerprints datastore. A stale fingerprint entry is an entry that has a fingerprint that corresponds to a data block that has been deleted (freed) or overwritten, for example, during a de-duplication operation. One aspect of the verify operation identifies stale entries in the fingerprints datastore and writes stale entry information for the identified stale entries to a stale entries datastore. A subsequent de-duplication operation removes the stale entries in the fingerprints datastore using the stale entry information. Another aspect of a verify operation manages a verify operation as a background operation so that if any de-duplication request is made while a verify operation is executing, the de-duplication request can be served, which in turn helps decrease customer response time.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1A:
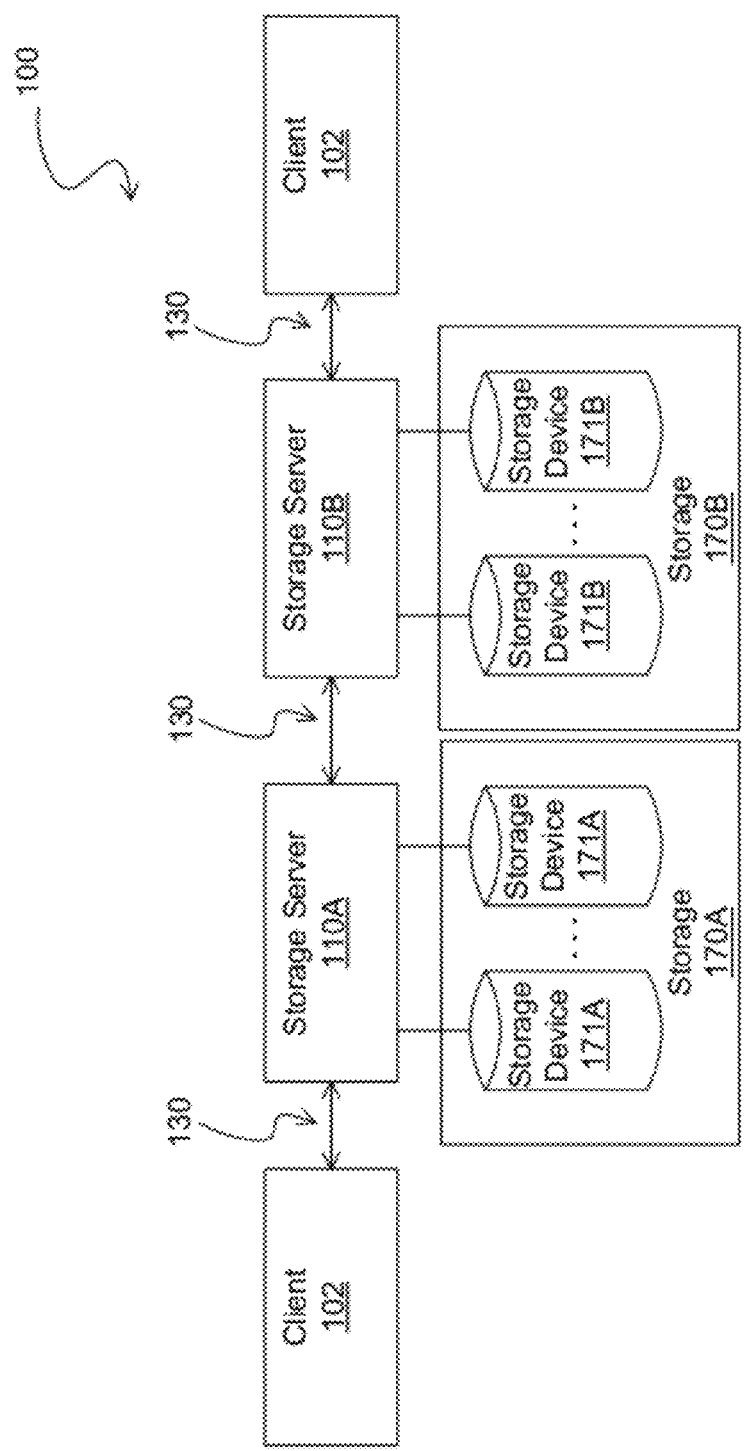
FIG. 1A illustrates a network storage system in which embodiments may be implemented.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Data containers (e.g., files) maintained by a file system generally are made up of individual blocks of data stored on storage devices. Duplication of data blocks may occur when, for example, two or more files have some data in common or where a given set of data occurs at multiple places within a given file has. Duplication of data blocks results in inefficient use of storage space. De-duplication eliminates redundant data within a file system. As described herein, de-duplication includes two operations, a 'de-duplication operation' to identify and eliminate duplicate data blocks, and a 'verify operation' to identify and remove stale entries (e.g., stale records) from a fingerprints datastore. Embodiments of a de-duplication operation and a verify operation are described in greater detail below in conjunction with FIGS. 4A-4C.

One aspect of the de-duplication operation divides a fingerprints datastore into multiple parts, such as a primary fingerprints datastore and a secondary fingerprints datastore. De-duplication operations can use this primary fingerprints datastore, which will be smaller in size compared to a secondary fingerprints datastore, to identify duplicate blocks of data, to reduce the overall time taken to find potential duplicate blocks. Another aspect of the de-duplication operation organizes the fingerprints datastore as master datastore and stores the entries in the changelogs as datastore segments to avoid overwriting the master datastore during every de-duplication operation. Another aspect of a de-duplication operation references a block in a volume uniquely by maintaining a single entry for each fingerprint in the fingerprints datastore using a VVBN (Virtual Volume Block Number), thus allowing the fingerprints datastore to scale easily.

During a verify operation, stale fingerprint entries are identified and removed from the fingerprints datastore. One aspect of the verify operation optimizes current stale entries removal by reducing the time to sort the fingerprints datastore by recording stale entry information to a separate datastore (e.g., stale entries file) which would be proportional to size of stale entries in the fingerprints datastore, rather than rewriting the entire fingerprints datastore. In response to detecting a request for a subsequent de-duplication operation, the stale entry datastore is merged with the fingerprints datastore and the stale entries are removed prior to the execution of the de-duplication operation when there is a full read/write of the entire fingerprints datastore. Thus, the conventional second sort of the fingerprints datastore is eliminated. Another aspect of a verify operation manages the verify operation as a background operation so that if any de-duplication request is made while a verify operation is executing, the de-duplication request can be served, which in turn helps decrease customer response time.

FIGS. 1A-1B, 2, and 3 show operating environments in which embodiments as described below can be implemented. FIG. 1A shows a network storage system 100 in which embodiments can be implemented. Storage servers 110 (storage servers 110A, 110B) each manage multiple storage units 170 (storage 170A, 170B) that include mass storage devices. These storage servers provide data storage services to one or more clients 102 through a network 130. Network 130 may be, for example, a local area network (LAN), wide area network (WAN), metropolitan area network (MAN), global area network such as the Internet, a Fibre Channel fabric, or any combination of such interconnects. Each of clients 102 may be, for example, a conventional personal computer (PC), server-class computer, workstation, handheld computing or communication device, or other special or general purpose computer.

Storage of data in storage units 170 is managed by storage servers 110 which receive and respond to various read and write requests from clients 102, directed to data stored in or to be stored in storage units 170. Storage units 170 constitute mass storage devices which can include, for example, flash memory, magnetic or optical disks, or tape drives, illustrated as storage devices 171 (171A, 171B). The storage devices 171 can further be organized into arrays (not illustrated) implementing a Redundant Array of Inexpensive Disks/Devices (RAID) scheme, whereby storage servers 110 access storage units 170 using one or more RAID protocols known in the art.

Storage servers 110 can provide file-level service such as used in a network-attached storage (NAS) environment, block-level service such as used in a storage area network (SAN) environment, a service which is capable of providing both file-level and block-level service, or any other service capable of providing other data access services. Although storage servers 110 are each illustrated as single units in FIG. 1A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 1B and embodiments of an D-module and an N-module are described further below with respect to FIG. 3.

In yet other embodiments, storage servers 110 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage server connected to a primary storage server. A network storage subsystem can also be implemented with a collection of networked resources provided across multiple storage servers and/or storage units.

In the embodiment of FIG. 1A, one of the storage servers (e.g., storage server 110A) functions as a primary provider of data storage services to client 102. Data storage requests from client 102 are serviced using storage devices 171A organized as one or more storage objects. A secondary storage server (e.g., storage server 110B) takes a standby role in a mirror relationship with the primary storage server, replicating storage objects from the primary storage server to storage objects organized on storage devices of the secondary storage server (e.g., storage devices 170B). In operation, the secondary storage server does not service requests from client 102 until data in the primary storage object becomes inaccessible such as in a disaster with the primary storage server, such event considered a failure at the primary storage server. Upon a failure at the primary storage server, requests from client 102 intended for the primary storage object are serviced using replicated data (i.e. the secondary storage object) at the secondary storage server.

It will be appreciate that in other embodiments, network storage system 100 may include more than two storage servers. In these cases, protection relationships may be operative between various storage servers in system 100 such that one or more primary storage objects from storage server 110A may be replicated to a storage server other than storage server 110B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 110 should be taken as illustrative only.

Figure 1B:
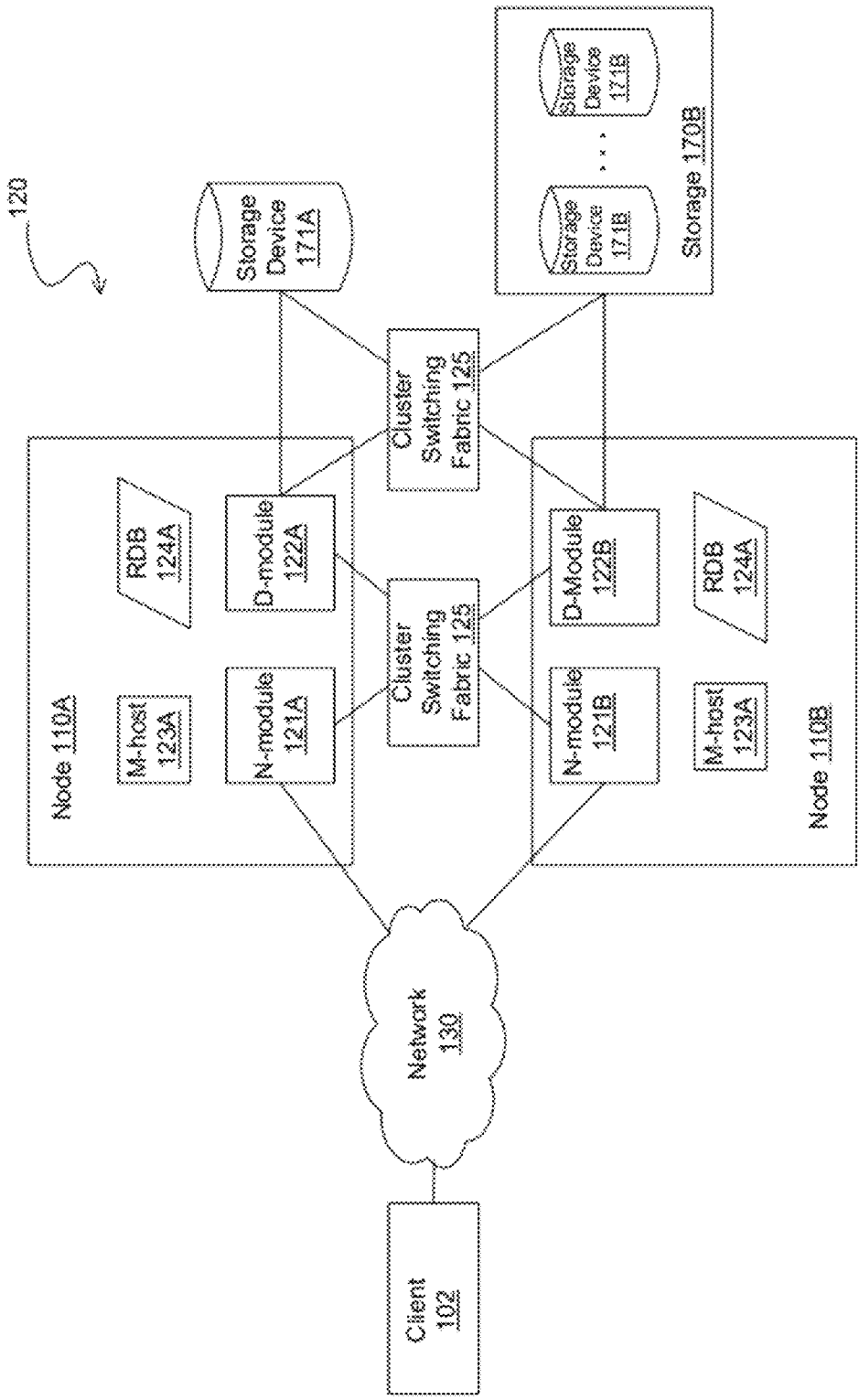
FIG. 1B illustrates a distributed or clustered architecture for a network storage system in which embodiments may be implemented in an alternative embodiment.

FIG. 1B illustrates a block diagram of a distributed or clustered network storage system 120 which may implement embodiments. System 120 may include storage servers implemented as nodes 110 (nodes 110A, 110B) which are each configured to provide access to storage devices 171. In FIG. 1B, nodes 110 are interconnected by a cluster switching fabric 125, which may be embodied as an Ethernet switch.

Nodes 110 may be operative as multiple functional components that cooperate to provide a distributed architecture of system 120. To that end, each node 110 may be organized as a network element or module (N-module 121A, 121B), a disk element or module (D-module 122A, 122B), and a management element or module (M-host 123A, 123B). In one embodiment, each module includes a processor and memory for carrying out respective module operations. For example, N-module 121 may include functionality that enables node 110 to connect to client 102 via network 130 and may include protocol components such as a media access layer, Internet Protocol (IP) layer, Transport Control Protocol (TCP) layer, User Datagram Protocol (UDP) layer, and other protocols known in the art.

In contrast, D-module 122 may connect to one or more storage devices 171 via cluster switching fabric 125 and may be operative to service access requests on devices 170. In one embodiment, the D-module 122 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 1B, a storage abstraction layer (e.g., file system) of the D-module divides the physical storage of devices 170 into storage objects. Requests received by node 110 (e.g., via N-module 121) may thus include storage object identifiers to indicate a storage object on which to carry out the request.

Also operative in node 110 is M-host 123 which provides cluster services for node 110 by performing operations in support of a distributed storage system image, for instance, across system 120. M-host 123 provides cluster services by managing a data structure such as a RDB 124 (RDB 124A, RDB 124B) which contains information used by N-module 121 to determine which D-module 122 "owns" (services) each storage object. The various instances of RDB 124 across respective nodes 110 may be updated regularly by M-host 123 using conventional protocols operative between each of the M-hosts (e.g., across network 130) to bring them into synchronization with each other. A client request received by N-module 121 may then be routed to the appropriate D-module 122 for servicing to provide a distributed storage system image.

It should be noted that while FIG. 1B shows an equal number of N- and D-modules constituting a node in the illustrative system, there may be different number of N- and D-modules constituting a node in accordance with various embodiments. For example, there may be a number of N-modules and D-modules of node 110A that does not reflect a one-to-one correspondence between the N- and D-modules of node 110B. As such, the description of a node comprising one N-module and one D-module for each node should be taken as illustrative only.

Figure 2:
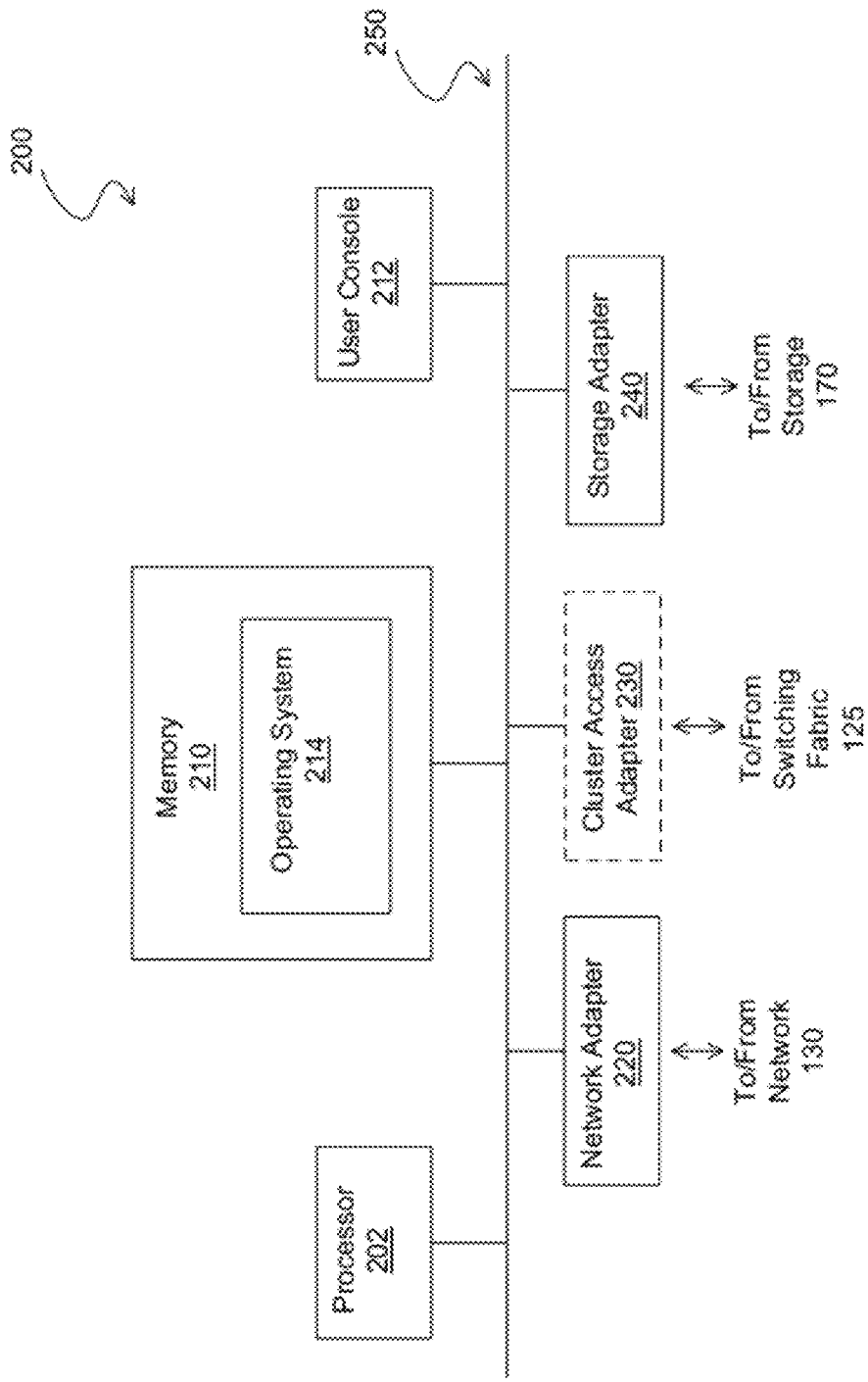
FIG. 2 is a block diagram of an illustrative embodiment of storage server in which embodiments may be implemented.

FIG. 2 is a block diagram of an embodiment of a storage server, such as storage servers 110A and 110B of FIG. 1A, embodied as a general or special purpose computer including a processor 202, a memory 210, a network adapter 220, a user console 212 and a storage adapter 240 interconnected by a system bus 250, such as a convention Peripheral Component Interconnect (PCI) bus.

Memory 210 includes storage locations addressable by processor 202, network adapter 220 and storage adapter 240 for storing processor-executable instructions and data structures associated with embodiments. A storage operating system 214, portions of which are typically resident in memory 210 and executed by processor 202, functionally organizes the storage server by invoking operations in support of the storage services provided by the storage server. It will be apparent to those skilled in the art that other processing means may be used for executing instructions and other memory means, including various computer readable media, may be used for storing program instructions pertaining to the embodiments described herein. It will also be apparent that some or all of the functionality of the processor 202 and executable software can be implemented by hardware, such as integrated currents configured as programmable logic arrays, ASICs, and the like.

Network adapter 220 comprises one or more ports to couple the storage server to one or more clients over point-to-point links or a network. Thus, network adapter 220 includes the mechanical, electrical and signaling circuitry needed to couple the storage server to one or more client over a network. Each client may communicate with the storage server over the network by exchanging discrete frames or packets of data according to pre-defined protocols, such as TCP/IP.

Storage adapter 240 includes a plurality of ports having input/output (I/O) interface circuitry to couple the storage devices (e.g., disks) to bus 221 over an I/O interconnect arrangement, such as a conventional high-performance, FC or SAS link topology. Storage adapter 240 typically includes a device controller (not illustrated) comprising a processor and a memory for controlling the overall operation of the storage units in accordance with read and write commands received from storage operating system 214. As used herein, data written by a device controller in response to a write command is referred to as "write data," whereas data read by device controller responsive to a read command is referred to as "read data."

User console 212 enables an administrator to interface with the storage server to invoke operations and provide inputs to the storage server using a command line interface (CLI) or a graphical user interface (GUI). In one embodiment, user console 212 is implemented using a monitor and keyboard.

When implemented as a node of a cluster, such as cluster 120 of FIG. 1B, the storage server further includes a cluster access adapter 230 (shown in phantom) having one or more ports to couple the node to other nodes in a cluster. In one embodiment, Ethernet is used as the clustering protocol and interconnect media, although it will apparent to one of skill in the art that other types of protocols and interconnects can by utilized within the cluster architecture.

Figure 3:
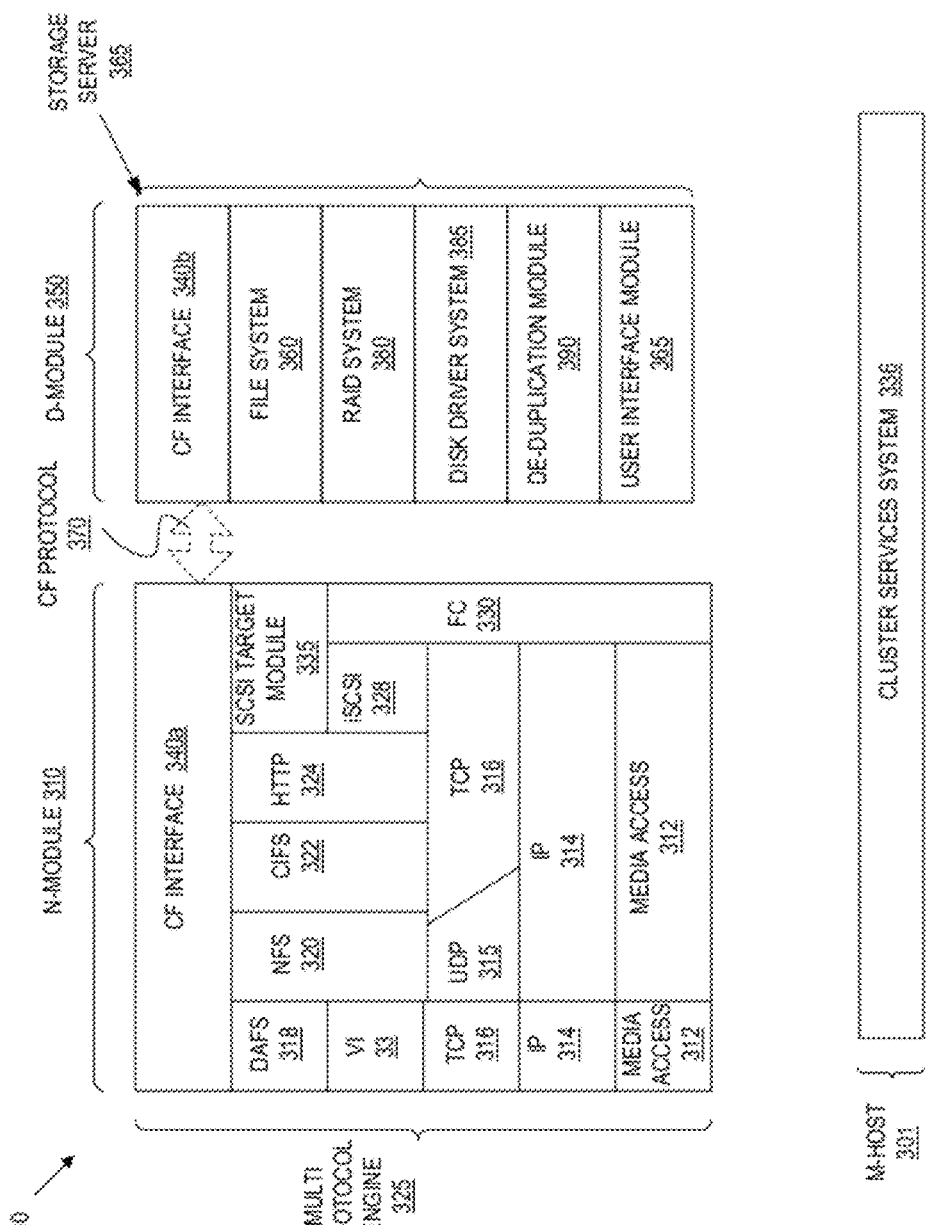
FIG. 3 illustrates an embodiment of the storage operating system of FIG. 2 in which embodiments may be implemented.

FIG. 3 is a block diagram of a storage operating system, such as storage operating system 214 of FIG. 2 that implements embodiments. The storage operating system comprises a series of software layers executed by a processor, such as processor 202 of FIG. 2, and organized to form an integrated network protocol stack or, more generally, a multi-protocol engine 325 that provides data paths for clients to access information stored on the storage server using block and file access protocols.

Multi-protocol engine 325 includes a media access layer 312 of network drivers (e.g., gigabit Ethernet drivers) that interface with network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the storage server. In certain cases, a Fibre Channel over Ethernet (FCoE) layer (not shown) may also be operative in multi-protocol engine 325 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

The storage operating system also includes a series of software layers organized to form a storage server 365 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement may involve logical volume block number (vbn) spaces, wherein each volume is associated with a unique vbn.

File system 360 implements a virtualization system of the storage operating system through the interaction with one or more virtualization modules (illustrated as a SCSI target module 335). SCSI target module 335 is generally disposed between drivers 328, 330 and file system 360 to provide a translation layer between the block (lun) space and the file system space, where luns are represented as blocks. In one embodiment, file system 360 implements a WAFL (write anywhere file layout) file system having an on-disk format representation that is block-based using, e.g., 4 kilobyte (KB) blocks and using a data structure such as index nodes ("inodes") to identify files and file attributes (such as creation time, access permissions, size and block location). File system 360 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter. A network driver such as layer 312 or layer 330 processes the packet and, if appropriate, passes it on to a network protocol and file access layer for additional processing prior to forwarding to file system 360. There, file system 360 generates operations to load (retrieve) the requested data from the storage devices if it is not resident "in core", i.e., in memory 223. If the information is not in memory, file system 360 accesses the inode file to retrieve a logical vbn and passes a message structure including the logical vbn to the RAID system 380. There, the logical vbn is mapped to a disk identifier and device block number (disk, dbn) and sent to an appropriate driver of disk driver system 385. The disk driver accesses the dbn from the specified disk and loads the requested data block(s) in memory for processing by the storage server. Upon completion of the request, the node (and operating system 300) returns a reply to the client over the network.

It should be noted that the software "path" through the storage operating system layers described above needed to perform data storage access for the client request received at the storage server adaptable to the embodiments may alternatively be implemented in hardware. That is, in an alternate embodiment, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment, the processing elements of adapters 220, 240 may be configured to offload some or all of the packet processing and storage access operations, respectively, from processor 202, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 350 for accessing data stored on a storage device (e.g., disk). In contrast, multi-protocol engine 325 may be embodied as N-module 310 to perform protocol termination with respect to a client issuing incoming access over the network, as well as to redirect the access requests to any other N-module in the cluster. A cluster services system 336 may further implement an M-host (e.g., M-host 301) to provide cluster services for generating information sharing operations to present a distributed file system image for the cluster. For instance, media access layer 312 may send and receive information packets between the various cluster services systems of the nodes to synchronize the replicated databases in each of the nodes.

In addition, a cluster fabric (CF) interface module 340 (CF interface modules 340A, 340B) may facilitate intra-cluster communication between N-module 310 and D-module 350 using a CF protocol 370. For instance, D-module 350 may expose a CF application programming interface (API) to which N-module 310 (or another D-module not shown) issues calls. To that end, CF interface module 340 can be organized as a CF encoder/decoder using local procedure calls (LPCs) and remote procedure calls (RPCs) to communicate a file system command to between D-modules residing on the same node and remote nodes, respectively.

The operating system 300 also includes a user interface module 365 and a de-duplication module 390 logically on top of the file system 360. The user interface module 365 may implement a command line interface and/or a graphical user interface, which may be accessed by a network administrator from an attached administrative console or through a network. The de-duplication module 390 is an application layer which identifies and eliminates duplicate data blocks ("de-duplication") and triggers data block sharing in accordance with the embodiments introduced herein.

The operating system 300 also includes, or has access to, data repositories that are used to implement the data block sharing. The data repositories can include, but are not limited to, a fingerprints datastore, a changelog file, an active map, and reference count file. Embodiments of the data repositories are described in greater detail below in conjunction with FIGS. 4A-C and FIG. 23. Although embodiments are shown within the storage operating system, it will be appreciated that embodiments may be implemented in other modules or components of the storage server. In addition, embodiments may be implemented as one or a combination of a software-executing processor, hardware or firmware within the storage server. As such, embodiments may directly or indirectly interface with modules of the storage operating system.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the embodiments described herein may apply to any type of special-purpose (e.g., file server or storage serving appliance) or general-purpose computer, including a standalone computer or portion thereof, embodied as or including a storage system. Moreover, the embodiments can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the embodiments may be utilized with any suitable file system, including conventional write in place file systems.

Figure 4A:
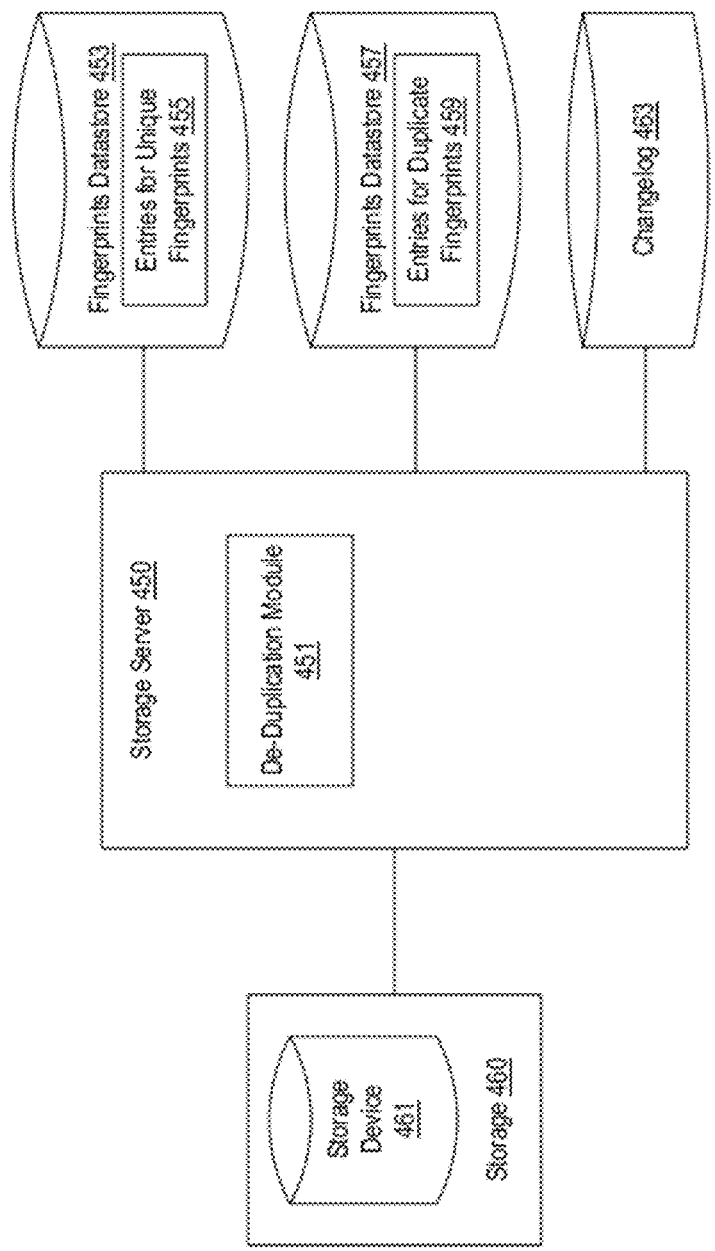
FIGS. 4A-4B show block diagrams of storage environments in which embodiments can be implemented.
Figure 4B:
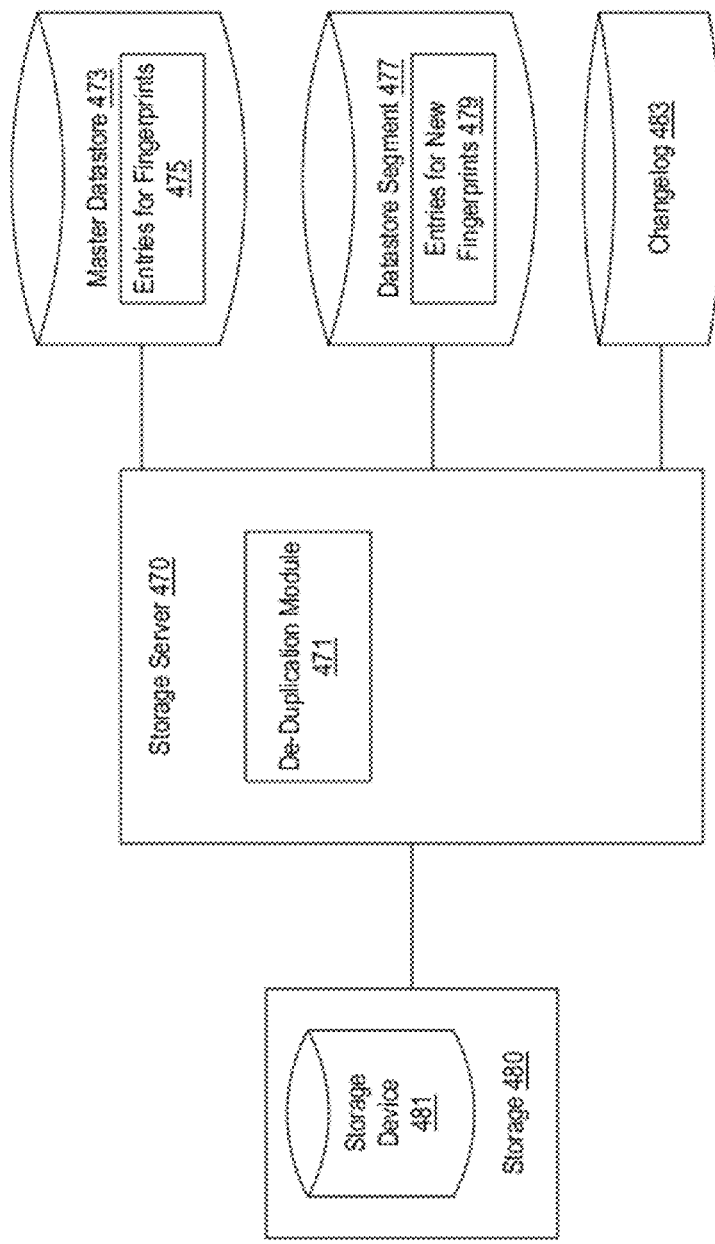

FIGS. 4A-4B show block diagrams of storage environments in which embodiments can be implemented. De-duplication can occur in-line and offline. When de-duplication occurs while data is being written to a file system, the de-duplication can be referred to as 'in-line de-duplication.' When de-duplication occurs after data is written to a storage device (e.g., disk), the de-duplication can be referred to as 'offline de-duplication.' A storage server 450 is coupled to a storage device 461 in storage 460 and the storage device 460 stores blocks of data. The storage server 450 includes a de-duplication module 451 that generates a fingerprint for each data block stored on the storage device 461. The storage server 450 is coupled to a fingerprints datastore (e.g., a fingerprints database), which stores entries for every block within a file system. An entry includes the fingerprint (e.g., checksum) for the data block.

When de-duplication runs for the first time, the de-duplication module 451 scans the blocks and creates a fingerprints datastore, which contains fingerprints for used blocks in the storage device 461. The fingerprints datastore can store an entry (e.g., a fingerprint record) for each data block that is written to the storage device 461 in the storage 460. An entry includes a fingerprint (fingerprint value) for the data block. A "fingerprint" or "fingerprint value" may be a checksum, for example. The fingerprints are used in a de-duplication operation for efficiently identifying duplicate data blocks, i.e., to identify data blocks that can be shared. A de-duplication operation is described below in detail, according to embodiments.

When new data blocks are written or updated in the file system, new fingerprint entries are created and logged into a changelog 463. During a de-duplication operation, the entries in the fingerprints datastore are compared to the entries in the changelog 463 to identify and free duplicate data blocks so as to leave only one instance of each unique data block in the file system.

In one embodiment, the fingerprints datastore is divided into a primary datastore 453 and a secondary datastore 457. The primary datastore 457 includes a single entry for each unique fingerprint 455 and the secondary datastore 459 includes an entry having an identical fingerprint as an entry in the primary datastore 457. The de-duplication module 451 merges entries in a changelog 463 with the entries 455 in the primary datastore 453 to identify duplicate data blocks in the storage device 461 and frees the identified duplicate data blocks in the storage. The de-duplication module 451 stores the entries that correspond to the freed data blocks to a third datastore and overwrites the primary datastore 453 with the entries from the merged data that correspond to the unique fingerprints to create an updated primary datastore.

Typically, during a de-duplication operation, the fingerprints datastore is overwritten each time with the entries from the current fingerprints datastore and the changelog 463. Overwriting the entire fingerprints datastore with every de-duplication operation, however, can involve a large amount of write cost. FIG. 4B shows another embodiment of a fingerprints datastore that is a master datastore 473 and one or more datastore segments 477 to avoid overwriting the master datastore 473 during every de-duplication operation. The master datastore 473 includes an entry 475 for each data block that is written to the storage device 481. Each data block has a fingerprint that is generated by the de-duplication module 471. The one or more datastore segments 477 include an entry 479 for a new data block or modified data block that is subsequently written to the storage device 481. Each new and modified data block has a fingerprint that is generated by the de-duplication module 471. The de-duplication module 471 delays overwriting the master datastore 473 until a segment count threshold is reached or until a verify operation is triggered. The de-duplication module 471 can then overwrite the master datastore 473 with the entries 479 in all of the datastore segments 477 and the entries 475 in the master 473 datastore to create an updated master datastore.

Figure 4C:
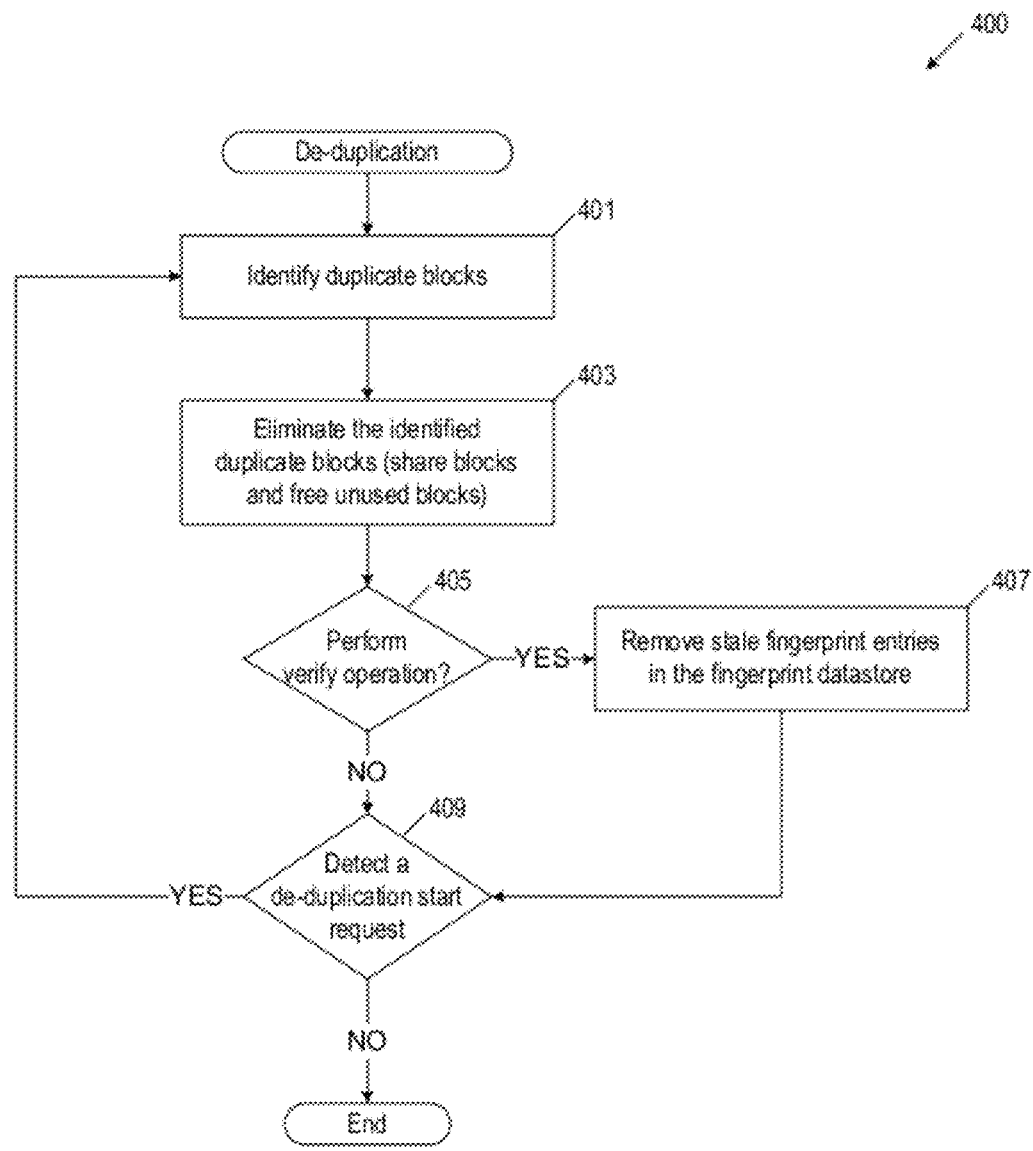
FIG. 4C is a flow diagram showing a high-level de-duplication method, according to certain embodiments.

FIG. 4C shows a high-level de-duplication method, according to certain embodiments. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by a de-duplication module (e.g., de-duplication module 390 in FIG. 3) hosted by storage servers 110 of FIG. 1A.

The first phase of a de-duplication process includes identifying and eliminating duplicate data blocks. The identifying and eliminating of duplicate data blocks is hereinafter referred to as a 'de-duplication operation' and 'block freeing operation.' At instruction block 401, the method identifies duplicate data blocks. One embodiment of a method for identifying duplicate data blocks using a fingerprints datastore that is divided into multiple parts, such as a primary datastore and a secondary datastore, is described in greater detail in conjunction with FIGS. 9A-9B. Another embodiment of a method for identifying duplicate data blocks using a fingerprints datastore that is organized into a master datastore and datastore segments is described in greater detail in conjunction with FIGS. 11A-11B. Another embodiment of a method for identifying duplicate data blocks using VVBNs (virtual volume block numbers) is described in greater detail in conjunction with FIGS. 14A-14B.

Once the duplicate data blocks are identified, the method eliminates the identified duplicate blocks (e.g., actual duplicate data blocks) at instruction block 403 so as to leave only one instance of each unique data block. Eliminating the duplicate data blocks includes sharing the remaining instance of each data block that was duplicated and freeing the (no longer used) duplicate data block(s). One embodiment of a method for eliminating a data block, such as a duplicate block, is described in greater detail in conjunction with FIG. 23. At instruction block 403, the method updates a reference count file and an active map. An embodiment of updating a reference count file and an active map are described in greater detail below in conjunction with FIG. 23.

The fingerprint entries that correspond to the eliminated duplicate data blocks and remain in a fingerprints datastore (FPDS) are referred to as 'stale' fingerprint entries. A verify operation identifies stale fingerprint entries from the FPDS. The identifying and removing of stale fingerprint entries is hereinafter referred to as a 'verify operation,' 'stale record removal operation,' 'verify phase,' 'verify scan,' and 'checking phase.' In one embodiment, a verify operation identifies stale fingerprint entries and the stale entries are removed from a fingerprints datastore during a subsequent de-duplication operation. A stale fingerprint entry is an entry that has a fingerprint that corresponds to a block that has been deleted or overwritten, for example, at instruction block 403.

At instruction block 405, the method determines whether to perform a verify operation. A verify operation can be automatically triggered when the number of stale entries in a fingerprints datastore reaches or exceeds a stale entries threshold. In another example, a verify operation can be triggered from CLI (command line interface). A verify operation can also be user driven, for example, by the de-duplication module receiving instructions entered by a user via a command line interface.

If there is a trigger for the verify operation, the method identifies and removes the stale fingerprint entries from the fingerprints datastore at instruction block 407. One embodiment of a method for identifying and removing stale fingerprint entries when a next de-duplication operation is invoked is described in greater detail in conjunction with FIGS. 16A-16B. Another embodiment of a method for identifying and removing stale fingerprint entries as a background job is described in greater detail in conjunction with FIG. 24.

If there is not a trigger for the verify operation, the method determines whether a de-duplication operation start request (e.g., 'sis start' command or 'SIS request') is received at instruction block 409. New data blocks may be written or updated in storage (e.g., storage 170A,B in FIG. 1A) and can trigger the storage server (e.g., a de-duplication module in a storage server) to compute fingerprints of the new data blocks and update the fingerprints datastore to reflect the new data blocks. When new data blocks are written or updated in a file system, the storage server creates and logs new fingerprint entries into a changelog file. The method may detect a SIS request to perform de-duplication on the updated fingerprints datastore. If a SIS request is detected, the method returns to instruction block 401 to identify duplicate blocks in the fingerprints datastore.

The method 400 can be triggered automatically at predetermined intervals or at predetermined times, or it may be triggered manually or in response to pre-specified events (such as deletion of a file) or in response to a pre-specified policy (such as a given number of new blocks having been collected).

Figure 5A:
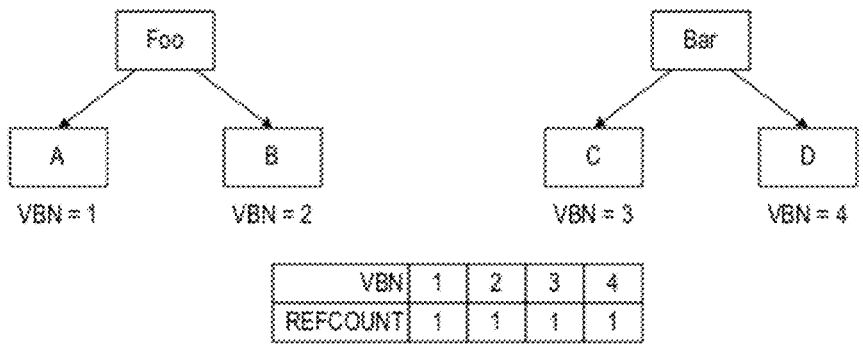
FIGS. 5A-5C are block diagrams of data sharing with respect to two files, according to certain embodiments.
Figure 5B:
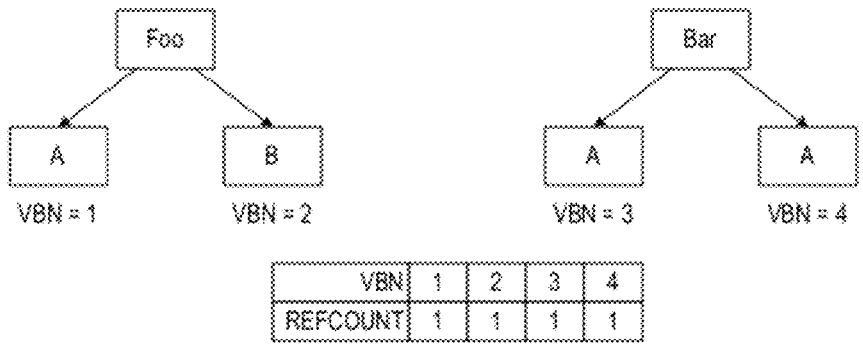
Figure 5C:
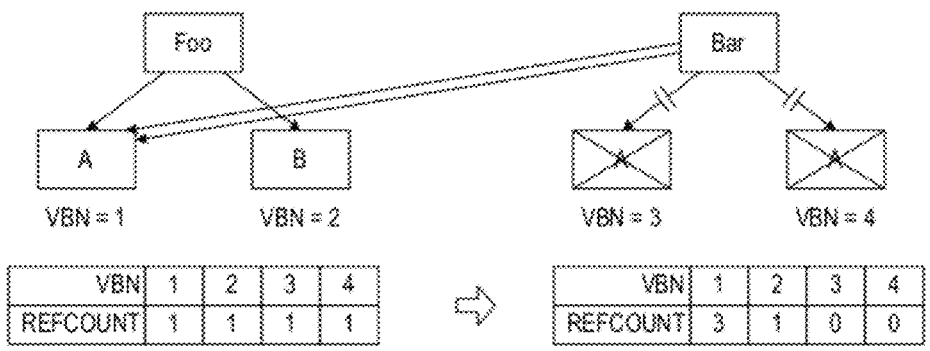

FIGS. 5A, 5B, and 5C are block diagrams illustrating data sharing, according to certain embodiments. Assume for purposes of explanation that the active file system of a file server maintains two simple files, named Foo and Bar, shown in FIG. 5A. File Foo contains two data blocks, and file Bar contains two data blocks. Each data block is identified in the file system by (among other things) its volume block number (VBN). A VBN identifies the logical block where the data is stored (since RAID aggregates multiple physical drives as one logical drive), as opposed to a physical block. A VBN should be distinguished from a disk block number (DBN) which identifies the physical block number within a disk in which the block is stored, or a file block number (FBN) which identifies the logical position of the data within a file. The two blocks of file Foo have VBN values of 1 and 2. VBN 1 contains the data, "A", while VBN 2 contains the data, "B". The two blocks of file Bar have VBN values of 3 and 4. VBN 3 contains the data, "C", while VBN 4 contains the data, "D".

For each VBN maintained by the file system, a reference count file includes a value, REFCOUNT, indicating the number of references to that VBN. The reference count file contains an entry (e.g., record) for each data block maintained by the storage server, wherein each entry includes a value, REFCOUNT, indicating the number of references to that data block. For example, a data block which is shared by two files would have a REFCOUNT value of 2. A data block can be shared by more than two files (or other entities), in which case the REFCOUNT value would reflect this accordingly. A data block which is allocated but not shared would have a REFCOUNT value of 1. A data block which is not yet allocated would have a REFCOUNT value of 0. In certain embodiments, the REFCOUNT value for each data block is a two-byte binary value, which allows each data block to be the target of up to $2^{16}-1$ references. In the example of FIG. 5A, for VBNs [1,2,3,4] the REFCOUNT values are [1,1,1,1], respectively, indicating that each VBN is the target of one reference.

Refer now to FIG. 5B, which is a variation of the example of FIG. 5A, in which VBNs 3 and 4 of file Bar have the same data ("A") as VBN 1 of file Foo. That is, VBNs 3 are 4 are duplicates of VBN 1 and of each other. Initially, when a data block is allocated by the file system, its REFCOUNT value in the reference count file is set equal to 1. Accordingly, before duplicate data blocks are identified in the example of FIG. 5B, the REFCOUNT values for the example of FIG. 5B are the same as in FIG. 5A, i.e., [1,1,1,1], as shown.

In contrast, FIG. 5C shows what the example of FIG. 5B would look like after duplicate data blocks have been identified (e.g., at instruction block 401 in method 400 of FIG. 4) and sharing is implemented (e.g., at instruction block 403 in method 400 of FIG. 4). Sharing involves giving, to each entity which owns a shareable data block, a pointer to that data block. Accordingly, in the example of FIG. 5C this involves giving file Bar two pointers to VBN 1 (file Foo already had a pointer to VBN 1). Data sharing also involves eliminating the duplicate data blocks, VBNs 3 and 4, and freeing them for reuse (e.g., at step 403 of FIG. 4). Once the data sharing is completed, the REFCOUNT values for VBNs [1,2,3,4] are adjusted to be [3,1,0,0], respectively, to reflect the fact that VBNs 3 and 4 have been freed and VBN 1 now has three references to it (i.e., VBN 1 is shared). One embodiment of a method for freeing duplicate data blocks for reuse is described in greater detail in conjunction with FIG. 23.

Returning to FIG. 5C, the data sharing continually updates the reference count file to reflect events that affect these blocks. For example, if file Foo is now deleted, the REFCOUNT values for VBNs [1,2,3,4] would be adjusted to be [2,0,0,0], respectively, reflecting that VBN 2 has been freed in addition to VBNs 3 and 4. Note that VBN 1 has not been freed (i.e., its REFCOUNT value is not zero), since VBN 1 is still in use by file Bar; instead the REFCOUNT value for VBN 1 has been decremented from 3 to 2. If file Bar is now deleted, the REFCOUNT values for VBNs [1,2,3,4] would be adjusted to be [0,0,0,0], respectively.

In one embodiment, the data sharing uses a file system that adheres to the copy-on-write principle; that is, anytime a data block is modified, it is written to a different VBN, rather than modifying the data in place. Referring back to the example of FIG. 5C, therefore, assume that a write request from a client causes the data "A" in file Bar to be changed to "F". In this case, VBN 1, which contains the data "A", is not modified. However, since the new data, "F", is written to a new logical and physical block, the REFCOUNT value for VBN 1 must still be updated. Hence, the REFCOUNT value for VBN 1 in this case would be decremented by one. In addition, the REFCOUNT value for whichever VBN is allocated to store the new data, "F", would be incremented by one.

In another embodiment, data sharing uses a file system which does not impose copy-on-write in all instances. For example, the data sharing can be implemented by requiring copy-on-write only when the REFCOUNT value for given data block is greater than one.

To avoid data inconsistencies, when a data container (e.g., file) which contains one or more shared blocks is modified, its REFCOUNT values and block pointers are updated in a single atomic transaction. This updating may be done, for example, during a "consistency point", i.e., when a set of accumulated write transactions are committed from temporary storage to persistent storage.

The data in the reference count file may become corrupted, for any of various reasons. The storage server scans the entire active file system for consistency with the reference count file before boot-up of the file system to ensure the consistency between the reference count file and the actual state of the file system, according to one embodiment. The scanning can include creating a separate, temporary reference count file in main memory of the file server, scanning all data blocks in the file system to identify shared data blocks, and updating the temporary reference count file to reflect any shared data blocks. The temporary reference count file is then compared to the regular (persistent, on-disk) reference count file to determine whether they match. If they do not match, an inconsistency is identified, and appropriate corrective action is taken.

In another embodiment, the consistency check is run while the file system is in operation. The storage server creates a temporary reference count file on a storage device (e.g., disk), so as not to consume main memory in the storage server. In that case, however, if the user modifies a particular block while the consistency check is running, it is necessary to update both the temporary and the persistent reference count files.

Various other optimizations can be added to the above described data sharing. For example, a SHARED flag can be provided for each data container (e.g., file) in the file system, to indicate whether the file contains any shared blocks. The SHARED flag can be stored in a convenient location, such as in the file's inode (a container of metadata about the file, used by the file system), to allow fast determination of whether it is necessary to read the reference count file when modifying a block. This avoids unnecessarily having to read the (large) reference count file when the file includes no shared blocks. Similarly, another flag can be implemented for each volume in the storage system, to indicate whether the volume is allowed to implement block sharing. The benefit, as in the previous example, is avoiding the need to read the reference count file in all cases.

Further, one or more counters can be implemented in the file system to track the total number of shared blocks. These counters can be used to provide an output to a user (e.g., a storage network administrator) indicating the amount of storage device space (e.g., disk space) being saved as a result of block sharing.

Figure 6:
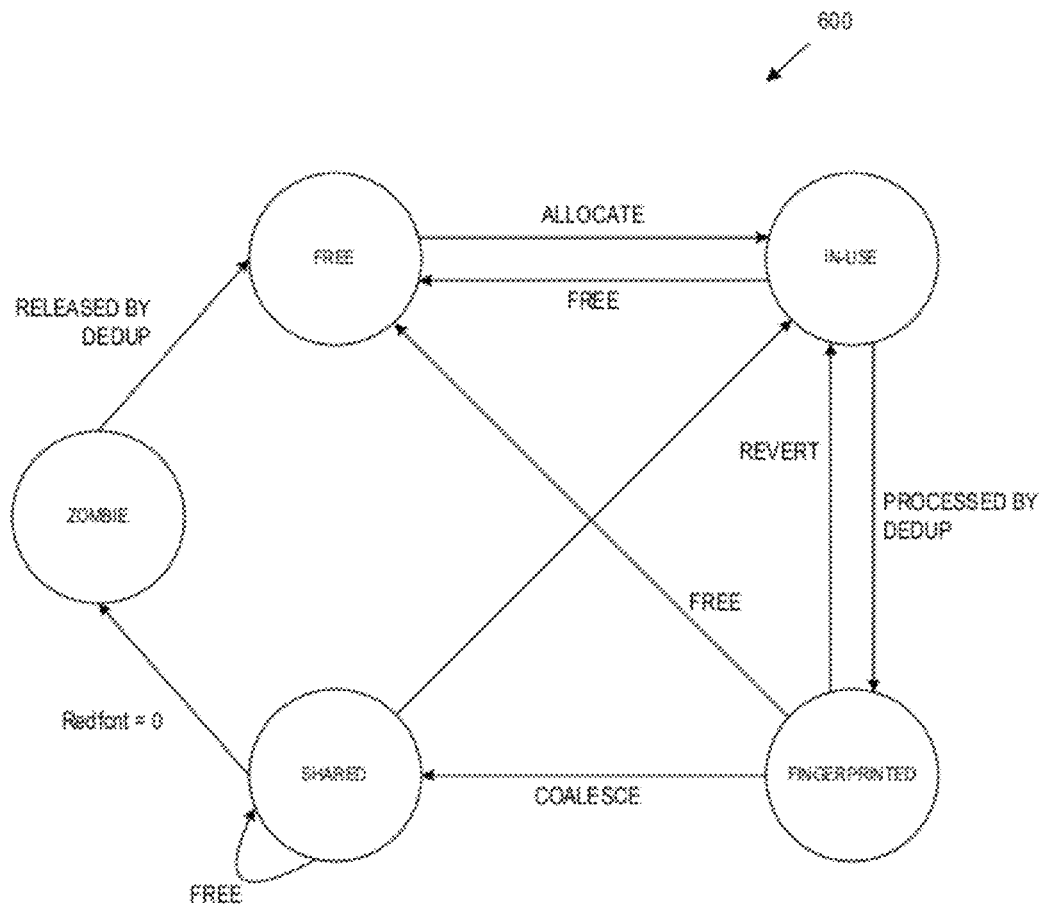
FIG. 6 is a state diagram showing the states which a data block can have, according to certain embodiments.

According to certain embodiments, at any particular point in time a block will be in one of the following states: free, in-use, fingerprinted, shared, and zombie. A free block is a block that is not being used (not allocated). An in-use block is a block that is being used and has not yet been processed by the de-duplication operation. A fingerprinted block is a block that has been processed by the de-duplication operation, and for which an entry (e.g., record) has been added into the fingerprints datastore to track the block. A shared block is a block that has become shared and for which one or more duplicates of this block have been identified and eliminated. A zombie is a block that was shared but now is no longer used by any files, but the block has not yet been freed. FIG. 6 illustrates how a block can transition through the various states in response to various events, according to certain embodiments.

Figure 7:
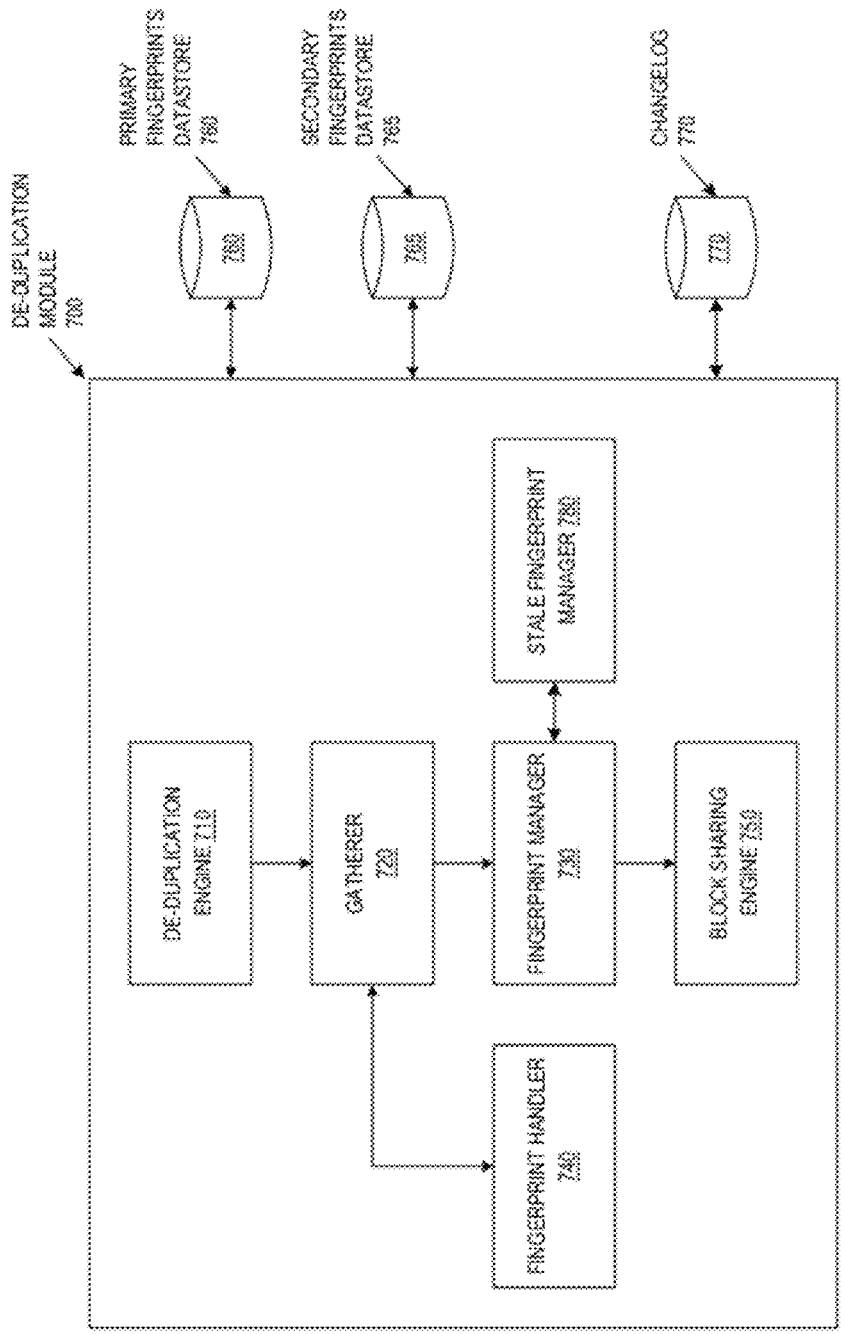
FIG. 7 is a block diagram showing elements of a de-duplication module coupled to a primary fingerprints datastore (FPDS) and a secondary FPDS, according to certain embodiments.

FIG. 7 illustrates the elements of a de-duplication module 700 (e.g., de-duplication module 390 in FIG. 3) coupled to a primary FPDS 760 and a secondary FPDS 765, according to certain embodiments. The elements include a de-duplication engine 710, a gatherer module 720, a fingerprint manager 730, a fingerprint handler 740, a block sharing engine 750, and a stale fingerprint manager 780. The de-duplication module 700 can be coupled to a fingerprints datastore that stores fingerprints of data blocks that have been written to storage (e.g., storage 170A,B in FIG. 1A).

Conventional de-duplication solutions include a single, significantly large, FPDS. Therefore, during a de-duplication operation when the FPDS is sorted and merged with a sorted changelog to identify potential duplicate data blocks, there is a significant time taken to sort the large FPDS. According to certain embodiments, a FPDS is improved by dividing it into more than one datastore (e.g., a primary datastore and a secondary datastore) to reduce the overall time taken to identify potential duplicate blocks. Another embodiment of an improved FPDS includes a FPDS that is organized into segments as described in conjunction with FIGS. 11A-11B.

When de-duplication runs for the first time on a flexible volume with existing data, the de-duplication 700 module scans the blocks in the flexible volume and creates a fingerprints datastore (FPDS), which contains a sorted list of all fingerprints for used blocks in the flexible volume, according to some embodiments. The FPDS can store an entry (e.g. fingerprint record) for each data block that is written to the storage.

In one embodiment, the fingerprint manager 730 divides and manages the fingerprints datastore as multiple datastores, such as a primary fingerprints datastore 760 and a secondary fingerprints datastore 765. A primary FPDS 760 contains an entry (e.g., fingerprint record) for each unique fingerprint value. A secondary FPDS 765 contains fingerprints entries that have the same fingerprint value as an entry (e.g., record) in the primary FPDS 760. Unlike conventional de-duplication solutions, the sorted primary FPDS 760 is significantly smaller by storing entries for only unique fingerprints and the entries in this smaller datastore is merged with the entries in a changelog to reduce the overall time taken to identify potential duplicate blocks.

The de-duplication engine 710 schedules and triggers operations of the other modules. In particular, the de-duplication engine 710 triggers operation of the gatherer module 720, which may be done according to a pre-specified schedule, timing algorithm, or in response to a manual input. The de-duplication engine 710 can detect a request to start a de-duplication operation (e.g., sis start command) and start a de-duplication operation. For example, the de-duplication engine 710 invokes the gatherer module 720. In one embodiment where a verify operation is currently in progress, the de-duplication engine 710 detects a de-duplication start request and notify the stale fingerprint manager 780. One embodiment for invoking a de-duplication operation and performing a verify operation in the background is described in detail in conjunction with FIGS. 19-20.

When de-duplication runs for the first time, the gatherer module 720 identifies each data block that has been written to storage (e.g., storage 170A,B in FIG. 1A) and triggers the fingerprint handler 740 to compute fingerprints for the data blocks and return them to the gatherer module 720. In one embodiment, the gatherer module 720 operates as an initial scanner and also as a scanner for subsequent de-duplication operations. In another embodiment, the gatherer module 720 operates as an initial scanner and a de-duplication scanner (not shown) identifies new data blocks that are written to storage in subsequent de-duplication operations. The fingerprint handler 740 is responsible for computing the fingerprints of data blocks. In certain embodiments, the fingerprint handler 740 calculates a checksum, such as an MD5 checksum, to compute a fingerprint. One embodiment of a method for computing the fingerprints of data blocks is described in greater detail in conjunction with FIG. 21.

The fingerprint manager 730 receives the fingerprints of the data blocks that have been written to storage (e.g., storage 170A,B in FIG. 1A) from the gatherer module 720 and stores an entry (e.g., a fingerprint record) for each data block that is written to the storage in a FPDS. The fingerprint manager 730 divides and manages the fingerprints datastore as multiple datastores, such as a primary fingerprints datastore 760 and a secondary fingerprints datastore 765. One embodiment for dividing a FPDS into a primary datastore and a secondary datastore, described in greater detail in conjunction with FIGS. 8A-8B. The fingerprint manager 730 creates an entry for each data block that has been written to storage. In one embodiment, an entry can include, and is not limited to, the fingerprint of the block, the inode number of the file to which the block belongs, and the FBN (file block number) of the block. In one embodiment, the fingerprint manager 730 sorts the entries in the FPDS (e.g., primary FPDS 760, secondary FPDS 765) by fingerprint value. One embodiment of a sorting process, described in greater detail in conjunction with FIG. 22.

The gatherer module 720 also identifies new data blocks that are written or updated in storage and triggers the fingerprint handler 740 to compute fingerprints of the new data blocks and return them to the gatherer module 720. In certain embodiments, the fingerprint manager 730 also maintains a changelog file (e.g., changelog 770) that is coupled to the de-duplication module 700 for identifying blocks that are new or modified since the last time the process of FIG. 4C was executed.

When new data blocks are written or updated in a file system, the fingerprint manager 730 logs an entry (e.g., fingerprint record) into the changelog 770. In one embodiment, the changelog 770 contains information of the same type as the fingerprints datastore (e.g., primary FPDS 760, secondary FPDS 765) (i.e., fingerprint of the block, inode number of the file to which the block belongs, and the FBN of the block), but only for new or modified blocks. In one embodiment, the fingerprint manager 730 sorts the entries the changelog 770, for example, by fingerprint value.

The fingerprint manager 730 detects subsequent de-duplication start requests (e.g., sis start commands) and re-executes a sorting process on the entries in a FPDS (e.g., primary FPDS 760) and the changelog 770 by fingerprint value. The fingerprint manager 730 merges entries in a sorted FPDS (e.g., primary FPDS 760) with entries in a sorted changelog 770 to identify potentially duplicate data blocks, by finding entries with matching fingerprints.

The block sharing engine 750 is responsible for comparing potentially duplicate data blocks identified by the fingerprint manager 730 to each other to identify actual duplicate data blocks. The blocks represented by any entries which have identical fingerprints are considered to be potential duplicate blocks, rather than actual duplicates, since there is always a possibility that two non-identical blocks could have the same fingerprint, regardless of the fingerprint scheme being used. The block sharing engine 750 also eliminates the actual duplicate data blocks and implements block sharing by calling functions of a file system (e.g., file system 360 in FIG. 3). Eliminating the duplicate data blocks can include sharing the remaining instance of each data block that was duplicated and freeing the (no longer used) duplicate data block(s). For performance reasons, multiple block share operations may be ongoing at any given time. One embodiment of a method for eliminating a data block, such as a duplicate block, is described in greater detail in conjunction with FIG. 23.

In some embodiments, the fingerprint manager 730 writes the fingerprint entries that correspond to the eliminated actual duplicate data blocks to a third datastore (e.g., file) and overwrites the primary FPDS 760 with the fingerprint entries that correspond to the unique data blocks to create an updated primary FPDS. The updated primary FPDS can be used for a verify operation to identify and remove stale fingerprint entries that correspond to eliminated data blocks and/or for a subsequent de-duplication operation.

The stale fingerprint manager 780 performs a verify operation to identify and remove 'stale' fingerprint entries from a fingerprints datastore (e.g., primary datastore 760), according to one embodiment. In another embodiment, the stale fingerprint manager 780 removes stale fingerprints during a subsequent de-duplication operation. A stale entry (e.g., stale fingerprint record) is an entry that has a fingerprint that corresponds to a data block that has been eliminated (deleted or overwritten) by the block sharing engine 750. The fingerprint manager 730 saves context information in the fingerprints entries (e.g., entries in the primary FPDS 760, secondary FPDS 765, and any changelogs 770) for each block, such as the value of a consistency point counter at the time the block was written to a storage device (e.g., disk). The stale fingerprint manager 780 uses the context information to detect and delete stale fingerprint entries from the fingerprints datastore (e.g., primary datastore 760). Entries having higher consistency point counter values are more recent than entries with lower consistency point counter values. In one embodiment, the stale fingerprint manager 780 identifies fingerprint entries having the same <inode, fbn> as other entries, but with lower consistency point counter values compared to the other entries, as stale fingerprint entries. In another embodiment, the stale fingerprint manager 780 identifies fingerprint entries having the same <vvbn> as other entries, but with lower consistency point counter values compared to the other entries, as stale fingerprint entries. The unidentified entries are stale free fingerprint entries. Complementary to this functionality, information on the deleted files and/or blocks in the deletion code path is also logged and used to clean up stale entries. Embodiments for identifying and removing stale fingerprint entries are described in greater detail in conjunction with FIGS. 15-20.

Figure 8A:
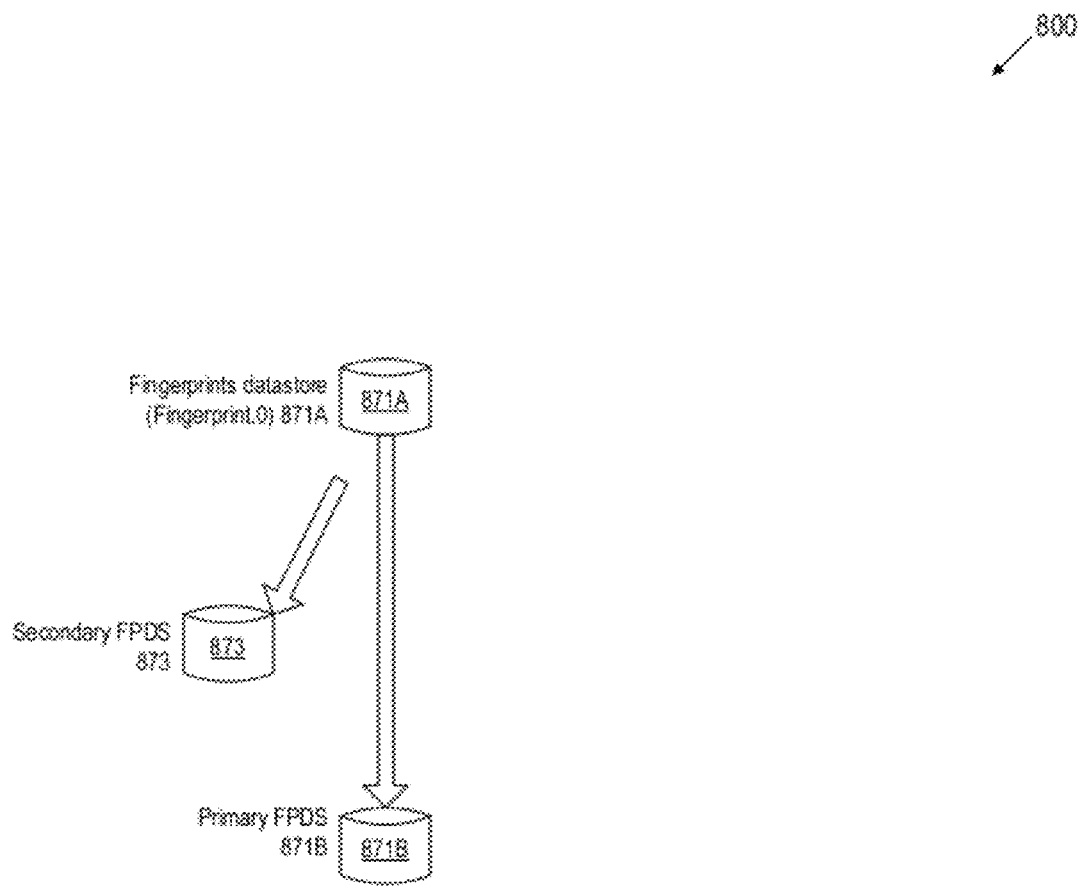
FIG. 8A is a block diagram for dividing a FPDS into a primary fingerprints datastore and a secondary fingerprints datastore, according to certain embodiments.

FIG. 8A is a block diagram 800 of a fingerprints datastore (FPDS) 871A that is divided into a primary fingerprints datastore 871B and a secondary fingerprints datastore 873, according to certain embodiments. The entries in the FPDS 871A are sorted, for example, by fingerprint, to identify entries that have the same fingerprint values. These entries correspond to data blocks that are potentially duplicate data blocks. The entries pertaining to the potential duplicate data blocks are further analyzed to identify actual duplicate data blocks. The fingerprint entries that correspond to the actual duplicate data blocks are written to a secondary datastore (e.g., a secondary file) to create a secondary FPDS 873. The old fingerprints FPDS 871A is overwritten with the fingerprint entries that correspond to the unique fingerprints to create the primary FPDS 871B. The entries in the primary FPDS 871B can be sorted by fingerprint.

Figure 8B:
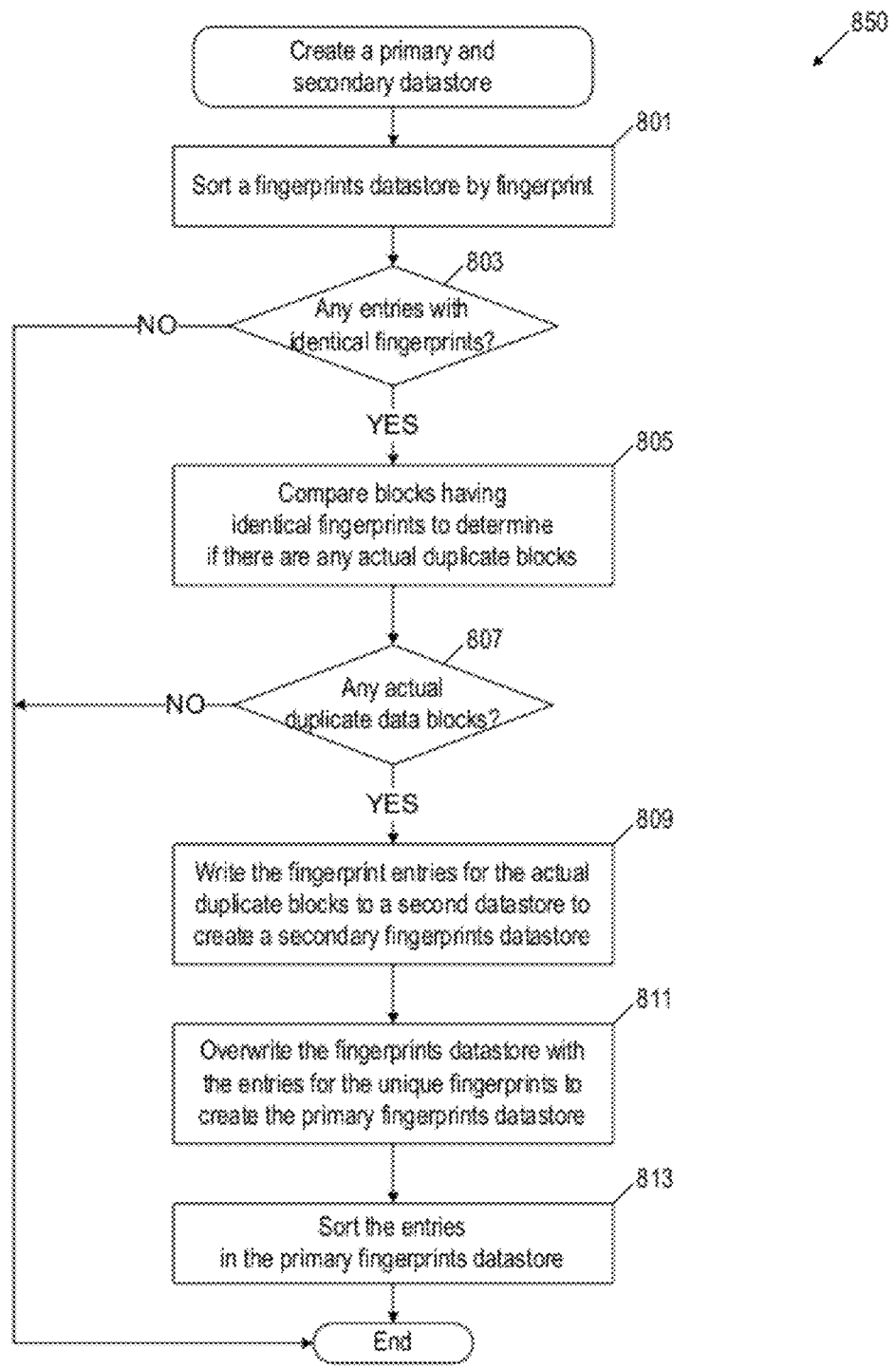
FIG. 8B is a flow diagram of a method for creating a primary and a secondary datastore, according to certain embodiments.

FIG. 8B is a flow diagram of the method 850 for creating a primary and a secondary datastore, according to certain embodiments. The flow diagram corresponds to block diagram 800 in FIG. 8A. Method 800 can be performed by processing logic that can comprise hardware (e.g., circuitry, dedicated logic, programmable logic, microcode, etc.), software (e.g., instructions run on a processing device), or a combination thereof. In one embodiment, method 850 is performed by a de-duplication module (e.g., de-duplication module 390 in FIG. 3) hosted by storage servers 110 of FIG. 1A.

At instruction block 801, the method sorts the entries in a fingerprints datastore (e.g., fingerprint.0 871A), for example, by fingerprint. Sorting the fingerprints datastore is optional but allows faster identification of duplicate data blocks, since the entries for any duplicate data block will reside adjacent to each other in the fingerprints datastore after the sort operation (e.g., by fingerprint value) is complete. One embodiment of a method sorting fingerprints is described in greater detail in conjunction with FIG. 22.

At instruction block 803, the method determines whether there are any fingerprint entries having identical fingerprint values and identifies these entries as entries that correspond to potential duplicate data blocks. The blocks represented by any entries which have identical fingerprints are considered to be potential duplicate blocks, rather than actual duplicates, since there is always a possibility that two non-identical blocks could have the same fingerprint, regardless of the fingerprint scheme being used. If there are entries that have identical fingerprint values (instruction block 803), the method compares the data blocks corresponding to these entries to determine whether any of the data blocks are actual duplicate data blocks at instruction block 805. The method can perform a byte-by-byte comparison of the potentially duplicate data blocks to determine whether the data blocks are actually identical. In an alternative embodiment, instruction block 805 could be eliminated if an approximate verification of comparing fingerprints is deemed sufficient in determining that two blocks are identical.

If there are actual duplicate data blocks, the method writes the fingerprint entries that correspond to the actual duplicate data blocks to a second datastore (e.g., a secondary file) to create a secondary fingerprints datastore (e.g., secondary FPDS 873) at instruction block 809. At instruction block 811, the method overwrites the existing fingerprints datastore (e.g., fingerprint.0 871A) with the entries corresponding to the unique fingerprints to create a primary fingerprints datastore (e.g., primary FPDS 871B). In one embodiment, the method sorts the entries in the primary fingerprints datastore 871B, for example, by fingerprint, at instruction block 813.

Figure 9A:
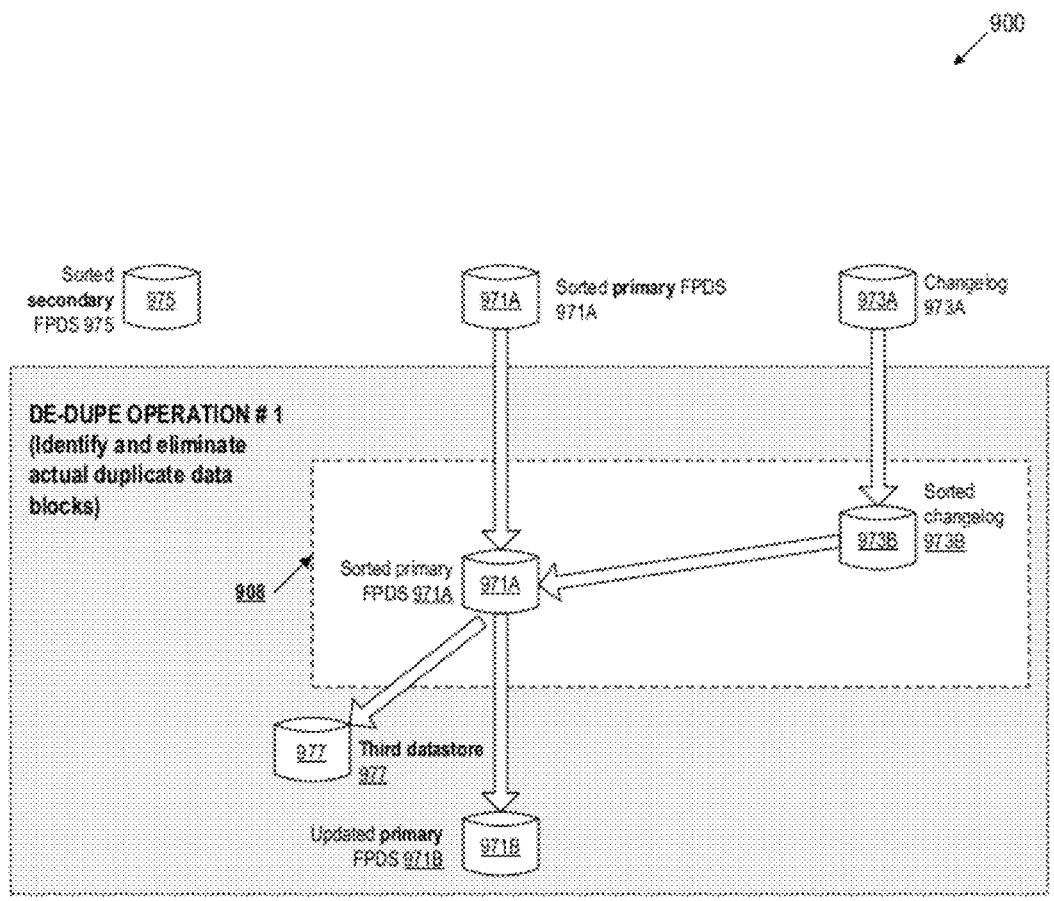
FIG. 9A is a block diagram for de-duplication using a primary and a secondary datastore, according to certain embodiments.

FIG. 9A is a block diagram 900 for de-duplication (e.g., identifying and removing fingerprint entries corresponding to duplicate data blocks) using a primary fingerprints datastore and a secondary fingerprints datastore, according to certain embodiments. One embodiment creates and updates a sorted primary FPDS 971A and a sorted secondary FPDS 975. A primary FPDS 971A contains an entry (e.g., fingerprint record) for each unique fingerprint value. A secondary FPDS 975 contains fingerprints entries that have the same fingerprint value as an entry (e.g., record) in the primary FPDS 971A. In one embodiment, the secondary FPDS 975 can be a segmented datastore, as described in conjunction with FIG. 11A, and maintained in a sorted order (e.g., by <inode,fbn>). In one embodiment, an entry can include, and is not limited to, the fingerprint of the block, the inode number of the file to which the block belongs, and the FBN (file block number) of the block. In certain embodiments, each fingerprint is a checksum, such as an MD5 checksum.

When new data blocks are written or updated in a file system, a storage server creates and logs new fingerprint entries into a changelog file 973A. In one embodiment, the changelog 973A contains information of the same type as the fingerprints datastore (e.g., primary FPDS 971A and secondary FPDS 975) (i.e., fingerprint of the block, inode number of the file to which the block belongs, and the FBN of the block), but only for new or modified blocks. The changelog 973A is sorted when a de-duplication start request (e.g., start sis command) is detected.

The sorted changelog 973B is merged in-memory with the sorted primary FPDS 971A to identify potential duplicate data blocks. Unlike conventional de-duplication solutions, the sorted primary FPDS 971A is significantly smaller by storing only entries having unique fingerprint values. Therefore, an in-memory merge of the sorted changelog 973B with a smaller FPDS (e.g., primary FPDS 971A), at reference 908, reduces the overall time taken to identify potential duplicate blocks. An in-memory merge of data refers to merging data temporary in memory. An on-disk merge of data refers to writing merged data to a storage device (e.g., disk).

The potential duplicate data blocks are further analyzed to identify the actual duplicate data blocks. The fingerprint entries that correspond to the eliminated actual duplicate data blocks are written to a third datastore (e.g., file) 977. The primary FPDS 971A is overwritten with the fingerprint entries that correspond to the unique fingerprints to create an updated primary FPDS 971B. Subsequently, during a verify operation to identify and remove the fingerprint entries that correspond to the eliminated actual duplicate data blocks (stale fingerprint entries), the third datastore 977 is merged with the sorted secondary FPDS 975, which is then merged with the updated primary FPDS 971B to identify and remove stale fingerprint entries. One embodiment of a method for identifying and removing fingerprint entries, which correspond to duplicate data blocks, using a primary fingerprints datastore and a secondary fingerprints datastore is described in greater detail in conjunction with FIGS. 17A-17B.

Figure 9B:
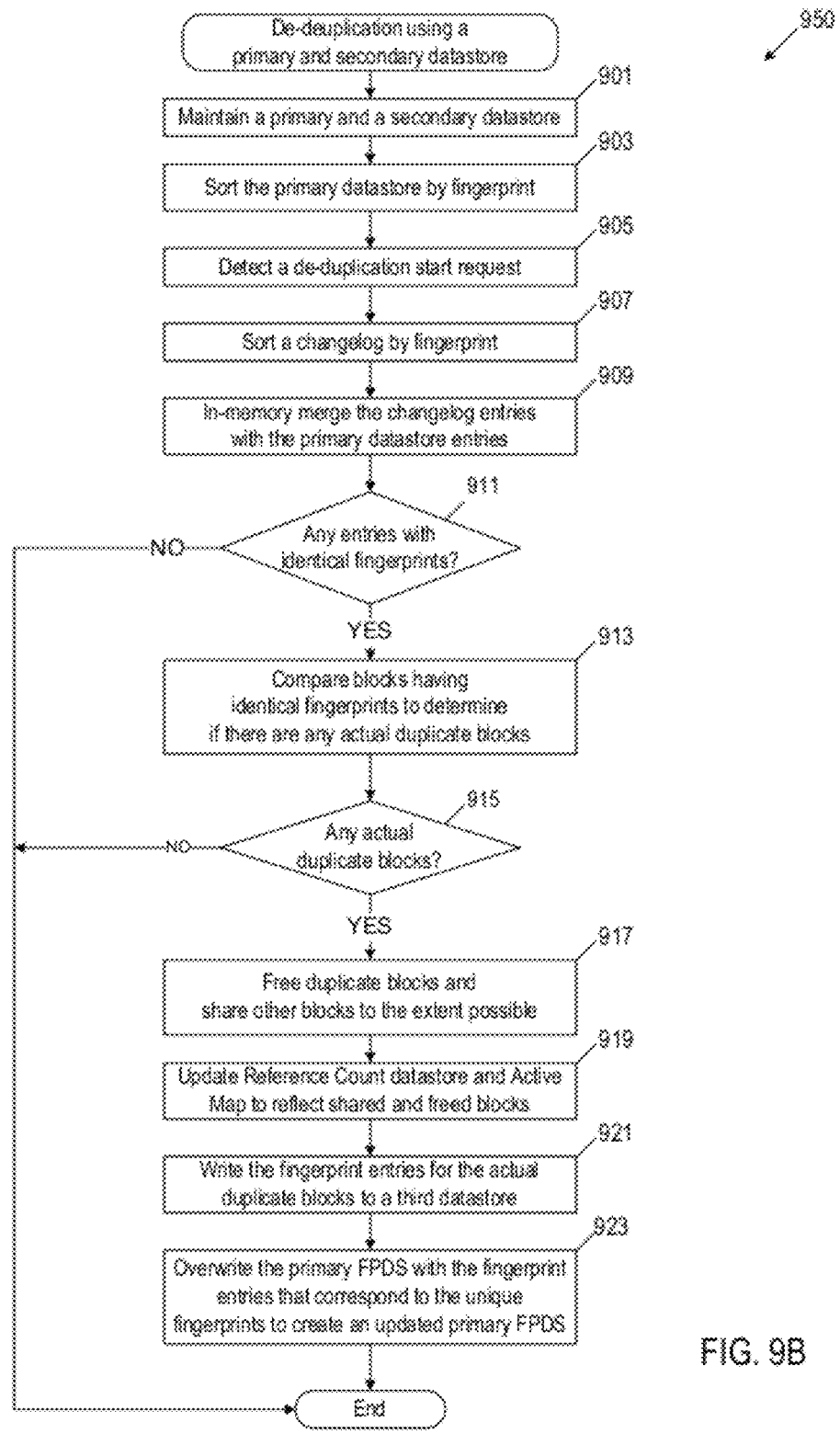
FIG. 9B is a flow diagram of a method for de-duplication using a primary and a secondary datastore, according to certain embodiments.

FIG. 9B is a flow diagram of a method 950 for de-duplication (e.g., identifying and removing fingerprint entries corresponding to duplicate data blocks) using a primary fingerprints datastore and a secondary fingerprints datastore, according to certain embodiments. The flow diagram corresponds to block diagram 900 in FIG. 9A. Method 950 can be performed by processing logic that can comprise hardware (e.g., circuitry, dedicated logic, programmable logic, microcode, etc.), software (e.g., instructions run on a processing device), or a combination thereof. In one embodiment, method 900 is performed by a de-duplication module (e.g., de-duplication module 390 in FIG. 3) hosted by storage servers 110 of FIG. 1A.

According to one embodiment, a fingerprints datastore is divided into multiple datastores, such as a primary FPDS and a secondary FPDS. A primary datastore stores a single entry (e.g., record) for each fingerprint value, and thus is smaller than a conventional fingerprints datastore. A secondary fingerprints datastore stores the remaining entries, such as the entries that have the same fingerprint value as an entry in the primary FPDS. In one embodiment, the secondary FPDS 975 can be a segmented datastore, as described in conjunction with FIG. 11A, and maintained in a sorted order (e.g., by <inode,fbn>). At instruction block 901, the method maintains a primary FPDS (e.g., primary FPDS 971A) and a secondary FPDS (e.g., secondary FPDS 975) and sorts the primary FPDS 971A and the secondary FPDS 975 at instruction block 903.

At instruction block 905, the method detects a de-duplication operation start request (e.g., sis start command) and sorts a changelog (e.g., changelog 973A) by fingerprint at step 907. At instruction block 909, the method merges the sorted changelog 973B with the sorted primary FPDS 971A to identify potential duplicate data blocks at instruction block 911. As noted above, unlike conventional de-duplication solutions, the sorted primary FPDS 971A is significantly smaller by storing only entries having unique fingerprint values. Therefore, merging the sorted changelog 973B with a smaller FPDS (e.g., primary FPDS 971A reduces the overall time taken to identify potential duplicate blocks.

If there are entries that have identical fingerprint values (step 911), the method performs a byte-to-byte comparison of the data blocks that correspond to the entries that have identical fingerprint values to identify data blocks that are actual duplicate data blocks at instruction block 913. If there are any data blocks that are actual duplicate data blocks (instruction block 915), the method eliminates the actual duplicate data blocks are eliminated at instruction block 917. Eliminating the duplicate data blocks can include sharing the remaining instance of each data block that was duplicated and freeing the (no longer used) duplicate data block(s). The method frees the duplicate block or blocks so that only one instance remains of each unique block, and shares the remaining instance of the block to the extent possible. The method then updates a reference count file and an active map at instruction block 919 to reflect the newly shared and freed blocks. One embodiment of a method for eliminating a data block, such as a duplicate block, is described in greater detail in conjunction with FIG. 23.

At instruction block 921, the method writes the fingerprint entries that correspond to the eliminated actual duplicate data blocks to a third datastore 977 (e.g., file) and overwrites the primary FPDS (e.g., primary FPDS 971A) with the fingerprint entries that correspond to the unique fingerprints to create an updated primary FPDS (e.g., primary FPDS 971B) at instruction block 923. In one embodiment, the method determines whether the entire primary FPDS 971A has been examined. If the entire primary FPDS 971A has not been examined, the method returns to instruction block 911 to identify entries that have identical fingerprints, until the primary FPDS 971A has been examined.

Figure 10:
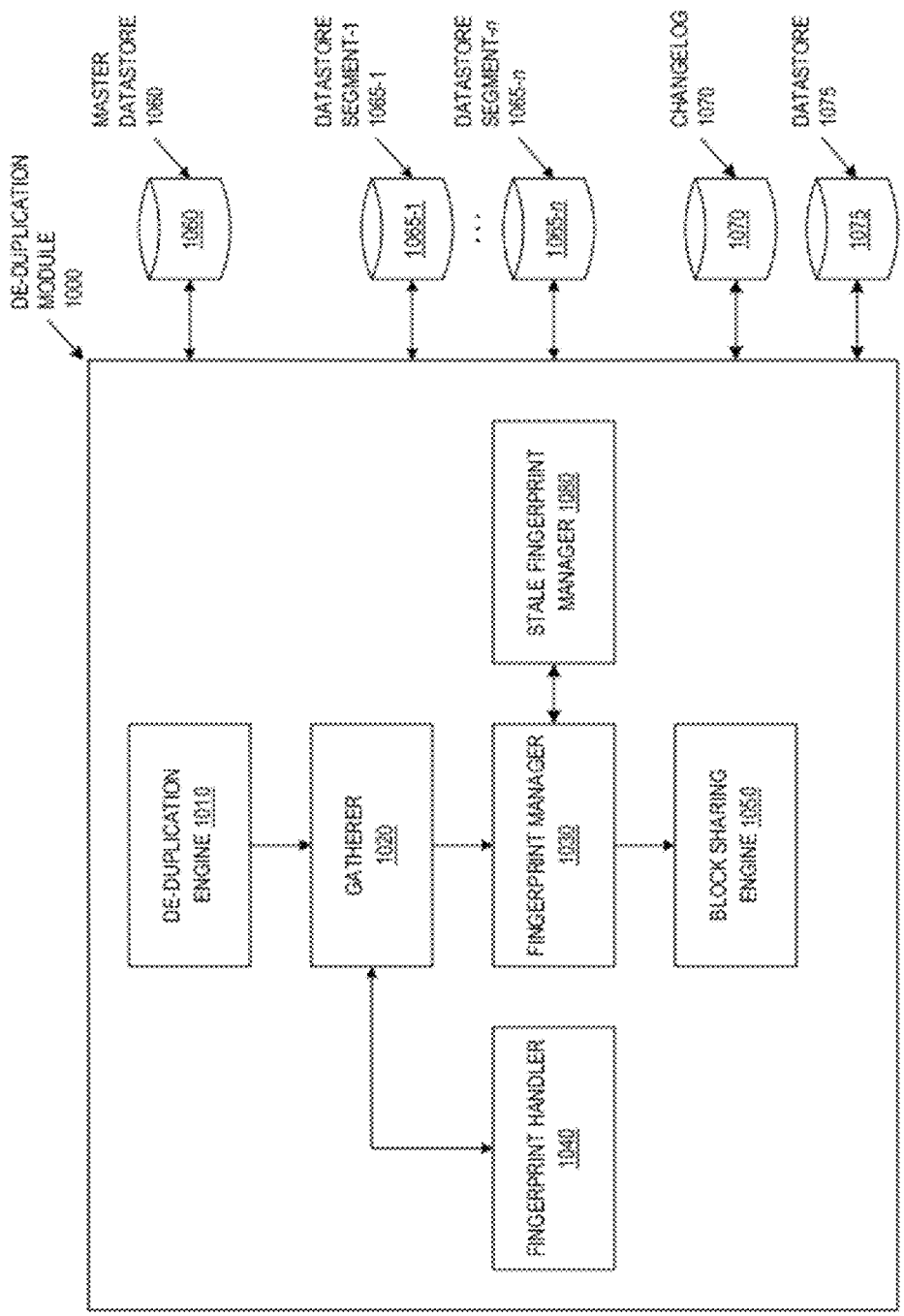
FIG. 10 is a block diagram showing elements of a de-duplication module coupled to a segmented fingerprints datastore, according to certain embodiments.

FIG. 10 illustrates the elements of a de-duplication module 1000 (e.g., de-duplication module 390 in FIG. 3) coupled to a segmented fingerprints datastore, according to certain embodiments. The elements include a de-duplication engine 1010, a gatherer module 1020, a fingerprint manager 1030, a fingerprint handler 1040, a block sharing engine 1050, and a stale fingerprint manager 1080. The de-duplication module 1000 can be coupled to a fingerprints datastore that stores the fingerprints of all data blocks that have been written to storage (e.g., storage 170A,B in FIG. 1A).

When de-duplication runs for the first time on a flexible volume with existing data, the de-duplication 1000 module scans the blocks in the flexible volume and creates a fingerprints datastore (FPDS), which contains a sorted list of all fingerprints for used blocks in the flexible volume, according to some embodiments. The FPDS can store an entry (e.g., fingerprint record) for each data block that is written to the storage.

Conventional de-duplication solutions include a single, significantly large, FPDS that has a flat file structure. With a flat file structure, the FPDS is overwritten with every de-duplication operation. During every de-duplication operation, the entries in a changelog are merged with the entries in the FPDS, and the old FPDS is overwritten with the merged entries. Therefore, traditional implementations incur a significant cost in overwriting the entire FPDS with every de-duplication operation, irrespective of the size of the changelog. According to certain embodiments, a FPDS is improved by organizing the FPDS as a master datastore and datastore segments to avoid overwriting an entire FPDS with every de-duplication operation.

In one embodiment, the fingerprint manager 1030 organizes a FPDS as multiple segments, such as a master fingerprints datastore 1060 and datastore segments 1 to n (1065-1 to 1065-*n*). A master FPDS 1060 stores an entry (e.g., fingerprint record) for each data block that is written to the storage (e.g., storage 170A,B in FIG. 1A). In one embodiment, an entry can include, and is not limited to, the fingerprint of the block, the inode number of the file to which the block belongs, and the FBN (file block number) of the block. A datastore segment contains information of the same type as the fingerprints datastore (e.g., master FPDS 1060) (i.e., fingerprint of the block, inode number of the file to which the block belongs, and the FBN of the block), but only for new and modified data blocks written to the storage (e.g., storage 170A,B in FIG. 1A). Unlike conventional de-duplication solutions, the master fingerprints datastore 1060 is not overwritten with every de-duplication operation, but the overwriting is delayed until a verify operation is performed or until a threshold for the number of FPDS segments is reached.

The de-duplication engine 1010 schedules and triggers operations of the other modules. In particular, the de-duplication engine 1010 triggers operation of the gatherer module 1020, which may be done according to a pre-specified schedule, timing algorithm, or in response to a manual input. The de-duplication engine 1010 detects a request to start a de-duplication operation (e.g., sis start command) and starts a de-duplication operation. For example, the de-duplication engine 1010 invokes the gatherer module 1020. In one embodiment where a verify operation is currently in progress, the de-duplication engine 1010 detects a de-duplication start request and notify the stale fingerprint manager 1080. One embodiment for invoking a de-duplication operation and performing a verify operation in the background is described in detail in conjunction with FIGS. 19-20.

When de-duplication runs for the first time, the gatherer module 1020 identifies each data block that has been written to storage (e.g., storage 170A,B in FIG. 1A) and triggers the fingerprint handler 1040 to compute fingerprints for the data blocks and return them to the gatherer module 1020. The fingerprint manager 1030 receives the fingerprints from the gatherer module 1020 and stores an entry (e.g., a fingerprint record) for each data block that is written to the storage in a FPDS (e.g., master FPDS 1060). The fingerprint manager 1030 creates an entry (e.g., fingerprint record) for each data block that has been written to storage. The fingerprint manager 1030 sorts the entries in the FPDS (e.g., master FPDS 1060), for example, by fingerprint value. One embodiment of a sorting process, described in greater detail in conjunction with FIG. 22.

The gatherer module 1020 also identifies new data blocks that are written or updated in storage (e.g., storage 170A,B in FIG. 1A) and triggers the fingerprint handler 1040 to compute fingerprints of the new data blocks and return them to the gatherer module 1020. When new data blocks are written or updated in a file system, the fingerprint manager 1030 creates and logs an entry (e.g., fingerprint record) into the changelog 1070. In one embodiment, the changelog 1070 contains information of the same type as the fingerprints datastore (e.g., master FPDS 1060) (i.e., fingerprint of the block, inode number of the file to which the block belongs, and the FBN of the block), but only for new or modified blocks. The fingerprint manager 1030 sorts the entries the changelog 1070, for example, by fingerprint value.

The fingerprint manager 1030 identifies entries in a sorted FPDS that have matching fingerprints to identify potentially duplicate data blocks and eliminate the duplicate data blocks. Eliminating the duplicate data blocks includes sharing the remaining instance of each data block that was duplicated and freeing the (no longer used) duplicate data block(s). For example, the fingerprint manager 1030 detects a de-duplication start request (e.g., sis start command) and sort the entries in the FPDS to identify potentially duplicate data blocks for and eliminate the duplicate data blocks. The fingerprint manager 1030 also detects subsequent de-duplication start requests (e.g., sis start commands) and re-executes a sorting process on the entries in a FPDS (e.g., master FPDS 1060) and the changelog 1070 by fingerprint value to identify potential duplicate data blocks.

In some embodiments, the fingerprint manager 1030 first determines whether the FPDS (e.g., master FPDS 1060) meets a threshold (e.g., number of fingerprint entries) and if the FPDS meets a threshold, the fingerprint manager 1030 writes the fingerprint entries in the sorted changelog 1070 to a new datastore segment, hereinafter referred to as a 'fingerprints datastore (FPDS) segment', 'fingerprints segment', or 'segment' (e.g., segments 1065-1). The fingerprint manager 1030 sorts the entries in a segment, for example, by fingerprint value.

The fingerprint manager 1030 merges the entries in a sorted FPDS (e.g., master FPDS 1060) with entries in the existing sorted segment (e.g., segment 1065-1) to identify potentially duplicate data blocks, by finding entries with matching fingerprints. Typically, a fingerprints datastore is overwritten with the merged data with each de-duplication operation. Unlike conventional de-duplication solutions, the master FPDS 1060 is not overwritten with every de-duplication operation, but the overwriting is delayed until a verify operation is performed or until a threshold for the number of FPDS segments is reached.

With each subsequent de-duplication operation, the fingerprint manager 1030 writes the entries in a changelog file to a new FPDS segment (e.g., segment 1065-n), until a threshold for a segment count threshold for a number of FPDS segments is reached or a verify operation is to be performed by the stale fingerprint manager 1080.

When the segment count threshold is reached or when the stale fingerprint manager 1080 is triggered to perform a verify operation, the fingerprint manager 1030 merges the fingerprint entries in the sorted changelog 1070, the entries in all of the FPDS segments (e.g., 1065-1 to 1065A-n), and the entries in the master FPDS 1060 and overwrites the old master FPDS 1060 with the merged data to create a new master FPDS in aggregate. The fingerprint manager 1030 can use the data in the new master FPDS for a verify operation to identify and remove stale fingerprint entries that correspond to eliminated data blocks and/or for a subsequent de-duplication operation.

The block sharing engine 1050 compares potentially duplicate data blocks identified by the fingerprint manager 1030 to each other to identify actual duplicate data blocks. The block sharing engine 1050 can also eliminate the actual duplicate data blocks and implement block sharing by calling functions of a file system (e.g., file system 310 in FIG. 3). One embodiment of a method for eliminating a data block, such as a duplicate block, is described in greater detail in conjunction with FIG. 23.

The stale fingerprint manager 1080 performs a verify operation to identify and remove 'stale' fingerprint entries from a fingerprints datastore (e.g., a new master FPDS in aggregate), according to one embodiment. In another embodiment, the stale fingerprint manager 1080 removes stale fingerprints during a subsequent de-duplication operation. A stale entry (e.g., stale fingerprint record) is an entry that has a fingerprint that corresponds to a data block that has been eliminated (deleted or overwritten) by the block sharing engine 1050. The stale fingerprint manager 1080 detects a request to perform a verify operation. For example, the stale fingerprint manage 1080 detects a verify operation is triggered when a number of stale entries in a FPDS reaches or exceeds a stale entries threshold. In another example, a verify operation is triggered from a CLI. In another example, a verify operation is user-driven, for example, by the de-duplication module receiving instructions entered by a user via a command line interface.

The fingerprint manager 1030 saves context information in the fingerprints entries (e.g., entries in the master FPDS 1060, all segments 1065-1 to 1065-n, and any changelogs 1070) for each block, such as the value of a consistency point counter at the time the block was written to a storage device (e.g., disk). The stale fingerprint manager 1080 can use the context information to detect and delete stale fingerprint entries from the fingerprints datastore (e.g., a new master FPDS in aggregate). Entries having higher consistency point counter values are more recent than entries with lower consistency point counter values. The stale fingerprint manager 1080 identifies fingerprint entries having the same fingerprint values as other entries, but with lower consistency point counter values compared to the other entries, as stale fingerprint entries. The unidentified entries are stale free fingerprint entries. Embodiments of a method for identifying and removing stale fingerprint entries is described in greater detail in conjunction with FIGS. 16-20.

Figure 11A:
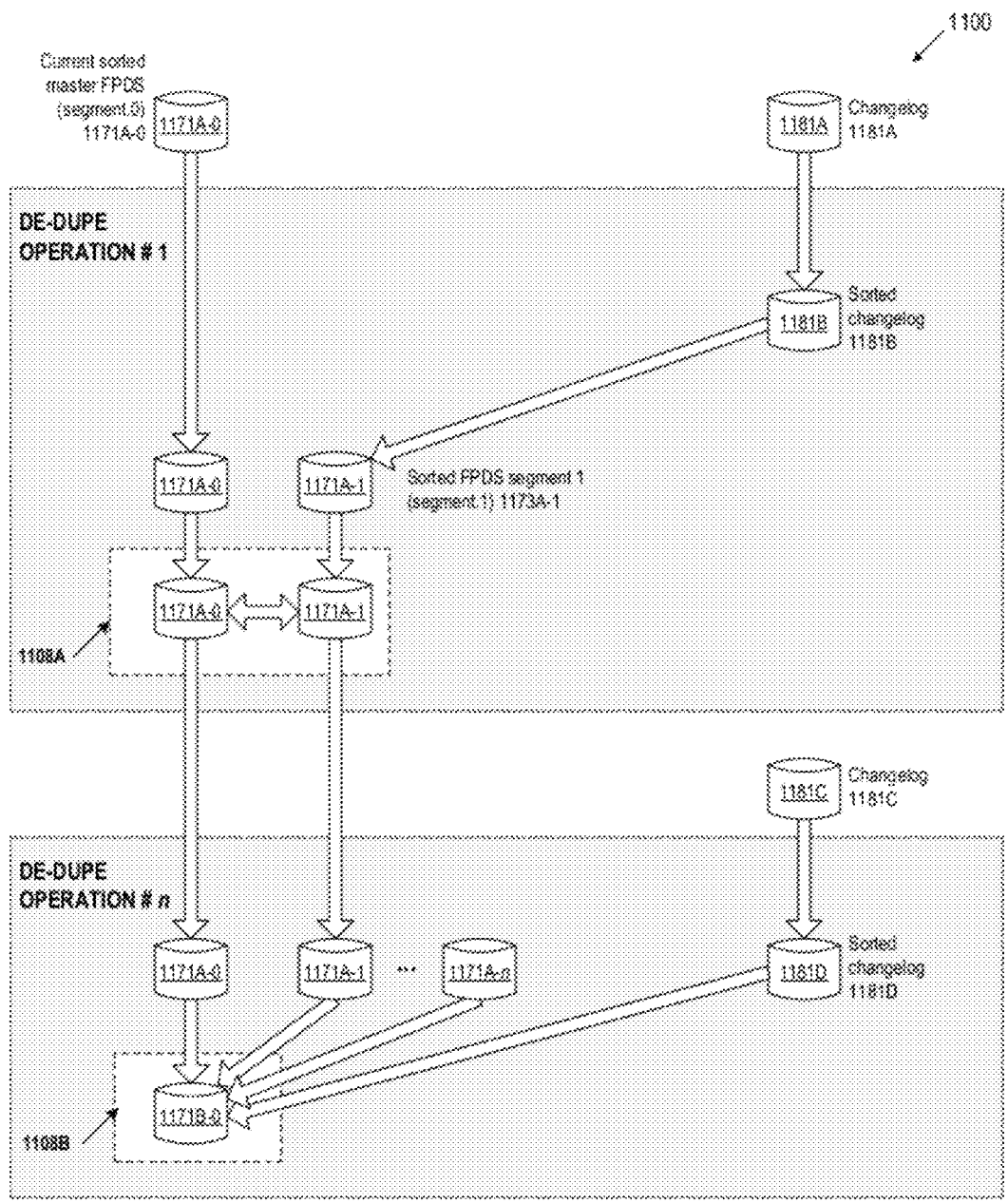
FIGS. 11A-11B are diagrams for identifying and removing fingerprint entries corresponding to duplicate data blocks using a segmented fingerprints datastore, according to certain embodiments.

FIG. 11A is a block diagram 1100 for de-duplication (e.g., identifying and removing fingerprint records corresponding to duplicate data blocks) using a segmented fingerprints datastore, according to certain embodiments. One embodiment maintains a sorted master FPDS (master datastore) 1171A-0 (e.g., segment.0). A master FPDS 1171A-0 contains an entry (e.g., a fingerprint record) for each data block that is written to a storage device (e.g., file system). When new data blocks are written or updated in a file system, a storage server creates and logs new entries (e.g., fingerprint records) into a changelog file 1181A. The changelog 1181A is sorted when a de-duplication start request (e.g., start sis command) is detected. When the master FPDS 1171A-0 meets a master datastore threshold (e.g., a threshold for a number of fingerprint entries in the master datastore), the fingerprint entries in the sorted changelog 1181B are written to a new datastore segment (e.g., segment 1171A-1). The original master FPDS 1171A-0 remains sorted and is maintained as is. In every de-duplication operation, the de-duplication performs an in-memory merge of all of the segments (including the master FPDS (e.g., segment.0) to identify potential duplicate blocks. An in-memory merge of data refers to merging data temporary in memory. An on-disk merge of data refers to writing merged data to a storage device (e.g., disk). For example, there is one segment segment.1 1171A-1 and the entries in segment.1 1171A-0 are merged in-memory with the entries in the sorted master FPDS 1171A-0 to identify and eliminate duplicate data blocks. Unlike conventional de-duplication solutions which overwrite an entire fingerprints datastore with each de-duplication operation, the original master FPDS 1171A-0 remains sorted and is maintained as is, as seen at reference 1108A. The original master FPDS 1171A-0 is not overwritten with every de-duplication operation because the de-duplication performs an in-memory merge to identify potential duplicate blocks. Thus, de-duplication is improved to reduce the write cost by delaying the overwriting (on-disk merge) of the master FPDS 1171A-0 until a verify operation is to be performed or until a threshold for a threshold for a number of FPDS segments is reached.

With each subsequent de-duplication operation, the entries in a changelog file 1181C are written to a FPDS segment, unless a threshold for a segment count threshold is reached or until a verify operation is to be performed. For example, after n de-duplication operations, there can be n FPDS segments (1171A-1 to 1171A-n). During a subsequent de-duplication operation (e.g., de-dupe operation # n), a changelog 1181C is sorted when a de-duplication start request (e.g., start sis command) is detected. When the threshold for the number of FPDS segments is reached, the fingerprint entries in the sorted changelog 1181D, the entries in all of the FPDS segments (e.g., 1171A-1 to 1171A-n), and the entries in the master FPDS 1171A-0 are merged on-disk, thus, overwriting the old master FPDS 1171A-0 with the on-disk merged data to create a master FPDS 1171B-0 in aggregate. The master FPDS 1171B-0 in aggregate can be used to identify and eliminate duplicate data blocks.

Figure 11B:
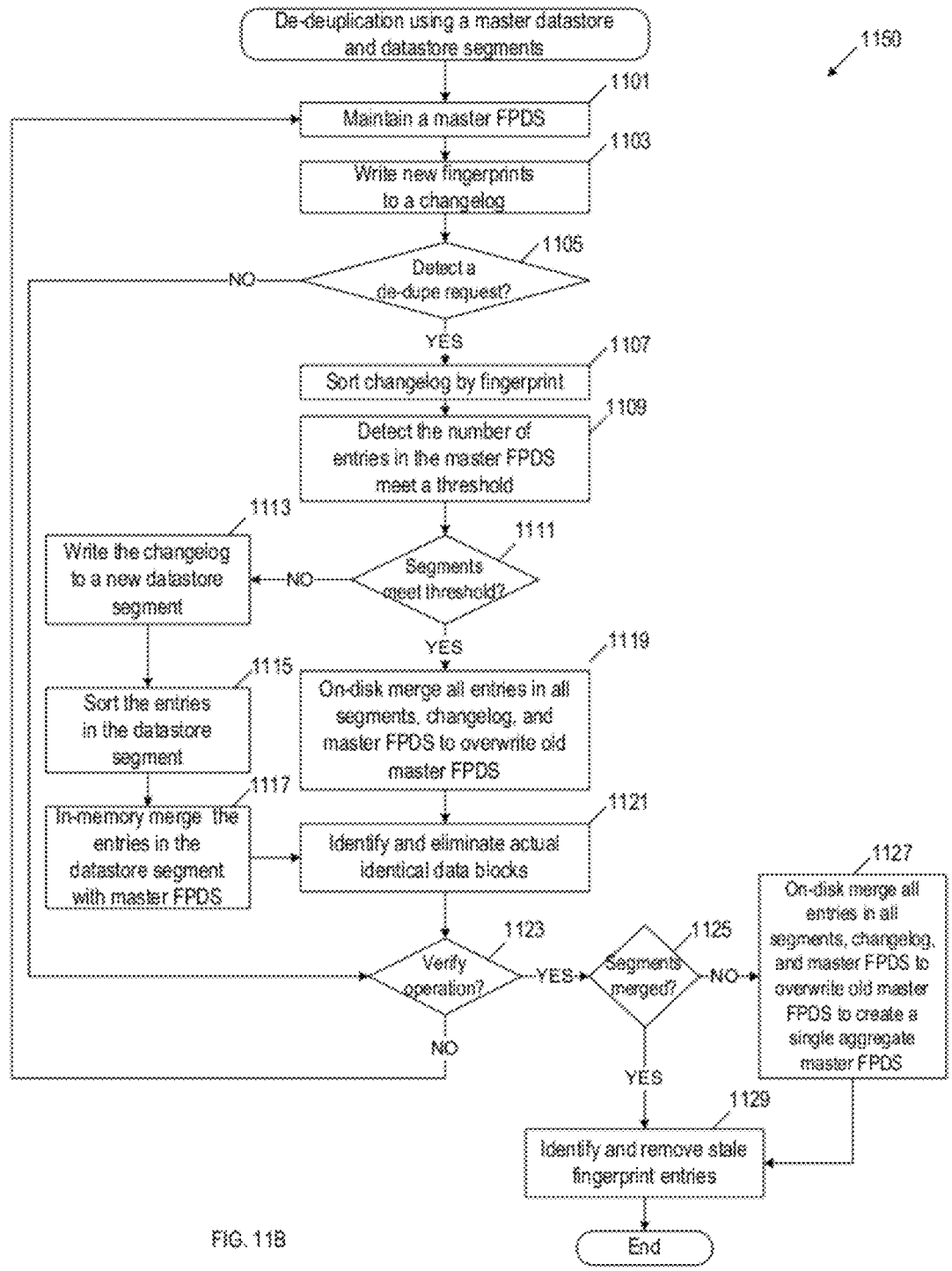

FIG. 11B is a flow diagram of a method 1150 for de-duplication (e.g., identifying and removing fingerprint entries corresponding to duplicate data blocks) using a segmented fingerprints datastore (FPDS), according to certain embodiments. The flow diagram corresponds to block diagram 1100 in FIG. 11A. Method 1150 can be performed by processing logic that can comprise hardware (e.g., circuitry, dedicated logic, programmable logic, microcode, etc.), software (e.g., instructions run on a processing device), or a combination thereof. In one embodiment, method 1150 is performed by a de-duplication module (e.g., de-duplication module 390 in FIG. 3) hosted by storage servers 110 of FIG. 1A.

At instruction block 1101, according to one embodiment, a FPDS is organized and maintained as a segmented datastore, such as a master FPDS 1171A-0 and FPDS segments 1171A-1 to 1171A-n. A master FPDS 1171A-0 datastore stores an entry (e.g., a fingerprint record) for each data block that is written to a file system. A datastore segment stores fingerprints entries for new and modified data blocks written to storage (e.g., storage 170A,B in FIG. 1A).

At instruction block 1103, when new data blocks are written or updated in a file system, the method creates and logs new fingerprint entries into a changelog file 1181A. At instruction block 1105, the method determines whether there is a de-duplication start request. For example, the method detects a sis start command. If there is not a de-duplication start request (instruction block 1105), the method determines whether there is a request for a verify operation to be performed at instruction block 1123. If there is not a verify operation to be performed (instruction block 1123), the method returns to instruction block 1101 to maintain a sorted master datastore.

If a de-duplication start request is detected (instruction block 1105), the method sorts the entries in the changelog 1181A, for example, by fingerprint value at instruction block 1107. At instruction block 1109, the method determines whether the current number of entries in the master datastore meets a master datastore threshold. In one embodiment, the method overwrites the master FPDS 1171A-0 with every de-duplication operation until a master datastore threshold is reached. A master datastore threshold can be a user-defined threshold and can be stored as a parameter, for example in a data store (e.g., data store 1075 in FIG. 10). For example, the master datastore threshold is a comparator (e.g., less than, less than or equal to, greater than, greater than or equal to, etc.) and a number of entries.

At instruction block 1109, if the master datastore threshold is reached (e.g., a threshold for a number of fingerprint entries in the master datastore), the method determines whether the current number of segments meets a segment count threshold at instruction block 1111. The segment count threshold can be comparator (e.g., less than, less than or equal to, greater than, greater than or equal to, etc.) and a number of segments. The segment count threshold can be a user-defined threshold and can be stored as a parameter, for example in a data store (e.g., data store 1075 in FIG. 10). For example, the segment count threshold is less than or equal to a value of 40.

If the segment count threshold (e.g., 40 segments) has been met (instruction block 1111), the method performs an on-disk merge of the fingerprint entries in the sorted changelog 1181D, the entries in all existing the FPDS segments (e.g., 1171A-1 to 1171A-n), and the entries in the master FPDS 1171A-0, and overwrites the old master FPDS 1171A-0 with the on-disk merged data to create a master FPDS 1171B-0 in aggregate at instruction block 1119. The master FPDS 1171B-0 in aggregate can be used to identify and eliminate duplicate data blocks at instruction block 1121.

If the segment count threshold has not been reached (instruction block 1111), the method writes the fingerprint entries in a sorted changelog to a new datastore segment, referred to as a FPDS segment or segment at instruction block 1113. The original master FPDS remains sorted and is maintained as is. In one embodiment, where changelogs do not meet a changelog threshold, the method appends the fingerprint entries in a sorted changelog to the last FPDS segment, if the last segment size is less than a segment size threshold. A changelog threshold can be a user-defined threshold and can be stored as a parameter, for example in a data store (e.g., data store 1075 in FIG. 10). A segment can have a maximum segment size (e.g., 8 GB, 16 GB), also referred to as a 'segment size threshold'. Examples of a segment size threshold include, and are not limited to, a size of a file, a number of fingerprints, etc. The segment size threshold can be a user-defined threshold and can be stored as a parameter, for example in a data store (e.g., data store 1075 in FIG. 10). The segment size threshold can be determined from a change rate (e.g., 2% change rate) and a size of a volume (e.g., 16 TB volume size). For example, the segment size threshold is 8 GB.

At instruction block 1115, the method sorts the entries in the segment 1171A-1 by fingerprint value and performs an in-memory merge of the entries in the segment 1171A-1 with the entries in the sorted master FPDS 1171A-0 at instruction block 1117 to identify and eliminate duplicate data blocks at instruction block 1121.

At instruction block 1123, the method determines whether there is a request for a verify operation to be performed. If there is not a verify operation to be performed, the method returns to instruction block 1101 to maintain a sorted master datastore. A verify operation (identification and removal of stale fingerprint entries) can be automatically triggered when a number of stale entries in a FPDS reaches or exceeds a stale entries threshold. In another example, a verify operation is triggered from a CLI. In another example, a verify operation is user-driven, for example, by the method detecting instructions entered by a user via a command line interface. If there is a request for a verify operation (instruction block 1123), the method determines whether all of the segments, the changelog, and the old master FPDS 1171A-0 have already been merged on-disk and the old master FPDS 1171A-0 has been overwritten with the on-disk merged data to create a master FPDS 1171B-0 in aggregate at instruction block 1125.

If the a master FPDS in aggregate 1171B-0 has not been created (instruction block 1125), the method performs an on-disk merge of the fingerprint entries in the sorted changelog 1181D, the entries in all of the existing FPDS segments (e.g., 1171A-1 to 1171A-n), and the entries in the master FPDS 1171A-0, and overwrites the old master FPDS 1171A-0 with the on-disk merged data to create a master FPDS 1171B-0 in aggregate at instruction block 1125. The master FPDS 1171B-0 in aggregate can be used for the verify operation (to identify and eliminate stale fingerprint entries) at instruction block 1127. Embodiments of methods for identifying and removing stale fingerprint entries is described in greater detail in conjunction with FIGS. 16-20.

Figure 12:
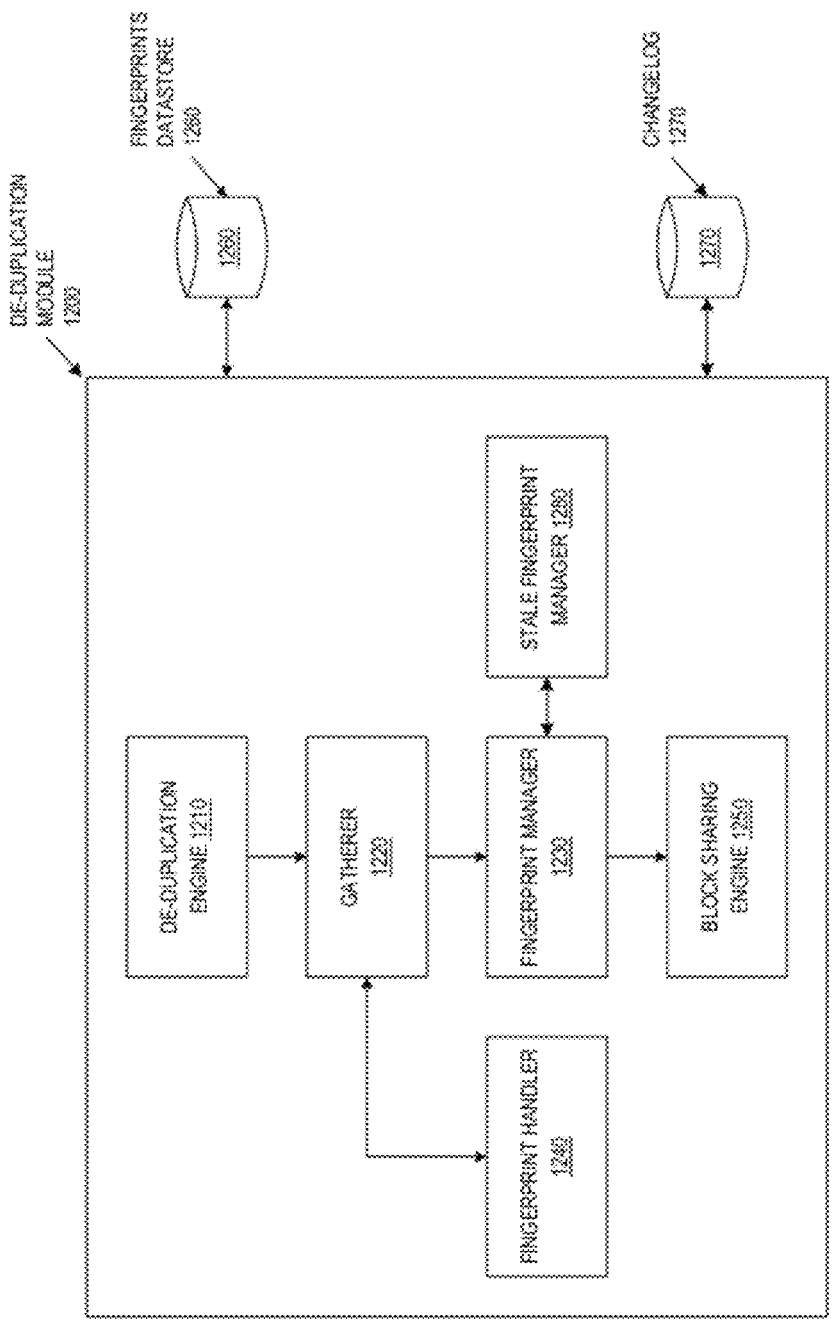
FIG. 12 is a block diagram showing elements of a de-duplication module for referring to a data block in a volume using a virtual volume block number (VVBN), according to certain embodiments.

FIG. 12 illustrates the elements of a de-duplication module 1200 (e.g., de-duplication module 390 in FIG. 3) for addressing a data block in a volume using a virtual volume block number (VVBN), according to certain embodiments. The elements include a de-duplication engine 1210, a gatherer module 1220, a fingerprint manager 1230, a fingerprint handler 1240, a block sharing engine 1250, and a stale fingerprint manager 1280. The de-duplication module 1200 can be coupled to a fingerprints datastore that stores the fingerprints of all data blocks that have been written to storage (e.g., storage 170A,B in FIG. 1A).

Conventional de-duplication solutions refer to a data block in a volume using fingerprint entries that contain logical data, such as an inode and file block number (e.g., <inode, fbn>). Since, these traditional solutions refer to each block logically, a fingerprints datastore (FPDS) needs to store each reference to one physical block. Storing fingerprint entries for each logical block adds overhead to a de-duplication operation and does not allow a FPDS to scale easily with increases in shared data in a volume.

Figure 13:
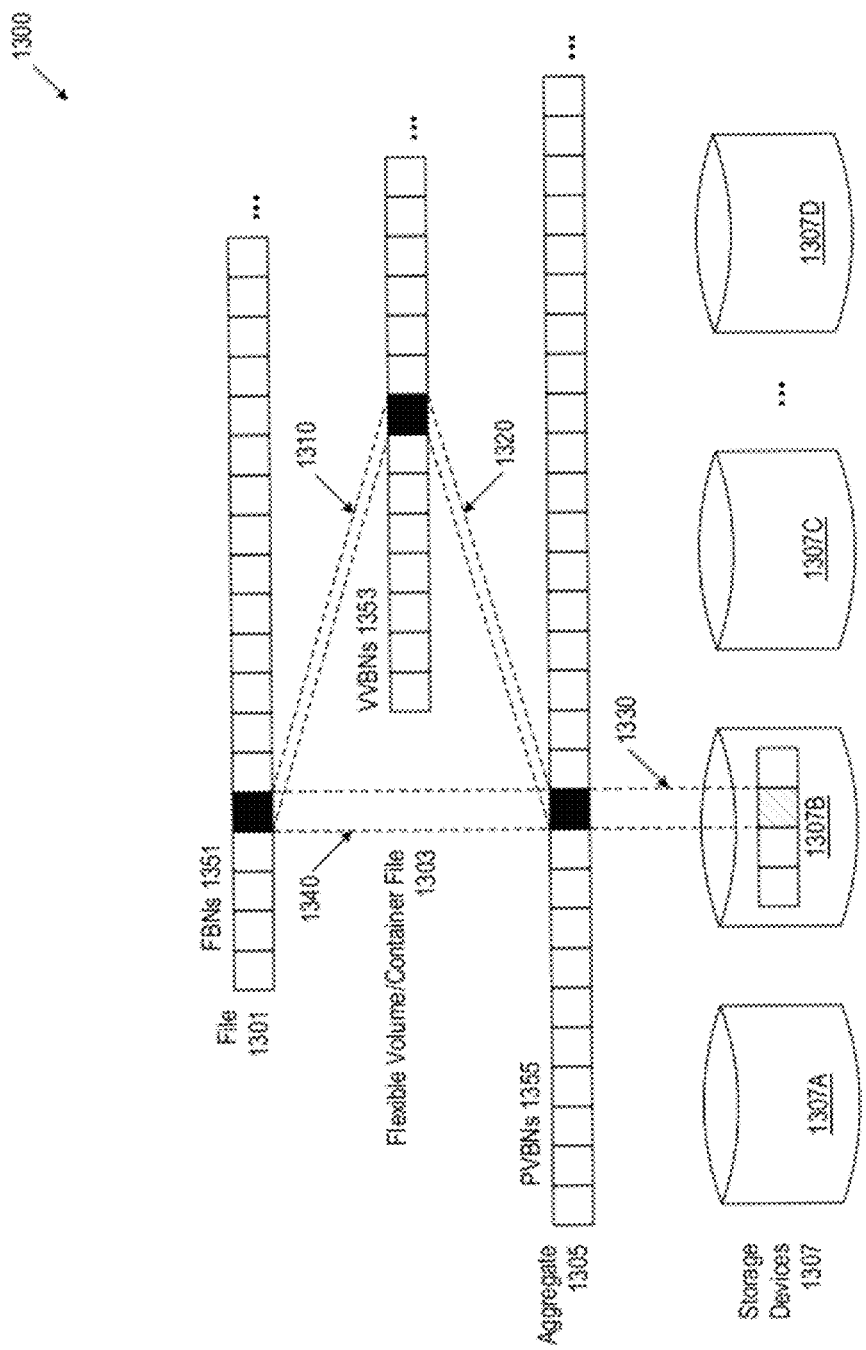
FIG. 13 is a block diagram of mapping a data block from a file to a storage device (e.g., disk), according to certain embodiments.

According to certain embodiments, a FPDS 1260 is improved by referencing a data block in a volume uniquely using a virtual volume block number (VVBN) instead of using <inode,fbn>. By using a VVBN to refer to a data block, a FPDS can more easily scale with increased block sharing. FIG. 13 illustrates a block diagram of mapping 1300 a data block from a file 1301 to a storage device 1307B (e.g., disks), according to certain embodiments. Mapping 1300 illustrates a single block 1309 as part of several logical and physical storage containers—a file 1301, a container file 1303 holding a flexible volume, an aggregate 1305, and a storage device 1307B. Each provides an array of blocks indexed by the appropriate type of block number. The file 1301 is indexed by file block number (FBN) 1351, the container file 1303 by virtual volume block number (VVBN) 1353, and the aggregate 1305 by physical volume block number (PVBN) 1355. The storage devices (e.g., disks) 1307 are indexed by disk block number (DBN) 1357.

To translate an FBN 1351 to a disk block, a file system, such as WAFL, goes through several steps. At reference 1310, the file system uses the file's 1301 inode and buffer tree to translate the FBN 1351 to a VVBN 1353. At reference 1320, the file system translates the VVBN 1353 to a PVBN 1355 using the container file's 1303 inode and buffer tree. At reference 1330, RAID translates the PVBN 1355 to a DBN 1357. At reference 1340, the file system can use an alternative shortened method provided by dual VBNs to bypasses the container map's VVBN-to-PVBN translation. A file system can store PVBNs 1355 in the file's buffer tree to bypass the container map's VVBN-to-PVBN translation.

Returning to FIG. 12, when de-duplication runs for the first time on a flexible volume with existing data, the de-duplication 1200 module scans the blocks in the flexible volume and creates a FPDS 1260, which contains a sorted list of all fingerprints for used blocks in the flexible volume, according to some embodiments. In one embodiment, the FPDS 1260 stores an entry (e.g., fingerprint record) for each data block that is written to the storage (e.g., storage 170A,B in FIG. 1A). One embodiment for dividing a FPDS into multiple parts, such as a primary datastore and a secondary datastore, is described in greater detail in conjunction with FIGS. 9A-9B. Another embodiment for organizing a FPDS into segments is described in greater detail in conjunction with FIGS. 11A-11B.

The de-duplication engine 1210 schedules and triggers operations of the other modules. In particular, the de-duplication engine 1210 triggers operation of the gatherer module 1220, which may be done according to a pre-specified schedule, timing algorithm, or in response to a manual input. The de-duplication engine 1210 detects a request to start a de-duplication operation (e.g., sis start command) and starts a de-duplication operation. For example, the de-duplication engine 1210 invokes the gatherer module 1220. In one embodiment where a verify operation is currently in progress, the de-duplication engine 1210 detects a de-duplication start request and notifies the stale fingerprint manager 1280. One embodiment for invoking a de-duplication operation and performing a verify operation in the background is described in detail in conjunction with FIGS. 19-20.

The gatherer module 1220 identifies each data block that has been written to storage (e.g., storage 170A,B in FIG. 1A) and triggers the fingerprint handler 1240 to compute fingerprints (e.g., a checksum) for the data blocks and return them to the gatherer module 1220. The fingerprint manager 1230 receives the fingerprints of the data block that has been written to storage from the gatherer module 1220 and creates and stores an entry (e.g., fingerprint record) for each data block that is written to the storage (e.g., storage 170A,B in FIG. 1A) in a FPDS 1260.

Typically, an entry in a FPDS can include, and is not limited to, the fingerprint of the block ('fp'), context information, such as, the value of a consistency point counter (e.g., a generation time stamp ('cp-cnt')) at the time the block was written to a storage device (e.g., disk), and logical data, such as the inode number of the file to which the block belongs ('inode') and the FBN (file block number) of the block ('fbn'). According to certain embodiments, an entry (e.g., fingerprint record) is improved by including, and is not limited to, the fingerprint of the block ('fp'), context information, such as, the value of a consistency point counter (e.g., a generation time stamp ('cp-cnt')) at the time the block was written to a storage device (e.g., disk), and physical data, such as a container file identifier ('Container-FileID') and the VVBN (virtual volume block number) of the block ('vvbn'). The FPDS 1260 reduces to a map file that can be indexed by VVBN, according to certain embodiments. Instead of using an inode and FBN 1351 to refer to a block 1309 in a volume, the de-duplication module 1200 can use VVBN 1353 to refer to a block 1309.

The gatherer module 1220 also identifies new data blocks that are written or updated in storage (e.g., storage 170A,B in FIG. 1A) and triggers the fingerprint handler 1240 to compute fingerprints of the new data blocks and return them to the gatherer module 1220. The fingerprint manager 1230 creates and stores fingerprint entries for the new data blocks in a changelog file (e.g., changelog 1270) that is coupled to the de-duplication module 1200.

Typically, a conventional changelog contains information of the same type as a FPDS (i.e., fp, inode, FBN), but only for new or modified blocks. A new or modified data block includes data blocks that written or updated in storage (e.g., storage 170A,B in FIG. 1A) since a last de-duplication operation. According to certain embodiments, the fingerprint manager 1230 creates and stores fingerprint entries in a changelog 1270 that include, and are not limited to, the inode number of the file (e.g., 'inode') to which the block belongs, the FBN (file block number) of the block (e.g., 'fbn'), the VVBN (virtual volume block number) of the block (e.g., 'vvbn'), the fingerprint of the block (e.g., 'fp'), and a generation time stamp (e.g. 'cp-cnt').

The fingerprint manager 1230 detects a de-duplication start request (e.g., sis start command) and sort the entries in the FPDS 1260 and in the changelog 1270 by fingerprint value and merge the entries in the changelog 1270 with the entries in the FPDS 1260 to identify potentially duplicate data blocks.

Unlike conventional de-duplication solutions which load a potential duplicate data block using an inode and FBN (e.g., <inode, fbn>), sharing engine 1250 loads a potential duplicate data block using a VVBN, according to certain embodiments. The block sharing engine 1250 performs a byte-by-byte analysis of the loaded potentially duplicate data blocks to identify actual duplicate data blocks. The blocks represented by any entries which have identical fingerprints are considered to be potential duplicate blocks, rather than actual duplicates, since there is always a possibility that two non-identical blocks could have the same fingerprint, regardless of the fingerprint scheme being used. The block sharing engine 1250 can eliminate the actual duplicate data blocks and implement block sharing by calling functions of a file system (e.g., file system 310 in FIG. 3). Eliminating the duplicate data blocks includes sharing the remaining instance of each data block that was duplicated and freeing the (no longer used) duplicate data block(s). One embodiment of a method for eliminating a data block, such as a duplicate block, is described in greater detail in conjunction with FIG. 23.

In one embodiment, the fingerprint manager 1230 overwrites the current FPDS 1260 with the merged entries to create a new FPDS (e.g., fingerprint.next). The new FPDS can be used for a verify operation to identify and remove stale fingerprint entries that correspond to eliminated data blocks and/or for a subsequent de-duplication operation.

The stale fingerprint manager 1280 performs a verify operation to identify and remove 'stale' fingerprint entries from a FPDS 1260, according to one embodiment. In another embodiment, the stale fingerprint manager 1280 removes stale fingerprints during a subsequent de-duplication operation. A stale entry (e.g., stale fingerprint record) is an entry that has a fingerprint that corresponds to a data block that has been eliminated (deleted or overwritten) by the block sharing engine 1250. The fingerprint manager 1230 saves context information in the fingerprints entries for each block, such as the value of a consistency point counter (e.g., 'cp-cnt') at the time the block was written to a storage device (e.g., disk).

The stale fingerprint manager 1280 sorts the FPDS 1260 (e.g., fingerprint.next) by VVBN and uses the context information (e.g., 'cp-cnt') to identify stale fingerprint entries in the FPDS 1260. Sorting by VVBN ensures that only the latest copy of VVBN (one with the highest cp-cnt) is retained and all others are removed from the FPDS 1260. Entries having higher consistency point counter values are more recent than entries with lower consistency point counter values. The stale fingerprint manager 1280 identifies fingerprint entries having the same VVBN as other entries, but with lower consistency point counter values compared to the other entries, as stale fingerprint entries. The unidentified entries are stale free fingerprint entries.

The stale fingerprint manager 1280 checks the VVBN for the identified entries to check if it is valid. The stale fingerprint manager 1260 can examine an active map to ensure a VVBN is valid (ensure that a VVBN has not changed). When the stale fingerprint manager 1280 determines that a VVBN is not valid, it deletes the stale fingerprint entries from the FPDS 1260 (e.g., fingerprint.next). The stale fingerprint manager 1280 also determines whether an entry (e.g., record) is an entry having logical or physical data. An entry (e.g., fingerprint record) can include data indicating the type (e.g., physical, logical) of entry. The stale fingerprint manager 1280 also checks a 'refcount' for the VVBN to ensure that the VVBN is shared. One embodiment of a method of identifying and removing stale fingerprint entries using VVBNs is described in greater detail in conjunction with FIG. 18. Complementary to this functionality, information on the deleted files and/or blocks in the deletion code path is also logged and used to clean up stale entries.

Figure 14A:
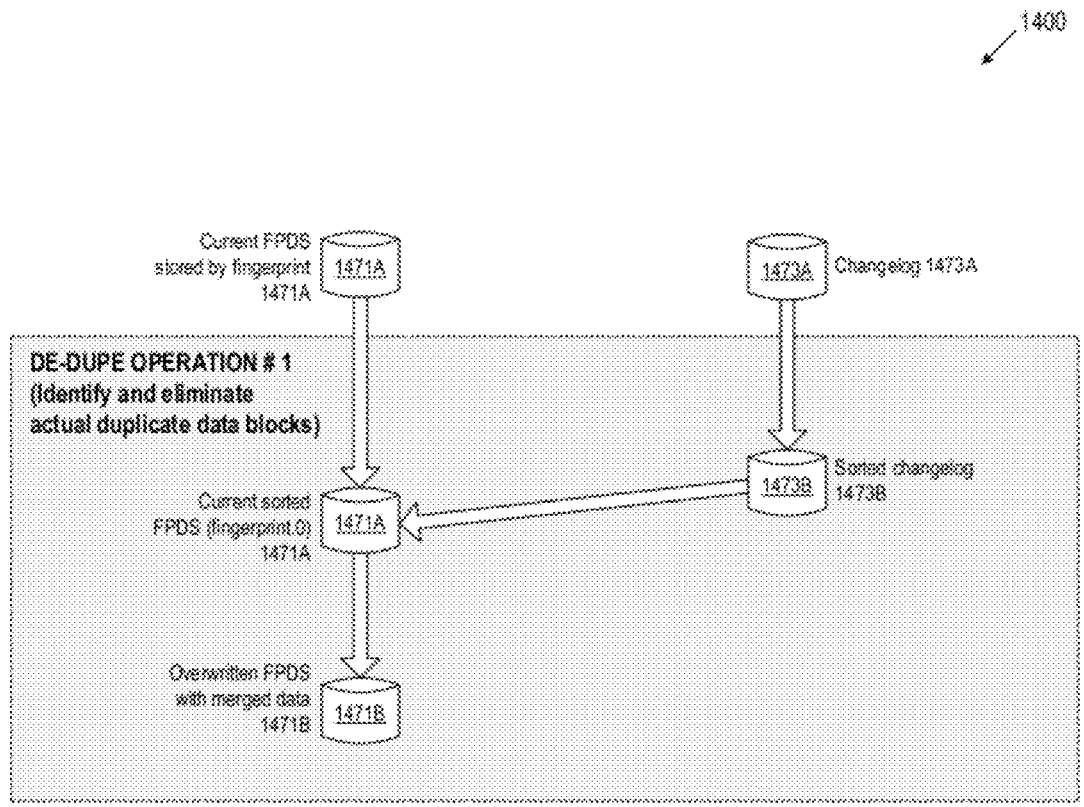
FIGS. 14A-14B are diagrams for addressing a data block in a volume using a virtual volume block number (VVBN), according to certain embodiments.

FIG. 14A is a block diagram 1400 for addressing a data block in a volume using a virtual volume block number (VVBN), according to certain embodiments. A storage server is coupled to storage (e.g., storage 170A,B in FIG. 1A) storing data blocks of data, and generates a fingerprint for each data block in the storage. The storage server creates a fingerprints datastore (FPDS) that stores an entry (e.g., fingerprint record) for each data block that has been written to storage. In one embodiment, the FPDS stores an entry for each unique fingerprint. One embodiment of a FPDS that is divided into multiple parts, such as a primary datastore and a secondary datastore, is described in greater detail in conjunction with FIGS. 9A-9B. Another embodiment of a FPDS that is organized into segments is described in greater detail in conjunction with FIGS. 11A-11B.

A fingerprints datastore 1471A stores an entry (e.g., fingerprint record) for each data block that is written to storage (e.g., storage 170A,B in FIG. 1A). According to certain embodiments, an entry can include, and is not limited to, a container file identifier (e.g., 'Container-FileID'), the fingerprint of the block (e.g., 'fp'), the VVBN (virtual volume block number) of the block (e.g., 'vvbn'), and a generation time stamp (e.g. 'cp-cnt'). The entries in the FPDS 1471A are sorted by fingerprint value.

A changelog 1473A stores fingerprint entries for new or modified blocks. A new or modified data block includes data blocks that written or updated in storage since a last de-duplication operation. According to certain embodiments, an entry (e.g., fingerprint record) in a changelog 1473 can include, and is not limited to, the inode number of the file (e.g., 'inode') to which the block belongs, the FBN (file block number) of the block (e.g., 'fbn'), the VVBN (virtual volume block number) of the block (e.g., 'vvbn'), the fingerprint of the block (e.g., 'fp'), and a generation time stamp (e.g. 'cp-cnt'). The entries in the changelog 1473A are sorted by fingerprint value.

The entries in the sorted changelog 1473B are merged with the entries in the sorted FPDS 1471A. Entries that have identical fingerprint values are identified as entries that correspond to potential duplicate data blocks. The potential duplicate data blocks are loaded. Unlike conventional de-duplication solutions which load a potential duplicate data block using an inode and FBN (e.g., <inode, fbn>), embodiments load a potential duplicate data block using a VVBN. The potential duplicate data blocks are further analyzed to identify actual duplicate data blocks and the actual duplicate blocks are eliminated. The current FPDS (e.g., FPDS 1471A) is overwritten with the merged entries to create a new FPDS. The new FPDS can be used for a verify operation to identify and remove stale fingerprint entries that correspond to eliminated data blocks and/or for a subsequent de-duplication operation.

Figure 14B:
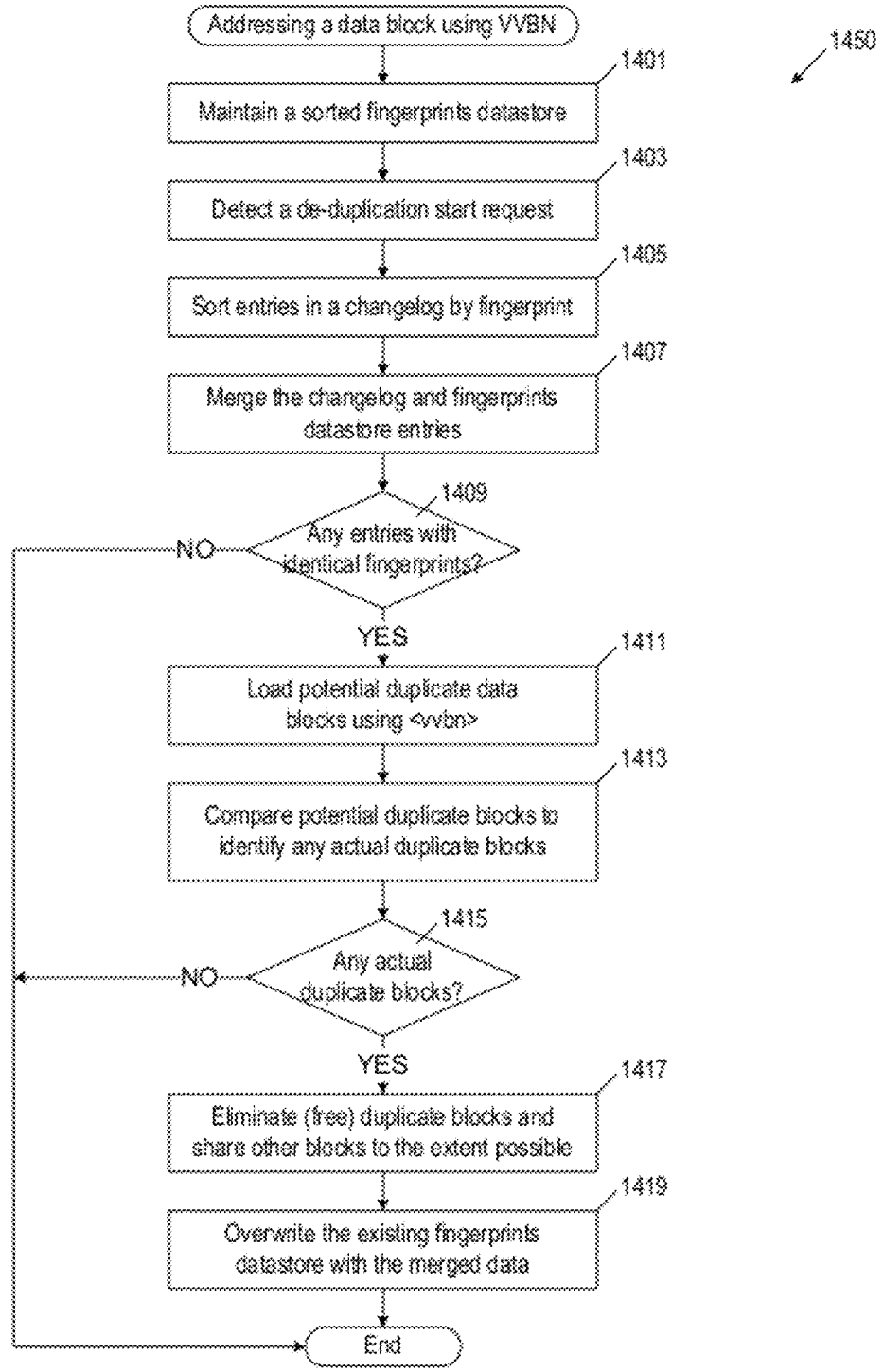

FIG. 14B is a flow diagram of a method 1450 for addressing a data block in a volume using a virtual volume block number (VVBN), according to certain embodiments. The flow diagram corresponds to block diagram 1400 in FIG. 14A. Method 1450 can be performed by processing logic that can comprise hardware (e.g., circuitry, dedicated logic, programmable logic, microcode, etc.), software (e.g., instructions run on a processing device), or a combination thereof. In one embodiment, method 1450 is performed by a de-duplication module (e.g., de-duplication module 390 in FIG. 3) hosted by storage servers 110 of FIG. 1A.

At instruction block 1401, the method maintains a sorted fingerprints data 1471A. The fingerprints datastore 1471A stores an entry (e.g., fingerprint record) for each data block that is written to storage (e.g., storage 170A,B in FIG. 1A). According to certain embodiments, an exemplary entry can include, and is not limited to, <Container-FileID, fp, cp-cnt, VVBN>. The entries can be sorted by fingerprint value for identifying potential duplicate data blocks. At instruction block 1403, the method detects a de-duplication operation start request (e.g. sis start command) and sorts the entries in a changelog 1473A, for example, by fingerprint, at instruction block 1405. At instruction block 1407, the method merges the entries in the sorted changelog 1473B with the entries in the FPDS 1471A.

At instruction block 1409, during the merging process, the method identifies potential duplicate data blocks by determining which, if any, entries in the changelog 1473A have the same fingerprint value as the entries in the FPDS 1471A. The fingerprint entries having the same fingerprint values pertain to potentially duplicate data blocks and these entries can be written to an output datastore (e.g., output file). If there are fingerprint entries that have the same fingerprint value (instruction block 1409), the method loads the potential duplicate data block using VVBN at instruction block 1411 and performs a byte-by-byte analysis to determine whether any of the loaded data blocks are actual duplicate data blocks at instruction block 1413. If there are any actual duplicate data blocks (instruction block 1415), the actual duplicate data blocks are eliminated at instruction block 1417. Eliminating the duplicate data blocks includes sharing the remaining instance of each data block that was duplicated and freeing the (no longer used) duplicate data block(s). One embodiment of a method for eliminating a data block, such as a duplicate block, is described in greater detail in conjunction with FIG. 23. At instruction block 1419, the method overwrites the existing FPDS 1471A with the merged data to create a new FPDS 1471B. The new FPDS can be used for a verify operation to identify and remove stale fingerprint entries that correspond to eliminated data blocks and/or for a subsequent de-duplication operation.

Figure 15:
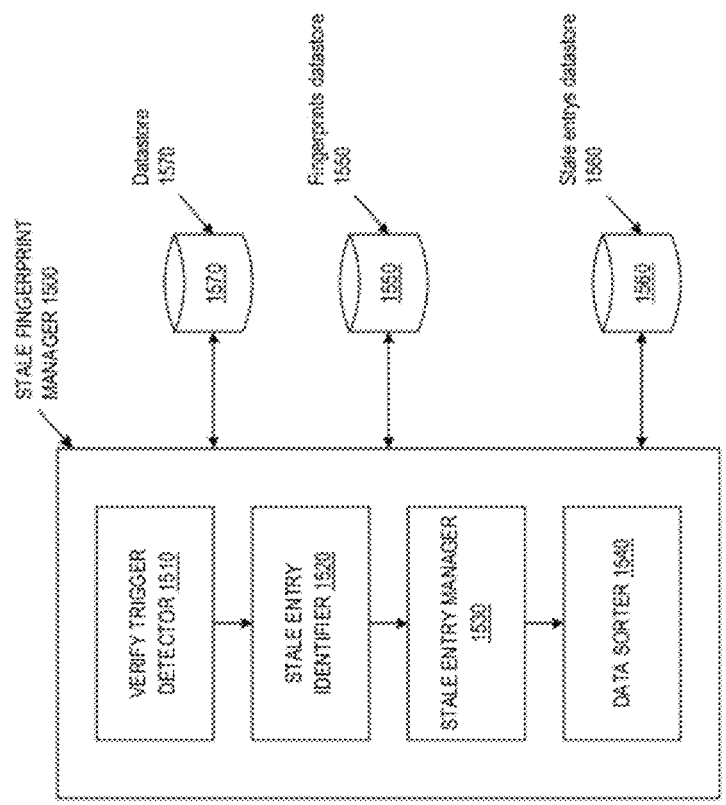
FIG. 15 is a block diagram showing elements of a stale fingerprint manager for identifying and removing stale fingerprint entries when a next de-duplication operation is invoked, according to certain embodiments.

FIG. 15 illustrates the elements of a stale fingerprint manager 1500 (e.g., stale fingerprint manager 680 in FIG. 6) for identifying and removing stale fingerprint entries when a next de-duplication operation is invoked, according to certain embodiments. The elements include a verify trigger detector 1510, a stale entry identifier 1520, a stale entry manager 1530, and a data sorter 1540.

During a first phase of a de-duplication process (a de-dupe operation), duplicate data blocks are identified and eliminated. The fingerprint entries that correspond to the eliminated duplicate data blocks and remain in a FPDS are referred to as 'stale' fingerprint entries. During a second phase of a de-duplication process (a verify operation \or verify scan), stale fingerprint entries are identified and removed from a FPDS.

Conventional implementations of a verify operation include two stages. In stage one, a trigger to invoke a verify operation is detected and the entries in the FPDS are first sorted (Sort #1) by <file identifier, block offset in a file, time stamp> (e.g., <inode, fbn, cp-cnt>) order. The verify operation checks whether any of the fingerprint entries are stale, and overwrites the existing FPDS with only the stale-free entries to create a new stale-free FPDS. In stage two, the output from stage one is sorted (Sort #2) a second time back to its original order, such as fingerprint value, inode, file block number (e.g., <fp, inode, fbn>). One problem with this conventional approach is that it sorts the FPDS twice with each verify operation. The second sort (Sort #2) during verify stage two is unnecessary to remove the stale entries. Another problem with the convention approach is that it overwrites the entire FPDS with stale-free entries, even if the number of stale entries is a small percentage of the FPDS.

One aspect a verify operation optimizes current stale entries removal by reducing the time to sort the fingerprints datastore by recording stale entry information to a separate datastore (e.g., stale entries file) which would be proportional to size of stale entries in the fingerprints datastore, rather than rewriting the entire fingerprints datastore. During a subsequent de-duplication operation, the entries in the stale entries datastore are merged with the entries in the fingerprints datastore and the stale entries are removed during a de-duplication operation when there is a full read/write of the entire fingerprints datastore. Thus, the second sort of the fingerprints datastore in a conventional solution is eliminated.

The stale fingerprint manager 1500 is coupled to a fingerprints datastore (FPDS) 1550 that stores an entry (e.g., fingerprint record) for each data block that has been written to storage (e.g., storage 170A,B in FIG. 1A). One embodiment of a FPDS that is divided into multiple parts, such as a primary datastore and a secondary datastore, is described in greater detail in conjunction with FIGS. 9A-9B. Another embodiment of a FPDS that is organized into segments is described in greater detail in conjunction with FIGS. 11A-11B.

In one embodiment, an entry can include, and is not limited to, the fingerprint of the block ('fp'), context information, such as, the value of a consistency point counter (e.g., a generation time stamp ('cp-cnt')) at the time the block was written to a storage device, and logical data, such as the inode number of the file to which the block belongs ('inode') and the FBN (file block number) of the block ('fbn'). In another embodiment, an entry (e.g., fingerprint record) can include, and is not limited to, the fingerprint of the block ('fp'), context information, such as, the value of a consistency point counter (e.g., a generation time stamp ('cp-cnt')) at the time the block was written to a storage device, and physical data, such as a container file identifier ('Container-FileID') and the VVBN (virtual volume block number) of the block ('vvbn').

A verify operation (stale entries removal operation) can be automatically triggered when the number of stale entries in a FPDS reaches or exceeds a stale entries threshold, for example, when a number of stale fingerprint entries in a FPDS is beyond 20%. The verify trigger detector 1510 determines a current number of stale entries in a FPDS 1550 and compare the current number to a stale entries threshold. The stale entries threshold can be a user-defined threshold stored as a parameter in a data store 1570 that is coupled to the stale fingerprint manager 1500. In another example, a verify operation is triggered from a CLI. In another example, a verify operation is user-driven, for example, by the method detecting instructions entered by a user via a command line interface.

When the verify trigger detector 1510 detects a trigger to execute a verify operation, the data sorter 1540 sorts the entries in the FPDS 1550. In one embodiment, the data sorter 1540 sorts the entries in the FPDS 1550 using logical data and the context information (e.g., by <file identifier, block offset in a file, time stamp>, such as <inode, fbn, cp-cnt> order). In another embodiment, the data sorter 1540 sorts the entries in the FPDS 1550 using physical data and the context information (e.g., by <vvbn, cp-cnt> order).

The stale entry identifier 1520 determines whether a stale entries datastore (e.g., stale entries file) 1560 exists. When a stale entries datastore 1560 does not yet exist, the stale entry identifier 1520 uses context information that is stored in the FPDS 1550 to identify stale fingerprint entries. Fingerprint entries having higher consistency point counter values are more recent than entries with lower consistency point counter values. In one embodiment, the stale entry identifier 1520 identifies fingerprint entries having the same <inode, fbn> as other entries, but with lower consistency point counter values compared to the other entries, as stale fingerprint entries. In another embodiment, the stale entry identifier 1520 identifies fingerprint entries having the same <vvbn> as other entries, but with lower consistency point counter values compared to the other entries, as stale fingerprint entries. The unidentified entries are stale free fingerprint entries.

When a stale entries datastore 1560 exists, the stale entry identifier 1520 compares the entries in the FPDS 1550 with the entries in the stale entries datastore 1560 to identify stale fingerprint entries. The de-duplication module identifies fingerprint entries having the same fingerprint values as the fingerprint entries in the stale entries datastore 1560 as stale fingerprint entries. The unidentified entries are stale free fingerprint entries.

The stale entry manager 1530 creates and updates the stale entries datastore 1560. In one embodiment, the stale entry manager 1530 creates copies of the identified stale entries in the stale entries datastore 1560. In another embodiment, the stale entry manager 1530 does not create copies of the stale entries in the stale entries datastore 1560, but writes stale entry information for each of the identified stale fingerprint entries to the stale entries datastore 1560. The stale entry information for each entry can include, and is not limited to, an entry index (e.g., record index), inode, fbn, inode generation count, and a block generation time stamp. By storing an entry index and entry information, rather than an entry itself, the size of the stale entries datastore 1560 can be reduced. With this optimization, the stale entries datastore 1560 contains entry indices of the stale fingerprint entries, and stale fingerprint manager 1500 can use this datastore 1560 of indices to remove the stale fingerprint entries from the FPDS 1550.

Figure 16A:
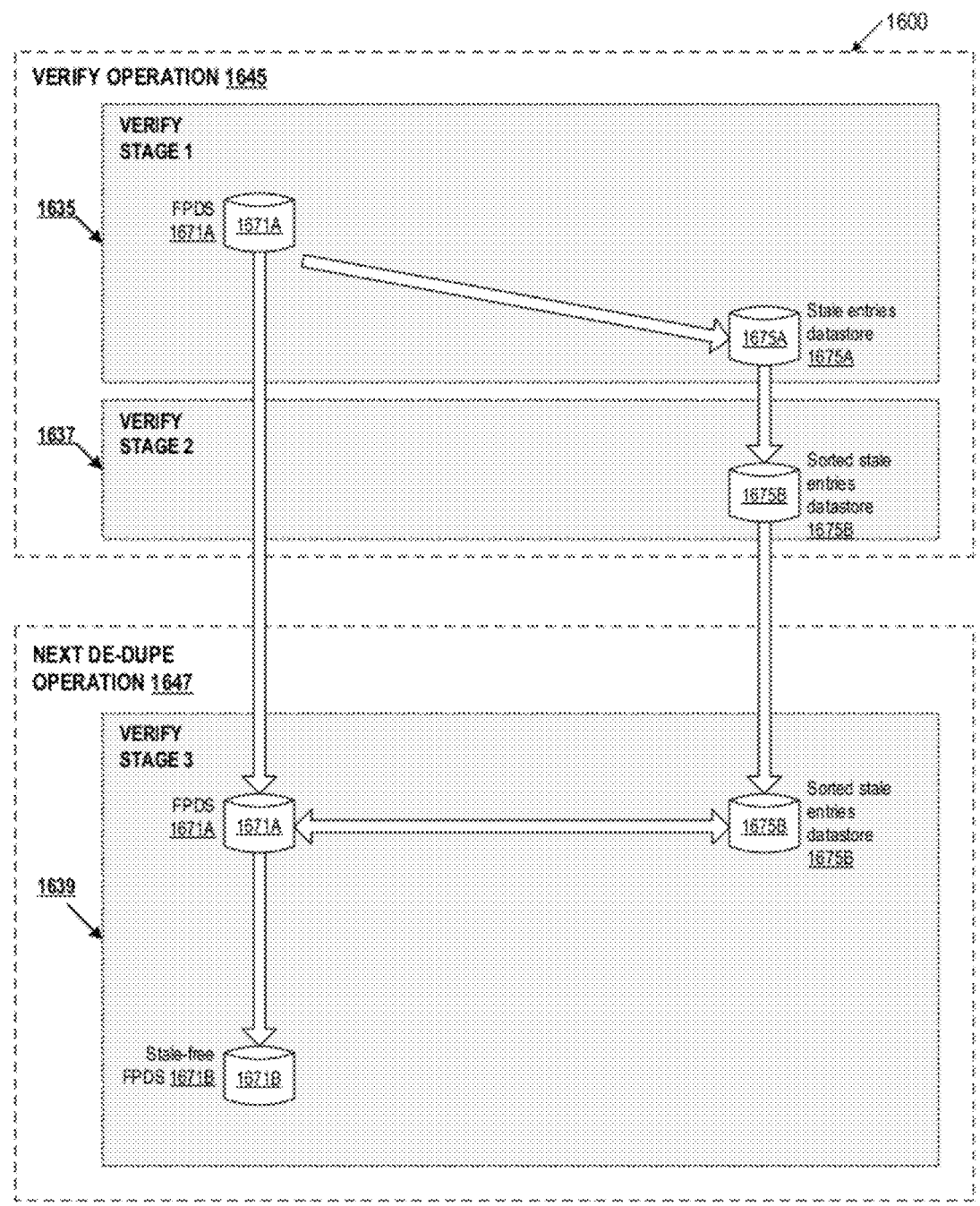
FIGS. 16A-16B are diagrams for removing stale fingerprint entries from a fingerprints datastore (FPDS) when a next de-duplication operation is invoked, according to certain embodiments.

FIG. 16A is a block diagram 1600 for removing stale fingerprint entries from a fingerprints datastore (FPDS) 1671A when a next de-duplication operation is invoked, according to certain embodiments. One embodiment of a FPDS that is divided into multiple parts, such as a primary datastore and a secondary datastore, is described in greater detail in conjunction with FIGS. 9A-9B. Another embodiment of a FPDS that is organized into segments is described in greater detail in conjunction with FIGS. 11A-11B.

In one embodiment, there is a FPDS 1671A that stores an entry (e.g., fingerprint record) for each data block that is written to the storage (e.g., storage 170A,B in FIG. 1A). In another embodiment, there is a master FPDS (e.g., segment.0 1171A-0 in FIG. 11A) and segments (e.g., segments 1171A-1 to 1171A-n in FIG. 11A). In one embodiment, an entry can include, and is not limited to, the fingerprint of the block ('fp'), context information, such as, the value of a consistency point counter (e.g., a generation time stamp ('cp-cnt')) at the time the block was written to a storage device, and logical data, such as the inode number of the file to which the block belongs ('inode') and the FBN (file block number) of the block ('fbn'). In another embodiment, an entry (e.g., fingerprint record) can include, and is not limited to, the fingerprint of the block ('fp'), context information, such as, the value of a consistency point counter (e.g., a generation time stamp ('cp-cnt')) at the time the block was written to a storage device, and physical data, such as a container file identifier ('Container-FileID') and the VVBN (virtual volume block number) of the block ('vvbn').

For illustration purposes, one embodiment of a verify operation for identifying and removing stale fingerprint entries is described as three stages 1635,1637,1639. During verify stage one 1635, a trigger for a verify operation is detected and the entries in the FPDS datastore 1671A are sorted. In one embodiment, the entries in the FPDS 1671A are sorted by logical data and the context information (e.g., by <file identifier, block offset in a file, time stamp>, such as <inode, fbn, p-cnt> order). In another embodiment, the entries in the FPDS 1671A are sorted by physical data and the context information (e.g., by <vvbn, cp-cnt> order). The stale fingerprint entries are identified from the context information and stale entry information for the stale entries are written to a stale entries datastore 1675A.

During verify stage two 1637, the stale entries in the stale entries datastore are sorted (e.g., by entry index). Verify stage three 1639 occurs during a subsequent de-duplication operation 1647. A next de-duplication start request is detected, and during verify stage three 1639, the entries in the sorted stale entries datastore 1675B are merged in-memory with the FPDS 1671A, according to one embodiment. In another embodiment, during verify stage three 1639, the entries in the sorted stale entries datastore 1675B are merged in-memory with the master FPDS (e.g., segment.0 1171A-0 in FIG. 11A) and segments (e.g., segments 1171A-1 to 1171A-n in FIG. 11A). While the data is being merged in-memory, the entries are compared to identify any entries in the FPDS 1671A (or the master FPDS and the segments) that correspond to an entry in the stale entries datastore 1615 to identify stale entries. The identified stale entries are removed and the FPDS 1671A (or master FPDS) is overwritten with the stale-free entries to create a stale-free FPDS 1671B. This stale-free FPDS 1671B can be used in performing the de-duplication operation to identify and eliminate duplicate blocks.

Figure 16B:
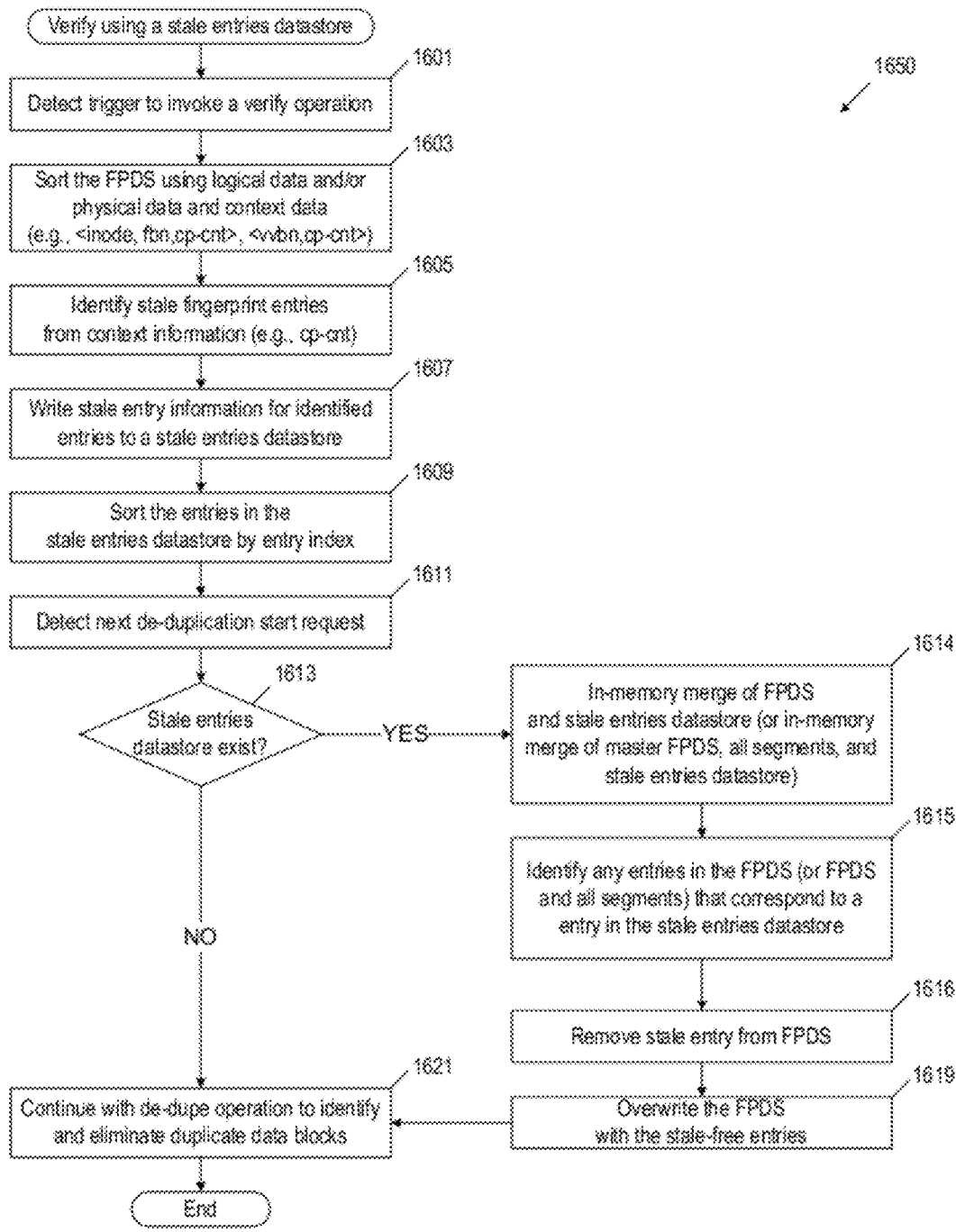

FIG. 16B is a flow diagram of a method 1650 for removing stale fingerprint entries when a next de-duplication operation is invoked, according to certain embodiments. The flow diagram corresponds to block diagram 1600 in FIG. 16A. Method 1650 can be performed by processing logic that can comprise hardware (e.g., circuitry, dedicated logic, programmable logic, microcode, etc.), software (e.g., instructions run on a processing device), or a combination thereof. In one embodiment, method 1650 is performed by a de-duplication module (e.g., de-duplication module 390 in FIG. 3) hosted by storage servers 110 of FIG. 1A.

The de-duplication module is coupled to storage (e.g., storage 170A,B in FIG. 1A) storing data blocks of data, and generates a fingerprint for each data block in the storage. The de-duplication module is coupled to a fingerprints datastore (FPDS) that stores an entry (e.g., fingerprint record) for each data block that has been written to storage. In one embodiment, the FPDS stores an entry (e.g., fingerprint record) for each unique fingerprint. One embodiment of a FPDS that is divided into multiple parts, such as a primary datastore and a secondary datastore, is described in greater detail in conjunction with FIGS. 9A-9B. In another embodiment, there is a master FPDS (e.g., segment.0 1171A-0 in FIG. 11A) and segments (e.g., segments 1171A-1 to 1171A-n in FIG. 11A).

At instruction block 1601, the method detects a trigger to invoke a verify operation. A verify operation can be automatically triggered when the number of stale entries in a FPDS reaches or exceeds a stale entries threshold, for example, when a number of stale fingerprint entries are beyond 20%. In another example, a verify operation is triggered from a CLI. In another example, a verify operation is user-driven, for example, by the method detecting instructions entered by a user via a command line interface.

At instruction block 1603, the method sorts the entries in the FPDS. In one embodiment, the method sorts the entries in the FPDS using logical data and the context information (e.g., by <file identifier, block offset in a file, time stamp>, such as <inode, fbn, cp-cnt> order). In another embodiment, the method sorts the entries in the FPDS using physical data and the context information (e.g., by <vvbn, cp-cnt> order).

At instruction block 1605, the method identifies the stale fingerprint entries from the context information for each entry. Fingerprint entries in the FPDS with higher consistency point counter values (e.g., cp-cnt) are more recent than entries with lower consistency point counter values. In one embodiment, the method identifies entries that correspond to freed data blocks using <inode,fbn> and identifies entries that have the same <inode, fbn>, as other entries, but have a lower consistency point counter value compared to the other entries, as stale entries. In another embodiment, the method identifies entries that correspond to freed data blocks using <vvbn> and identifies entries that have the same <vvbn> as other entries, but have a lower consistency point counter value compared to the other entries, as stale entries. The unidentified entries are stale free fingerprint entries. Complementary to this functionality, information on the deleted files and/or blocks in the deletion code path is also logged and used to clean up stale entries.

At instruction block 1607, in one embodiment, the method copies the stale entries into a stale entries datastore (e.g., fingerprint.stale). Each entry in the stale entries datastore can include a segment identifier. In another embodiment, the size of the stale entries datastore is minimized by storing information for the stale entries rather than copying the stale entries themselves. Stale entry information for a stale entry can include, and is not limited to, a entry number (e.g., entry index) for the stale entry, inode, file block number, generation time stamp, etc. By storing entry information instead of a copy of the stale entry, an entry size in the stale entries datastore can be reduced from 32 bytes to 24 bytes. In this embodiment, the stale entries datastore only contains the entry indexes of the stale fingerprint entries and corresponding entry information (e.g., segment identifier), rather than the copies of the entries themselves. The stale entries datastore can contain only the entry indexes based on the assumption that the FPDS will not be changed before removing the stale entries using the stale entries datastore. If the FPDS is changed before using the stale entries datastore to remove stale entries from the FPDS, the FPDS indexing scheme will not be valid.

During verify stage two, at instruction block 1609, the method sorts the entries in the stale entries datastore. The entries can be sorted by entry index. At instruction block 1611, the method detects a de-duplication start request (e.g., sis start command). In response to detecting a de-dupe start request, verify stage three begins, and the method determines whether a stale entries datastore exists at instruction block 1613. If there is not a stale entries datastore, the method continues to instruction block 1621. For example, a verify operation may not have been previously executed to create a stale entries datastore.

If there is a stale entries datastore, the method performs an in-memory merge of the entries in the sorted stale entries datastore with the FPDS at instruction block 1614, according to one embodiment. In another embodiment, the method performs an in-memory merge of the entries in the sorted stale entries datastore with a master FPDS and all of the segments at instruction block 1614.

At instruction block 1615, while the data is being merged in-memory, the method compares the entries to identify any entries in the FPDS that correspond to an entry in the stale entries datastore to identify the stale fingerprints to be removed from the FPDS, according to one embodiment. In another embodiment where a FPDS is organized as a segmented FPDS, the method compares the entries in the master FPDS and the entries in all of the FPDS segments with the entries in the stale entries datastore to identify the stale fingerprints to be removed from the FPDS at instruction block 1615. In one embodiment, while merging the changelog entries with the FPDS entries, each entry from the FPDS is cross checked against the sorted stale entries datastore. If an entry in the FPDS corresponds (e.g., matches) an entry in the stale entries datastore, the method identifies the entry as a stale entry. In another embodiment, the stale entries datastore stores an entry index of the stale entries. The FPDS should remain unchanged in order for the indexing scheme in the stale entries datastore to remain valid and prior to the changelog entries merging with the FPDS entries, the entry index information in the stale entries datastore is compared to the entries in the FPDS. If there is a match between an entry in the FPDS with the entry index in the stale entries datastore, the method identifies the entry as a stale entry.

At instruction block 1617, the method removes the stale entries from the FPDS. The method can purge the stale entries. At instruction block 1619, the method overwrites the existing FPDS (e.g., FPDS or master FPDS) with the stale-free entries to create a stale-free FPDS (e.g., stale-free master FPDS). At instruction block 1621, the method continues with the de-duplication operation to identify and eliminate duplicate data blocks using the stale-free FPDS.

Figure 17A:
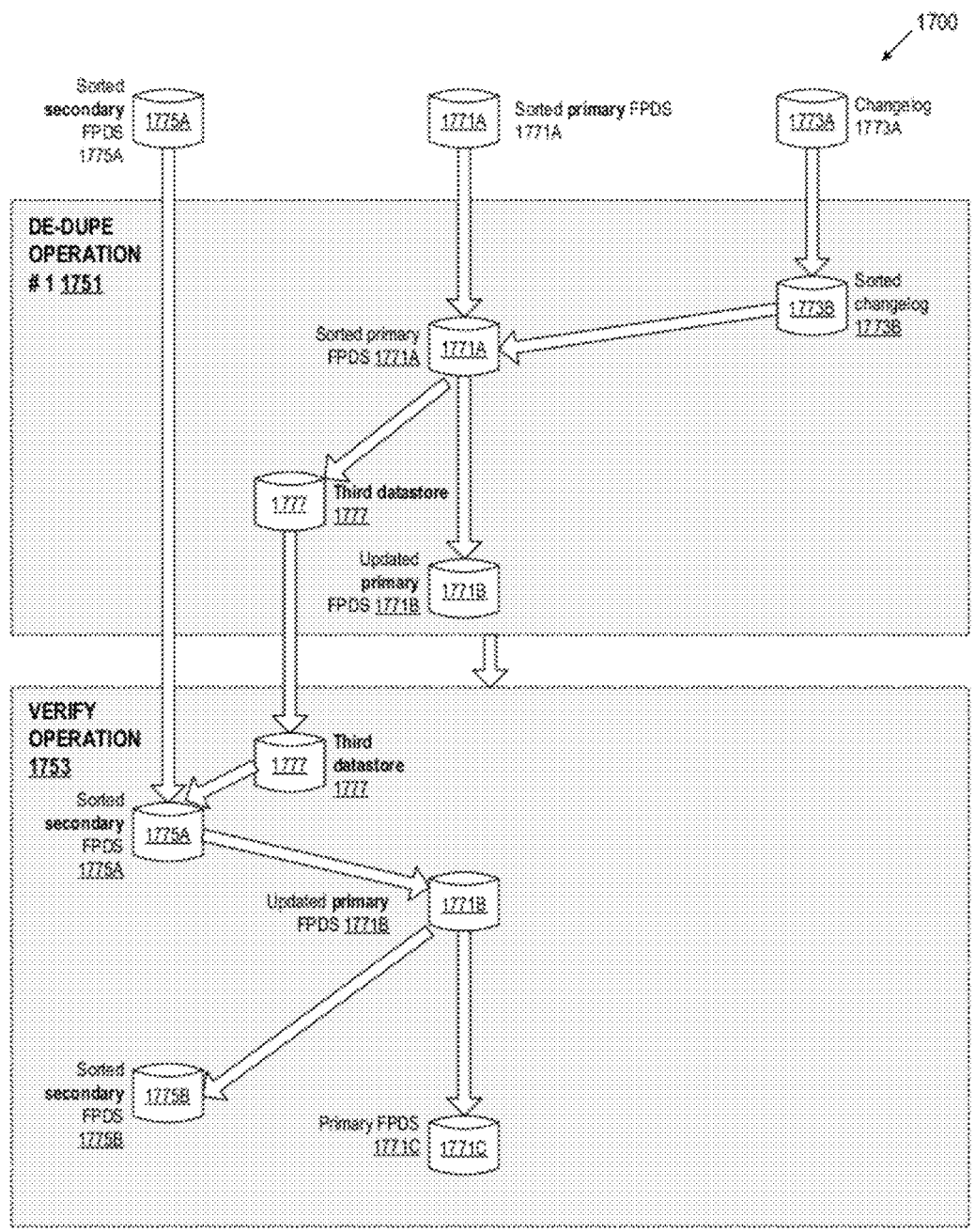
FIGS. 17A-17B are diagrams of a verify operation to identify and remove stale fingerprint entries using a primary FPDS and a secondary FPDS, according to certain embodiments.

FIG. 17A is a block diagram 1700 of a verify operation to identify and remove stale fingerprint entries using a primary FPDS and a secondary FPDS, according to certain embodiments. One embodiment maintains a sorted primary FPDS 1771A and a sorted secondary FPDS 1775A. A primary FPDS 1771A contains an entry (e.g., fingerprint record) for each unique fingerprint value. A secondary FPDS 1775A contains fingerprints entries that have the same fingerprint value as an entry in the primary FPDS 1771A. In one embodiment, an entry can include, and is not limited to, the fingerprint of the block, the inode number of the file to which the block belongs, and the FBN (file block number) of the block. In certain embodiments, each fingerprint is a checksum, such as an MD5 checksum.

A de-duplication operation 1751, is triggered by a de-duplication operation start request (e.g., sis start command) and sorts a changelog 1773A by fingerprint. The de-duplication performs an in-memory merge of the sorted changelog 1773B with the sorted primary FPDS 1771A to identify and eliminate duplicate data blocks. The de-duplication writes the fingerprint entries that correspond to the eliminated duplicate data blocks to a third datastore (e.g., datastore 1777) and overwrites the primary FPDS 1771A with the fingerprint entries that correspond to the unique data blocks to create an updated primary FPDS 1071B.

A verify operation 1753 includes an in-memory merge of the entries in the third datastore 1777 with the entries in the secondary FPDS 1775A, and then with the entries in the primary FPDS 1771B, according to one embodiment. In another embodiment, the third datastore 1777 is a secondary datastore (e.g., tempfile.x) for each de-dupe operation between verify operations. In one embodiment, the secondary datastore (e.g., tempfile.x) is a segmented datastore, as described in conjunction with FIG. 11A. The secondary datastore can be sorted in <inode, fbn> order. Later during the verify operation all tempfile.x files can be merged on-disk and sorted in <inode, fbn> order to optimize a verify operation.

The verify operation identifies and removes stale entries from the merged data and writes the remaining stale-free entries to a stale-free datastore. The verify operation sorts the stale-free data by fingerprint and identifies the entries that correspond to duplicate data blocks. The verify operation writes the identified entries to a second datastore to create a updated secondary FPDS 1775B and overwrites the existing primary FPDS 1771B with the fingerprint entries for the unique data blocks to create an updated primary FPDS 1771C.

Figure 17B:
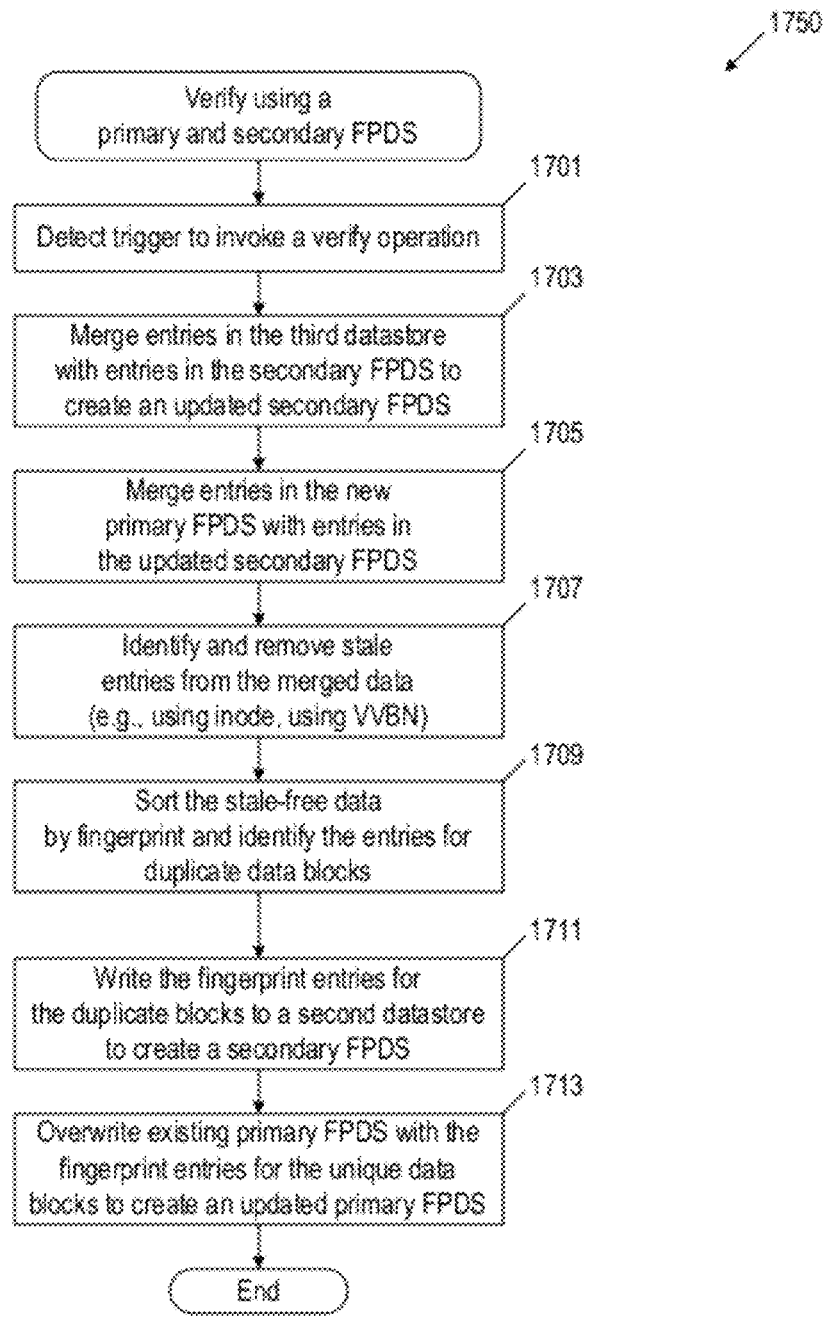

FIG. 17B is a flow diagram of a method 1750 of a verify operation to identify and remove stale fingerprint entries using a primary FPDS and a secondary FPDS, according to certain embodiments. The flow diagram corresponds to block diagram 1700 in FIG. 17A. Method 1750 can be performed by processing logic that can comprise hardware (e.g., circuitry, dedicated logic, programmable logic, microcode, etc.), software (e.g., instructions run on a processing device), or a combination thereof. In one embodiment, method 1750 is performed by a de-duplication module (e.g., de-duplication module 390 in FIG. 3) hosted by storage servers 110 of FIG. 1A.

At instruction block 1701, the method detects a trigger to invoke a verify operation. A verify operation can be automatically triggered when the number of stale entries in a FPDS reaches or exceeds a stale entries threshold, for example, when a number of stale fingerprint entries are beyond 20%. In another example, a verify operation is triggered from a CLI. In another example, a verify operation is user-driven, for example, by the method detecting instructions entered by a user via a command line interface.

During a previously executed de-duplication operation where the method identifies and eliminates duplicate data blocks, the fingerprint entries that correspond to the eliminated duplicate data blocks were written to a third datastore. A secondary FPDS contains fingerprints entries that have the same fingerprint value as an entry (e.g., record) in the primary FPDS. At instruction block 1703, the method performs an in-memory merge of a third datastore with a secondary FPDS to create an updated secondary FPDS, according to one embodiment. In another embodiment, the third datastore is a secondary datastore (e.g., tempfile.x) for each de-dupe operation between verify operations. In one embodiment, the secondary datastore (e.g., tempfile.x) is a segmented datastore, as described in conjunction with FIG. 11A. All tempfile.x files can be merged on-disk and sorted in <inode, fbn> order to optimize a verify operation.

During a previously executed de-duplication operation, an original primary FPDS is overwritten with fingerprint entries that correspond to the unique data blocks to create an updated primary FPDS. At instruction block 1705, the method performs an in-memory merge of the entries in the updated primary FPDS with the entries from the in-memory merge of the secondary FPDS and third datastore, according to one embodiment. In another embodiment, the entries in the updated primary FPDS are merged in-memory with the entries of the on-disk merged tempfile.x files. At instruction block 1707, the method removes stale entries from the merged data. The method can identify stale entries using context information, such as the value of a consistency point counter at the time the block was written to a storage device.

The method writes the remaining stale-free entries to a stale-free datastore and sorts the stale-free data by fingerprint at instruction block 1709. At instruction block 1711, the method identifies the entries that correspond to duplicate data blocks and writes the identified entries to a second datastore to create an updated secondary FPDS. At instruction block 1713, the method overwrites the existing primary FPDS with the fingerprint entries for the unique data blocks to create an updated primary FPDS. One embodiment for dividing a FPDS into a primary FPDS and secondary FPDS is described in detail in conjunction with in FIGS. 8A-8B.

Figure 18:
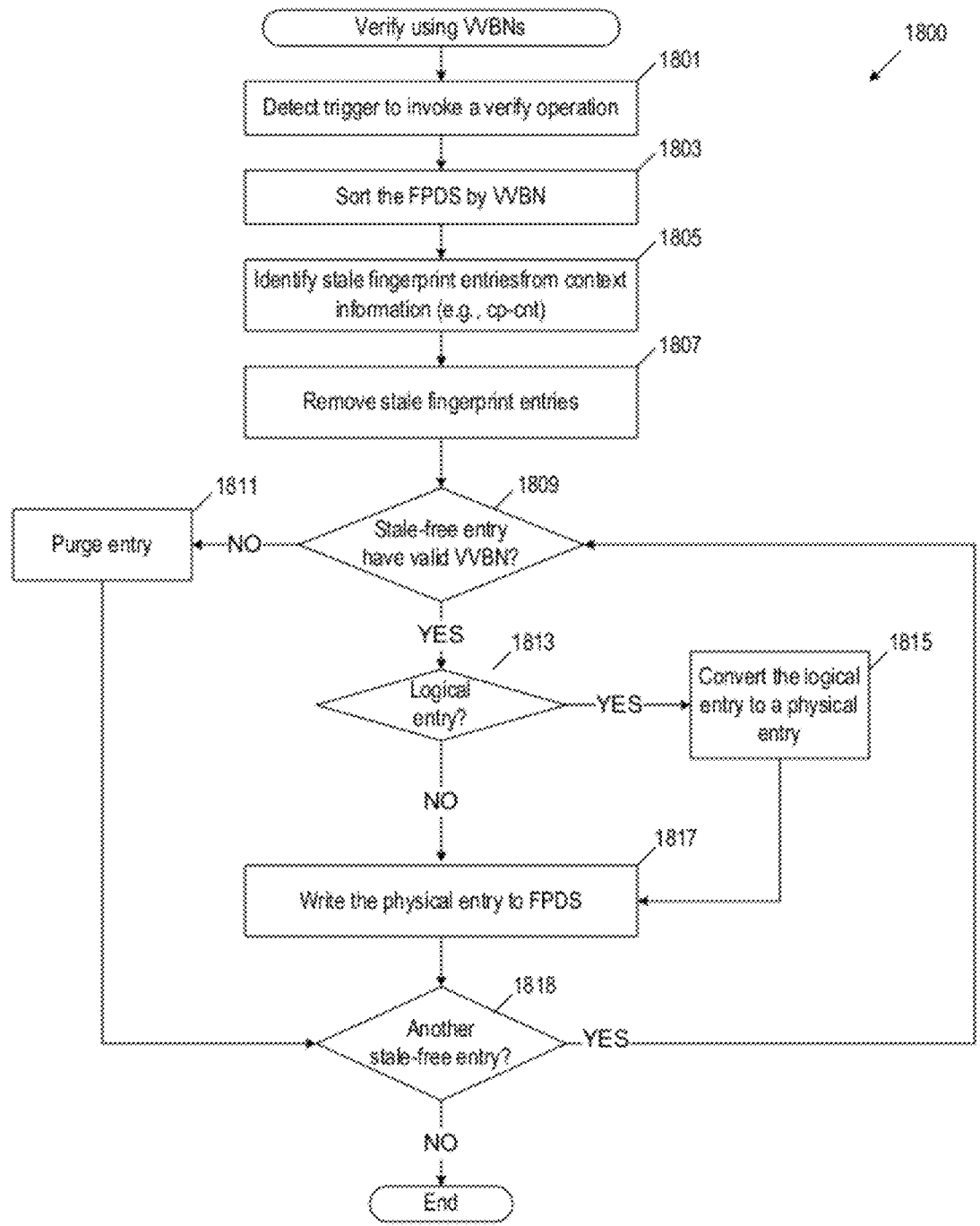
FIG. 18 is a flow diagram of a method for executing a verify operation (stale fingerprint entry removal) using VVBNs (virtual volume block numbers), according to certain embodiments.

FIG. 18 is a flow diagram of a method 1800 for executing a verify operation (stale fingerprint entry removal) using VVBNs (virtual volume block numbers), according to certain embodiments. Method 1800 can be performed by processing logic that can comprise hardware (e.g., circuitry, dedicated logic, programmable logic, microcode, etc.), software (e.g., instructions run on a processing device), or a combination thereof. In one embodiment, method 1800 is performed by a de-duplication module (e.g., de-duplication module 390 in FIG. 3) hosted by storage servers 110 of FIG. 1A.

A de-duplication module is coupled to a sorted FPDS. The FPDS stores an entry (e.g., fingerprint record) for each data block that is written to the storage (e.g., storage 170A,B in FIG. 1A). According to certain embodiments, a FPDS is improved by referencing a data block in a volume uniquely using a virtual volume block number (VVBN) instead of using <inode,fbn>. By using a VVBN to refer to a data block, a FPDS can more easily scale with increased block sharing.

Typically, an entry in a FPDS can include, and is not limited to, the fingerprint of the block ('fp'), context information, such as, the value of a consistency point counter (e.g., a generation time stamp ('cp-cnt')) at the time the block was written to a storage device, and logical data, such as the inode number of the file to which the block belongs ('inode') and the FBN (file block number) of the block ('fbn'). According to certain embodiments, an entry (e.g., fingerprint record) can also include physical data, such as a container file identifier ('Container-FileID') and the VVBN (virtual volume block number) of the block ('vvbn'). A FPDS is then reduced to a map file that can be indexed by VVBN, according to certain embodiments. Instead of or in addition to using an inode and FBN to refer to a block in a volume, the method 1800 can use VVBN to refer to a block.

At instruction block 1801, the method detects a trigger to invoke a verify operation. A verify operation can be automatically triggered when the number of stale entries in a fingerprints datastore (FPDS) reaches or exceeds a stale entries threshold, for example, when a number of stale fingerprint entries are beyond 20%. In another example, a verify operation is triggered from a CLI. In another example, a verify operation is user-driven, for example, by the method detecting instructions entered by a user via a command line interface.

At instruction block 1803, the method sorts the entries in the FPDS. The method sorts the entries in the FPDS using by VVBN and the context information (e.g., by <vvbn, cp-cnt> order). Sorting by VVBN ensures that only the latest copy of the VVBN (e.g., one with highest cp-cnt) is retained in the FPDS.

At instruction block 1805, the method identifies the stale fingerprint entries from the context information for each entry. Fingerprint entries in the FPDS with higher consistency point counter values (e.g., cp-cnt) are more recent than entries with lower consistency point counter values. The method identifies entries that correspond to freed data blocks using <vvbn> and identifies entries that have the same <vvbn> as other entries, but have a lower consistency point counter (e.g., cp-cnt) value compared to the other entries, as stale entries. The unidentified entries are stale free fingerprint entries. Complementary to this functionality, information on the deleted files and/or blocks in the deletion code path is also logged and used to clean up stale entries.

At instruction block 1807, the method removes (purges) the stale fingerprint entries. At instruction block 1809, the method examines a stale-free entry to determine whether it has a valid VVBN. The method can examine an active map to ensure a VVBN is valid (ensure that a VVBN has not changed). If the method does not confirm that that the VVBN is valid, it can delete (purge) the stale fingerprint entry at instruction block 1811. If the method confirms that the VVBN is valid, the method determines whether the fingerprint entry is a logical entry at instruction block 1813. A fingerprint entry can include data indicating the type (e.g., physical, logical) of entry. In one embodiment, at instruction block 1813, the method also checks a 'refcount' for the VVBN to ensure that the VVBN is shared.

If an entry is not a logical entry (instruction block 1813), the method writes it to the FPDS as is at instruction block 1817, that is, as a physical entry. If an entry is a logical entry (instruction block 1813), the method converts it to a physical entry at instruction block 1815 and writes the physical entry to the FPDS at instruction block 1817. At instruction block 1819, the method determines whether to validate another stale-free entry.

Figure 19:
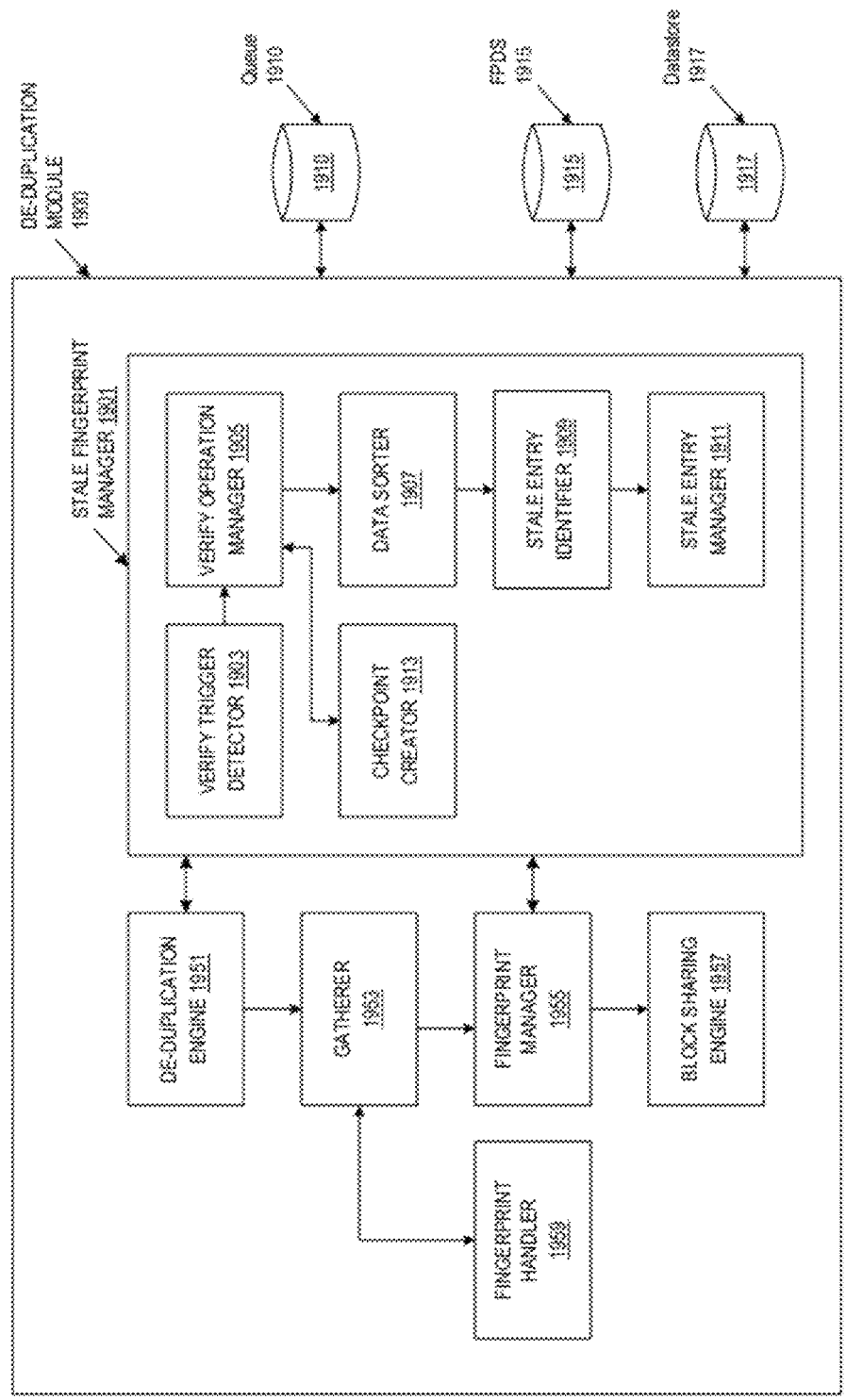
FIG. 19 is a block diagram showing elements of a de-duplication module for executing a verify operation (stale fingerprint entry removal) as a background operation, according to certain embodiments.

FIG. 19 illustrates the elements of a de-duplication module 1900 (e.g., de-duplication module 390 in FIG. 3) for executing a verify operation (stale fingerprint record removal) as a background operation, according to certain embodiments. The elements include a stale fingerprint manager 1901 that includes a verify trigger detector 1903, a verify manager 1905, a data sorter 1907, a checkpoint creator 1913, a stale entry identifier 1909, a stale entry manager 1911, and a data sorter 1907. The elements of the de-duplication module 1900 also include a de-duplication engine 1951, a gatherer 1953, a fingerprint manager 1955, a block sharing engine 1957, and a fingerprint handler 1959.

Typically, a verify operation (stale entries removal operation) is a blocking operation, that is, if a verify operation is executing on a FPDS, then no other de-duplication (sharing) operation can run because all de-duplication operations should work from a consistent copy of a FPDS. One aspect de-duplication makes a verify operation a background job so that if any de-duplication operation request is made while any verify operation is executing, the de-duplication request can be served, to help decrease customer response time, and to help not lose any space savings due to not being able to run a de-duplication operation.

The stale fingerprint manager 1901 is coupled to a fingerprints datastore (FPDS) 1915 that stores an entry (e.g., fingerprint record) for each data block that has been written to storage (e.g., storage 170A,B in FIG. 1A). One embodiment of a FPDS that is divided into multiple parts, such as a primary datastore and a secondary datastore, is described in greater detail in conjunction with FIGS. 9A-9B. Another embodiment of a FPDS that is organized into segments is described in greater detail in conjunction with FIGS. 11A-11B.

In one embodiment, an entry (e.g., fingerprint record) can include, and is not limited to, the fingerprint of the block ('fp'), context information, such as, the value of a consistency point counter (e.g., a generation time stamp ('cp-cnt')) at the time the block was written to a storage device, and logical data, such as the inode number of the file to which the block belongs ('inode') and the FBN (file block number) of the block ('fbn'). In another embodiment, a fingerprint entry can include, and is not limited to, the fingerprint of the block ('fp'), context information, such as, the value of a consistency point counter (e.g., a generation time stamp ('cp-cnt')) at the time the block was written to a storage device, and physical data, such as a container file identifier ('Container-FileID') and the VVBN (virtual volume block number) of the block ('vvbn').

A verify operation (stale entries removal operation) can be automatically triggered when the number of stale entries in a FPDS 1915 reaches or exceeds a stale entries threshold, for example, when a number of stale fingerprint entries in a FPDS 1915 is beyond 20%. The verify trigger detector 1903 determines a current number of stale entries in a FPDS 1915, for example, by examining a stale entries datastore that is stored in a data store 1917 that is coupled to the stale fingerprint manager 1901. The verify detector 1903 compares the current number of stale entries to a stale entries threshold. The stale entries threshold can be a user-defined threshold stored as a parameter in the data store 1917. In another example, a verify operation is triggered from a CLI. In another example, a verify operation is user-driven, for example, by the verify trigger detector 1903 receiving instructions entered by a user via a command line interface.

During a verify stage one, when the verify trigger detector 1903 detects a trigger to execute a verify operation, the verify operation manager 1905 executes a verify operation by invoking a data sorter 1907 to sort the entries in the FPDS 1915. In one embodiment, the data sorter 1907 sorts the entries in the FPDS 1915 using logical data and the context information (e.g., by <file identifier, block offset in a file, time stamp>, such as <inode, fbn, cp-cnt> order). In another embodiment, the data sorter 1907 sorts the entries in the FPDS 1915 using physical data and the context information (e.g., by <vvbn, cp-cnt> order).

The stale entry identifier 1909 uses context information that is stored in the FPDS 1915 to identify stale fingerprint entries. Fingerprint entries having higher consistency point counter values are more recent than entries with lower consistency point counter values. In one embodiment, the stale entry identifier 1909 identifies fingerprint entries having the same <inode, fbn> as other entries, but with lower consistency point counter values compared to the other entries, as stale fingerprint entries. In another embodiment, the stale entry identifier 1909 identifies fingerprint entries having the same <vvbn> as other entries, but with lower consistency point counter values compared to the other entries, as stale fingerprint entries. The unidentified entries are stale free fingerprint entries. In one embodiment, the stale entry manager 1911 creates a stale entries datastore and stores it in the data store 1917. One embodiment of a stale entry manager creating a stale entries datastore is described in conjunction with FIG. 15.

During verify stage two, the data sorter 1907 sorts the entries in the stale entries datastore. Subsequently, when a de-duplication process is invoked, the stale entries datastore can be used to remove the stale fingerprint entries from the FPDS 1915.

While a verify operation is executing, a de-duplication engine 1951 that is coupled to the stale fingerprint manager 1901 monitors for a de-duplication operation start request (e.g., sis start command). In one embodiment, when the de-duplication engine 1951 detects a de-duplication start request, it notifies the verify operation manager 1905 and returns a success message to a user in response to the de-duplication start request. The de-duplication engine 1951 adds a message to a queue 1910, which is coupled to the de-duplication engine 1951, for a de-duplication job to be performed in response to the de-duplication start request. The queue 1910 can be a data store.

The verify operation manager 1905 receives the notification from the de-duplication engine 1951 and monitors for a checkpoint creation. A checkpoint is a point in time during execution of a verify operation in which the verify operation manager 1905 can pause the verify operation. A checkpoint can be a user-defined point in time. A checkpoint creator 1913 can be configured to create checkpoints according to a user-defined parameter that is stored in the data store 1917. In one embodiment, the checkpoint creator 1913 creates a first checkpoint during verify stage one, for example, after the stale entry identifier 1909 identifies the stale fingerprint entries. The checkpoint creator 1913 can create more than one checkpoint. For example, the checkpoint creator 1913 creates a second checkpoint during verify stage two after the stale entries datastore is sorted.

When the verify operation manager 1905 detects that the checkpoint creator 1913 creates a checkpoint, the verify operation manager 1905 determines whether to suspend a verify operation that is currently executing. The verify operation manager 1905 examines the queue 1910, which is coupled to the verification operation manager 1905, to determine whether there are any pending de-duplication jobs to be performed and if so, suspend the verify operation. In one embodiment, the verify operation manager 1905 marks the FPDS 1915 as read-only, stops the verify operation, and saves it in its current state to a storage device. The verify operation manager 1905 adds a message to the queue 1910 for the verify operation job to be resumed and notifies the de-duplication engine 1951 to invoke the de-duplication operation.

The de-duplication engine 1910 triggers operations of the other modules, such as the gatherer module 1953, fingerprint handler 1959, fingerprint manager 1955, and block sharing engine 1957 to execute a de-duplication operation for identifying and eliminating duplication data blocks. Eliminating the duplicate data blocks includes sharing the remaining instance of each data block that was duplicated and freeing the (no longer used) duplicate data block(s). Embodiments of the modules executing a de-duplication operation are described in detail in conjunction with FIG. 7, FIG. 10, and FIG. 12. Returning to FIG. 19, the fingerprint manager 1955 merges the entries in the FPDS 1915 with entries in a changelog, and the block sharing engine 1957 identifies and eliminates the duplicate data blocks. In one embodiment, the fingerprint manager 1955 determines that the FPDS 1915 is marked as read-only and writes the merged data to a new FPDS to create a shadow copy of the FPDS 1915. Subsequently, when a verify operation is complete, the shadow copy can be merged with the original FPDS 1915. The de-duplication engine 1910 clears the message corresponding to the completed de-duplication operation from the queue 1910.

The de-duplication engine 1951 determines whether there is another de-duplication job in the queue 1910 to be performed. If not, the de-duplication engine 1951 notifies the verify operation manager 1905 to resume the suspended verify operation. The verify operation manager 1905 receives the notification from the de-duplication engine 1951, marks the FPDS 1915 as read/write, and restarts the verify job from its saved state from a storage device.

Figure 20:
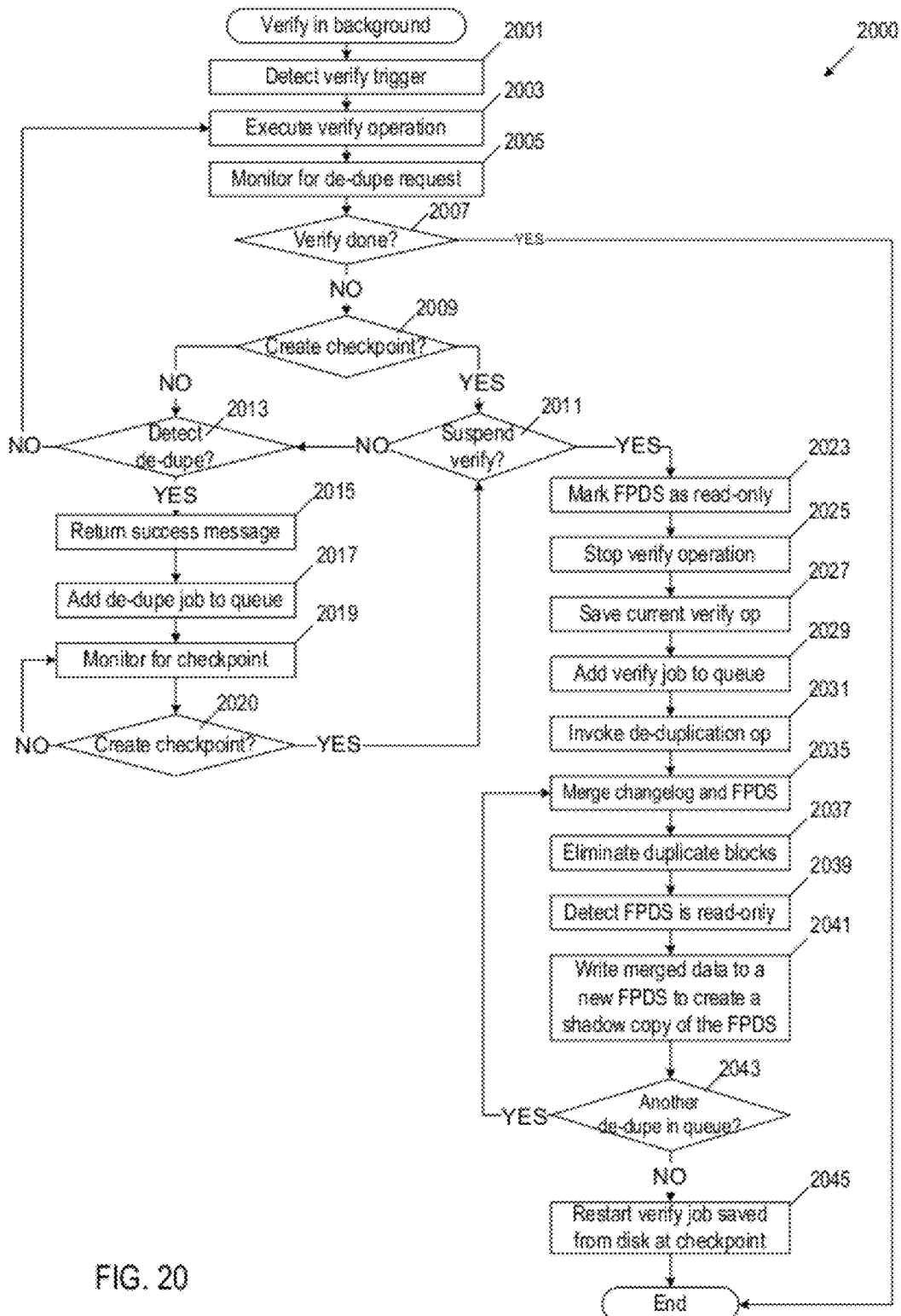
FIG. 20 is a flow diagram of a method for executing a verify operation (stale fingerprint entry removal) as a background operation, according to certain embodiments.

FIG. 20 is a flow diagram of a method 2000 for executing a verify operation (stale fingerprint record removal) as a background operation, according to certain embodiments. Method 2000 can be performed by processing logic that can comprise hardware (e.g., circuitry, dedicated logic, programmable logic, microcode, etc.), software (e.g., instructions run on a processing device), or a combination thereof. In one embodiment, method 2000 is performed by a de-duplication module (e.g., de-duplication module 390 in FIG. 3) hosted by storage servers 110 of FIG. 1A.

The de-duplication module is coupled to storage (e.g., storage 170A,B in FIG. 1A) storing data blocks of data, and generates a fingerprint for each data block in the storage. The de-duplication module is coupled to a fingerprints datastore (FPDS) that stores an entry (e.g., fingerprint record) for each data block that has been written to storage. In one embodiment, the FPDS stores an entry (e.g., fingerprint record) for each unique fingerprint. One embodiment of a FPDS that is divided into multiple parts, such as a primary datastore and a secondary datastore, is described in greater detail in conjunction with FIGS. 9A-9B. Another embodiment of a FPDS that is organized into segments is described in greater detail in conjunction with FIGS. 11A-11B.

A verify operation (stale entries removal operation) can be automatically triggered when the number of stale entries in a FPDS reaches or exceeds a stale entries threshold, for example, when a number of stale fingerprint entries in a FPDS 2015 is beyond 20%. The method 2000 determines a current number of stale entries in a FPDS, for example, by examining a stale entries datastore that is stored in a data store that is coupled to the de-duplication module. The method compares the current number of stale entries to a stale entries threshold. The stale entries threshold can be a user-defined threshold stored as a parameter in the data store. In another example, a verify operation is triggered from a CLI. In another example, a verify operation is user-driven, for example, by the method detecting instructions entered by a user via a command line interface.

At instruction block 2001, the method detects a trigger to execute a verify operation and executes the verify operation at instruction block 2003. While a verify operation is executing, the method monitors for a de-duplication operation start request (e.g., sis start command) at instruction block 2005. The method determines whether the verify operation is finished at instruction block 2007. If the verify operation is not finished, the method determines whether a checkpoint is being created during the verification operation at instruction block 2009. A checkpoint is a point in time during execution of a verify operation in which the method can pause the verify operation. A checkpoint can be a user-defined point in time. In one embodiment, the method creates a first checkpoint during verify stage one, for example, after the method identifies the stale fingerprint entries. The method can create more than one checkpoint during a verify operation. For example, the method creates a second checkpoint during verify stage two after the method identifies the stale entries.

If a checkpoint is not created (instruction block 2009), the method determines whether there is a de-duplication operation start request (e.g., sis start command) at instruction block 2013. If there if not a de-duplication operation start request (e.g., sis start command), the method continues to execute the verify operation at instruction block 2003.

When a checkpoint is created (instruction block 2009), the method determines whether to suspend the verify job that is currently executing at instruction block 2011. The method examines the queue to determine whether there are any pending de-duplication jobs to be performed. If there are no pending de-duplication jobs (2011), the de-duplication does not suspend the verify operation and determines whether there is a de-duplication start request at instruction block 2013.

When the method detects a de-duplication start request (e.g., sis start command), the method returns a success message to a user at instruction block 2015. A success message can include, for example, data indicating the de-duplication request is successfully received, data indicating the de-duplication is to be performed, etc. At instruction block 2017, the method adds a message to a queue, which is coupled to the method, for a de-duplication job to be performed. At instruction block 2013, while the verify operation continues to execute, the method monitors for when to create a checkpoint. If a checkpoint is not created (instruction block 2021), the verify operation continues to execute and the method continues to monitor for a checkpoint at instruction block 2019.

When a checkpoint is created (instruction block 2021), the method determines whether to suspend the verify job that is currently executing at instruction block 2011. If there is a de-duplication job that is pending in the queue (instruction block 2011), in one embodiment, the method marks the FPDS as read-only at instruction block 2023. In another embodiment, the method does not mark the FPDS as read-only and continues to stop the verify operation at instruction block 2025. For example, in some embodiments, a method does not overwrite a complete FPDS. For instance, a method only overwrites a segment of FPDS, and subsequently, all such segments are merged to avoid write cost. Furthermore, in some embodiment, a verify operation runs on a backup copy of a FPDS ordered or on primary copy of FPDS (e.g., primary FPDS) which is ordered in de-duplication friendly order.

At instruction block 2025, the method stops the verify operation and saves the verify job in its current state to a storage device at instruction block 2027. At instruction block 2029, the method adds a message to the queue for the verify operation job to be resumed and invokes the de-duplication operation at instruction block 2031.

At instruction block 2035, the method merges the entries in the FPDS with entries in a changelog, and identifies and eliminates the duplicate data blocks at instruction block 2037. In one embodiment, method determines that the FPDS is marked as read-only at instruction block 2039, and writes the merged data to a new FPDS to create a shadow copy of the FPDS at instruction block 2041. Subsequently, when a verify operation is complete, the shadow copy can be merged with the original FPDS.

The method clears the message corresponding to the completed de-duplication operation from the queue. At instruction block 2045, the method determines whether there is another de-duplication job in the queue to be performed. If not, the method resumes the verify operation that is in the queue by restarting the verify job that is saved from a storage device at instruction block 2045. In one embodiment, the method marks the FPDS as read/write. Upon completion, the method clears the message corresponding to the completed verify operation from the queue.

Figure 21:
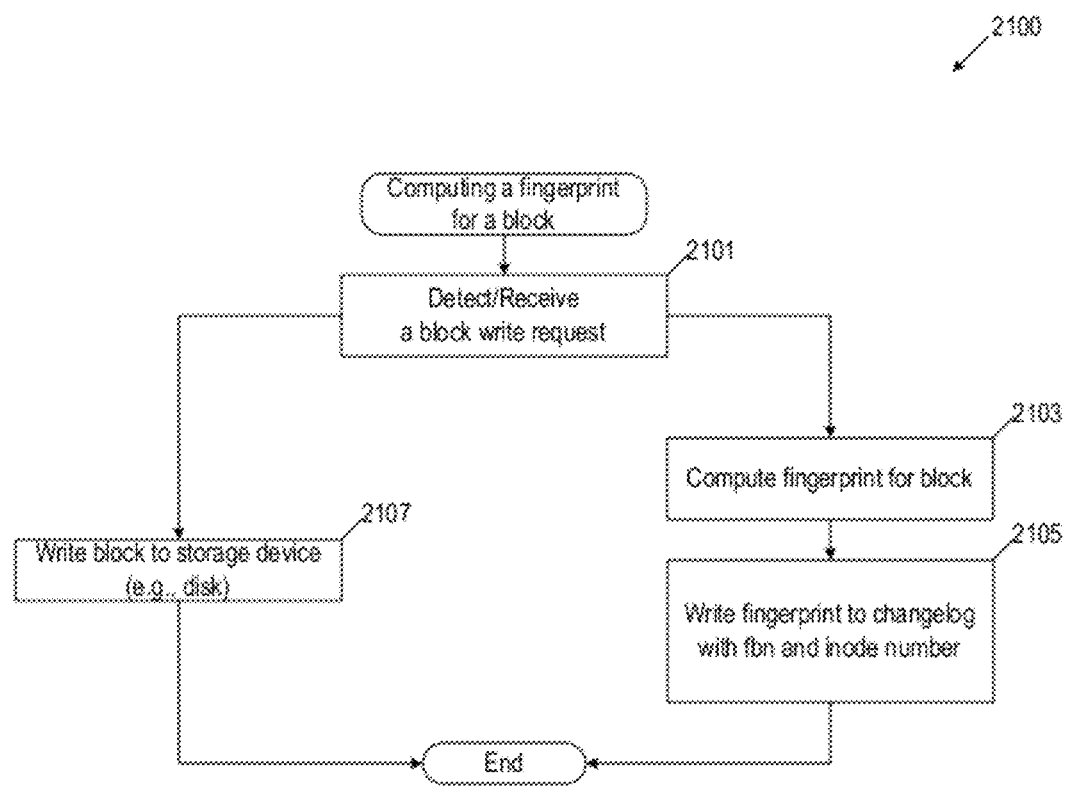
FIG. 21 is a flow diagram of a method for computing a fingerprint for a data block, according to certain embodiments.

FIG. 21 is a flow diagram of a method 2100 for computing a fingerprint for a data block, according to certain embodiments. Method 2100 can be performed by processing logic that can comprise hardware (e.g., circuitry, dedicated logic, programmable logic, microcode, etc.), software (e.g., instructions run on a processing device), or a combination thereof. In one embodiment, method 2100 is performed by a de-duplication module (e.g., de-duplication module 390 in FIG. 3) hosted by storage servers 110 of FIG. 1A.

At instruction block 2101, the method detects a request to write data to a data block. The flow diagram illustrates an embodiment of computing a fingerprint for a data block that operates concurrently with the operation of writing the blocks to storage (e.g., storage 170A,B in FIG. 1A). Instructional blocks 2103 and 2105 are performed concurrently with instructional block 2107. In alternative embodiments, computing the fingerprint and writing the fingerprint to the changelog file is not performed concurrently with writing the block to a storage device. At instruction block 2103, the fingerprint handler computes a fingerprint for the block. The fingerprint is passed to the fingerprint manager, which writes an entry (e.g., record) for the block in the changelog file at instruction block 2105 including, but limited to, the fingerprint, the FBN (file block number), the inode number of the block, and other relevant context information that is specific to this block, such as the value of a consistency point counter at the time the block was written to a storage device.

Figure 22:
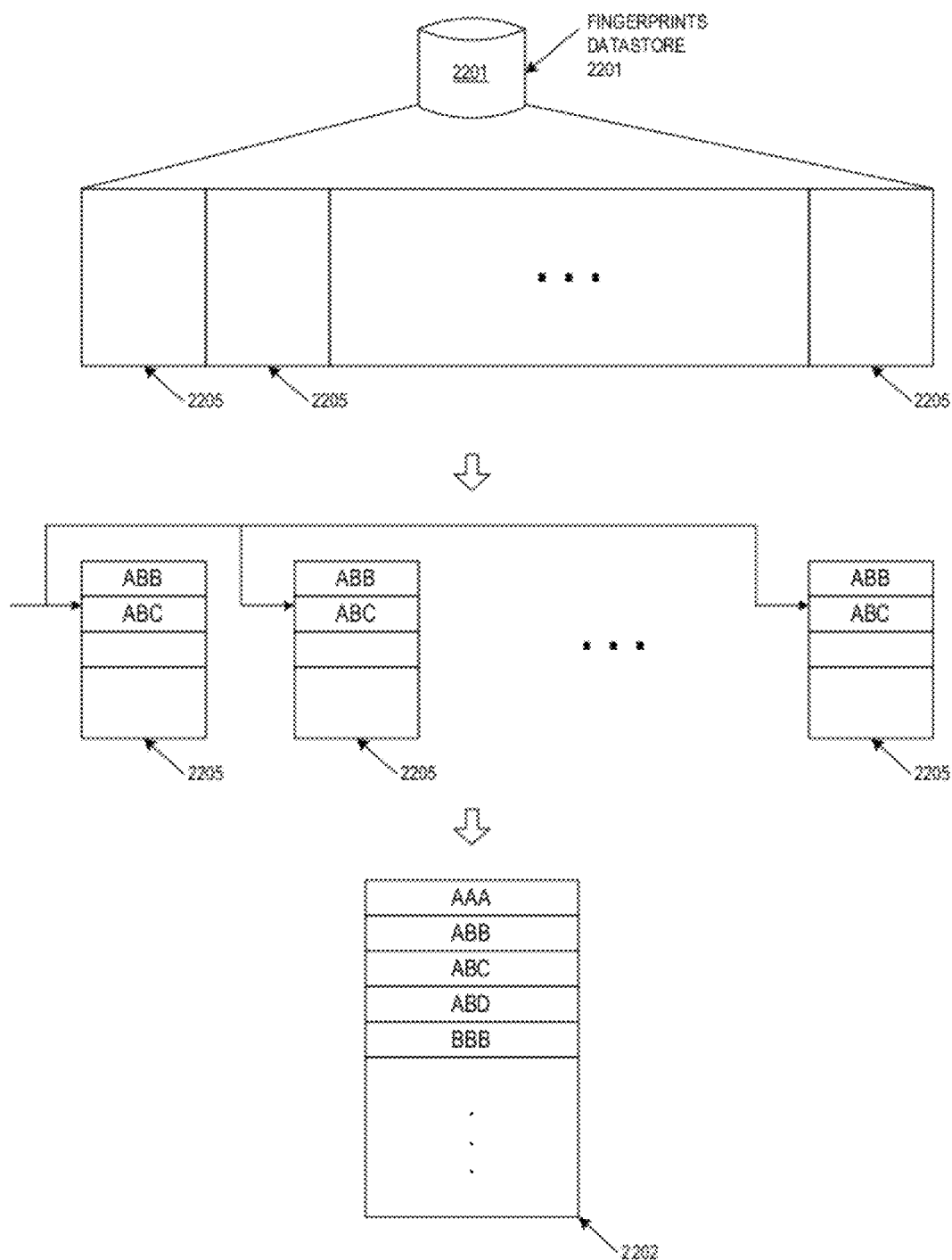
FIG. 22 is a flow diagram showing a method of sorting a fingerprints datastore, according to certain embodiments.

FIG. 22 is a block diagram for sorting fingerprint entries in a fingerprints datastore and a changelog, according to certain embodiments. First, the fingerprints datastore 2201 is divided into some number, N, of approximately equal-sized chunks 2205. Each of the N chunks 2205 is then independently sorted by fingerprint value, using any conventional sorting algorithm, such as Quicksort, for example. The data sorting then compares the fingerprints in the entries of the same rank in all of the N chunks 2205 (e.g., the top entry in each of the N chunks 2205) and copies the entry which has the smallest fingerprint value from among those into the next available slot in the sorted output file 2202. The output file 2202 becomes the sorted fingerprints datastore 2203 when the sorting operation is complete. This process is then repeated until all of the entries in the N sorted chunks 2205 have been copied into the output file 2202.

Figure 23:
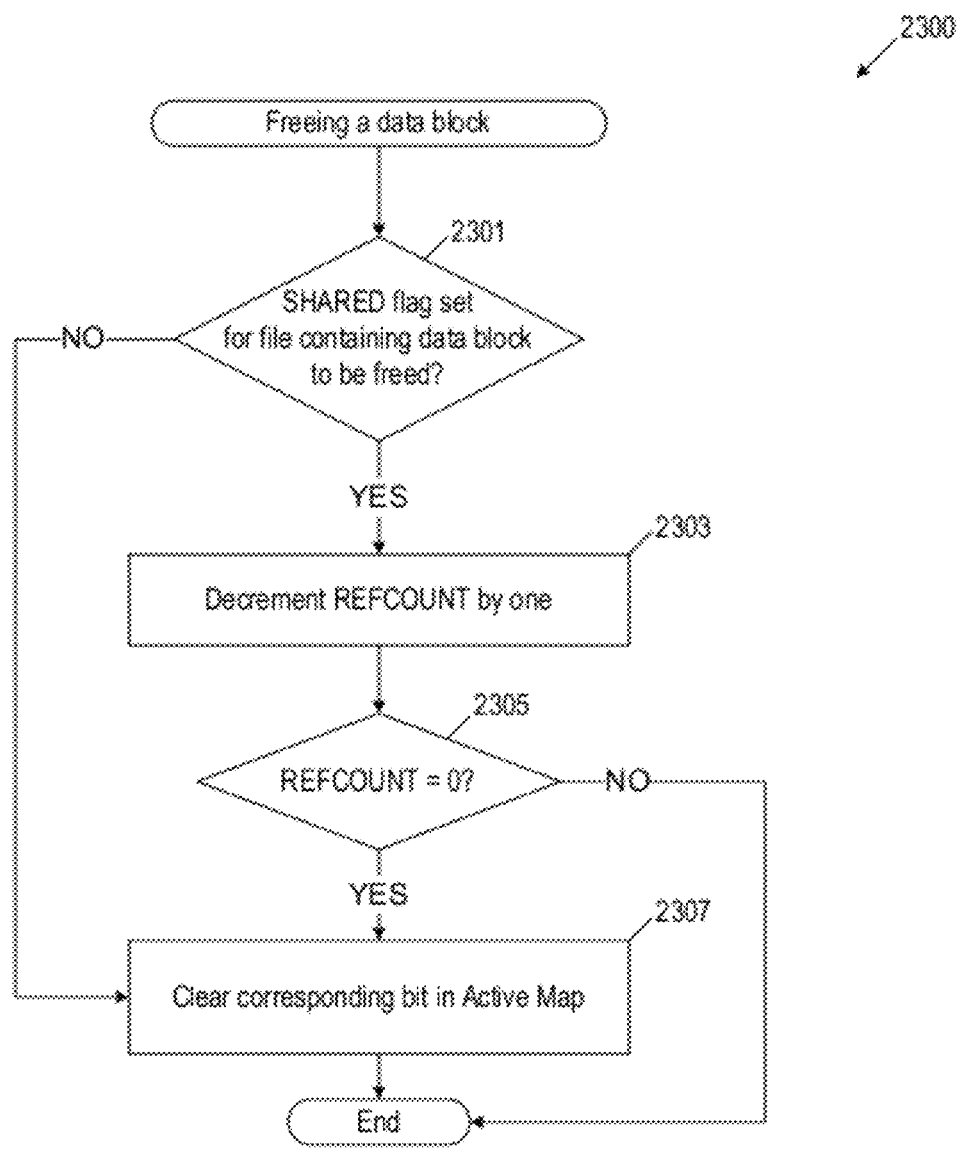
FIG. 23 is a flow diagram showing the method of freeing a data block, according to certain embodiments.

FIG. 23 is a flow diagram of a method 2300 for freeing a data block, such as a duplicate block, according to certain embodiments. Method 2300 can be performed by processing logic that can comprise hardware (e.g., circuitry, dedicated logic, programmable logic, microcode, etc.), software (e.g., instructions run on a processing device), or a combination thereof. In one embodiment, method 2300 is performed by a de-duplication module (e.g., de-duplication module 390 in FIG. 3) hosted by storage servers 110 of FIG. 1A.

At instruction block 2301, the method determines whether the SHARED flag is set for the file which contains the block to be freed. If the SHARED flag is not set (meaning that no blocks in the file are shared), the process proceeds to instruction block 2307, in which the bit corresponding to the block is cleared in the active map. The process then ends. An active map is a bitmap of all data blocks managed by a storage server, i.e., one bit per data block. The bit for a given data block is set in the active map if the data block is allocated and cleared if the data block is free to be used. The active map is used during allocation of blocks to determine whether a block is free or not. The active map helps to improve performance by avoiding the need to read the reference count file to identify free blocks.

A reference count file is much larger (and therefore takes longer to read) than the active map. The reference count file contains an entry (e.g., record) for each data block maintained by the storage server, wherein each entry includes a value, REFCOUNT, indicating the number of references to that data block. In one embodiment, however, the active map and the reference count file could be combined into a single file to identify each free block as well as to indicate the number of references to the data block.

If the SHARED flag is set (instruction block 2301), then at instruction block 2303 the process decrements the REFCOUNT value for the block by one in the reference count file. After decrementing the REFCOUNT value, the process determines at instruction block 2305 whether the REFCOUNT value is zero. If the REFCOUNT value is zero (meaning that the block is no longer used), the process clears the corresponding bit in the active map and then ends. A data block that is freed can be reused. If the REFCOUNT value is determined to be non-zero (instruction block 2305), the process finishes.

In certain embodiments, the system also maintains a change log to identify blocks that are new or modified since the last time a de-duplication operation was executed. The change log contains information of the same type as the fingerprints datastore (i.e., fingerprint of the block, inode number of the file to which the block belongs, and the FBN of the block), but only for new or modified blocks. From time to time, the system then re-executes the sorting process of FIG. 22 on both the fingerprints datastore and the change log, to merge the change log into the fingerprints datastore. In alternative embodiments, the system could simply from time to time scan the entire file system, compute the fingerprints of all data blocks, and eliminate duplicates at essentially the same time.

The particular methods of the de-duplication module have been described in terms of computer software with reference to a series of flow diagrams. FIGS. 4C, 8B, 9B, 11B, 14B, 16B, 17B, 18, 20, 21, and 23 relate to computer(s) in FIG. 2. The methods constitute computer programs made up of computer-executable instructions illustrated as blocks (acts) in FIGS. 1-23. Describing the methods by reference to a flow diagram enables one skilled in the art to develop such programs including such instructions to carry out the methods on suitably configured machines (the processor of the machine executing the instructions from computer-readable media, including memory) The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in FIGS. 4C, 8B, 9B, 11B, 14B, 16B, 17B, 18, 20, 21, and 23 without departing from the scope of the invention and that no particular order is implied by the arrangement of blocks shown and described herein.

What is claimed is:

1. A method comprising:

generating, by a storage server, a fingerprint for each data block stored on a storage device in storage, wherein a fingerprint entry for each fingerprint generated by the storage server is stored in a changelog file, and wherein the storage server is coupled to the storage device that stores blocks of data;

creating, by the storage server, a fingerprints datastore divided into a primary datastore and a secondary datastore, wherein entries in the primary datastore comprises a single entry for each unique fingerprint identified as not corresponding to a duplicate data block and the secondary datastore comprises an entry for each fingerprint identified as corresponding to a duplicate data block;

merging, by the storage server, entries in the changelog file with the entries in the primary datastore to identify duplicate data blocks in the storage device;

freeing, by the storage server, the identified duplicate data blocks in the storage device;

storing, by the storage server, the entries that correspond to the freed data blocks to a third datastore; and overwriting, by the storage server, the primary datastore with the entries from the merged entries that correspond to the unique fingerprints to create an updated primary datastore, wherein, when a request for a de-duplication operation is received during execution of a verify operation, the verify operation is suspended while the de-duplication operation is executing and is subsequently resumed upon completion of the de-duplication operation, the suspension of the verify operation comprising marking the primary datastore as read-only, storing the verify operation in a current state to a storage device, and adding a message to a queue representing the suspended verify operation.

2. The method of claim 1, further comprising:

identifying stale entries in the secondary datastore, the stale entries corresponding to duplicate data blocks eliminated by the de-duplication operation;

writing stale entry information for the identified stale entries to a stale entries datastore; and removing the stale entries in the secondary datastore using the stale entry information in response to the request for the de-duplication operation.

3. The method of claim 2, wherein the stale entry information comprises a entry index for the stale entry, the fingerprint of the data block, context information for the data block, and an inode number of a file to which the data block belongs, and a file block number of the data block.

4. The method of claim 1, further comprising:

merging the entries in the third datastore with the entries in the secondary datastore and the updated primary datastore;

identifying stale entries in the merged entries and removing the stale entries; and dividing the merged entries into a new primary datastore and a new secondary datastore.

5. A storage server comprising:

a network interface through which to communicate over a network;

a storage interface through which to communicate with a storage device;

a processor coupled to the network interface and the storage interface;

a memory storing code which configures the processor to cause the storage server to perform a communication process that comprises generating a fingerprint for each data block stored in the storage device, wherein a fingerprint entry for each fingerprint generated is stored in a changelog file;

creating a fingerprints datastore divided into a primary datastore and a secondary datastore, wherein entries in the primary datastore comprises a single entry for each unique fingerprint identified as not corresponding to a duplicate data block and the secondary datastore comprises an entry for each fingerprint identified as corresponding to a duplicate data block;

merging entries in the changelog file with the entries in the primary datastore to identify duplicate data blocks in the storage device;

freeing the identified duplicate data blocks in the storage device;

storing the entries that correspond to the freed data blocks to a third datastore; and overwriting the primary datastore with the entries from the merged entries that correspond to the unique fingerprints to create an updated primary datastore, wherein, when a request for a de-duplication operation is received during execution of a verify operation, the processor suspends the verify operation while the de-duplication operation is executing and subsequently resumes the verify operation upon completion of the de-duplication operation, and wherein the suspension of the verify operation comprises the processor marking the primary datastore as read-only, storing the verify operation in a current state to a storage device, and adding a message to a queue representing the suspended verify operation.

6. The storage server of claim 5, wherein the processor is configured further:
   to identify stale entries in the secondary datastore, the stale entries corresponding to duplicate data blocks eliminated from the storage device by the de-duplication operation;
   to write stale entry information for the identified stale entries to a stale entries datastore; and
   to remove the stale entries in the secondary datastore using the stale entry information in response to the request for the de-duplication operation.

7. The storage server of claim 5, wherein the stale entry information for a stale entry comprises an entry index for the stale entry, the fingerprint of the data block, context information for the data block, and an inode number of a file to which the data block belongs, and a file block number of the data block.

* * * * *